US012241467B2

(12) United States Patent
Smith et al.

(10) Patent No.: US 12,241,467 B2
(45) Date of Patent: Mar. 4, 2025

(54) ASSEMBLY AND ELECTRIC COMPRESSOR WITH MODULAR STATOR ASSEMBLY

(71) Applicant: MAHLE INTERNATIONAL GMBH, Stuttgart (DE)

(72) Inventors: Tyler Smith, Bath, NY (US); Brett Bowman, Lockport, NY (US)

(73) Assignee: MAHLE INTERNATIONAL GMBH (DE)

( * ) Notice: Subject to any disclaimer, the term of this patent is extended or adjusted under 35 U.S.C. 154(b) by 53 days.

(21) Appl. No.: 18/147,928

(22) Filed: Dec. 29, 2022

(65) Prior Publication Data

US 2024/0218876 A1     Jul. 4, 2024

(51) Int. Cl.
*F04C 23/02* (2006.01)
*F04B 35/04* (2006.01)
(Continued)

(52) U.S. Cl.
CPC .............. *F04C 23/02* (2013.01); *F04B 35/04* (2013.01); *F04C 18/0215* (2013.01); *F04B 53/22* (2013.01); *F04C 27/008* (2013.01); *F04C 2240/403* (2013.01); *F04C 2240/803* (2013.01); *F04C 2240/805* (2013.01);
(Continued)

(58) Field of Classification Search
CPC .... F04C 23/02; F04C 18/0215; F04C 27/008; F04C 2240/403; F04C 2240/803; F04C 2240/805; F04C 2240/808; F04B 35/04; F04B 53/22; H02K 5/20; H02K 5/22; H02K 5/225; H02K 9/19; H02K 9/193;
(Continued)

(56) References Cited

U.S. PATENT DOCUMENTS 4,886,427 A    12/1989 Sakurai et al.
5,533,875 A     7/1996 Crum et al.
(Continued)

FOREIGN PATENT DOCUMENTS

JP    S601396 A    1/1985
JP    H06299976 A   10/1994
(Continued)

OTHER PUBLICATIONS

KR 20130011656A translation (Year: 2024).*
(Continued)

*Primary Examiner* — David N Brandt
(74) *Attorney, Agent, or Firm* — Endurance Law Group PLC; James R. Yee

(57) ABSTRACT

An electric compressor includes a housing, a refrigerant inlet port, a refrigerant outlet port, an inverter module, a motor, a drive shaft, a cylindrical sleeve, and a compression device. The refrigerant inlet port is coupled to the housing and configured to introduce the refrigerant to an intake volume. The refrigerant outlet port is coupled to the housing and is configured to allow compressed refrigerant to exit a discharge volume. The inverter module is adapted to convert direct current electrical power to alternating current electrical power. The motor is mounted inside the housing. The cylindrical sleeve has a tubular side wall and a top cover defining an interior cavity. The interior cavity has an open end. The cylindrical sleeve is configured to receive the motor therein and constrain the motor within interior cavity.

23 Claims, 64 Drawing Sheets

(51) Int. Cl.
*F04B 53/22* (2006.01)
*F04C 18/02* (2006.01)
*F04C 27/00* (2006.01)
*H02K 5/20* (2006.01)
*H02K 5/22* (2006.01)
*H02K 9/19* (2006.01)
*H02K 9/193* (2006.01)
*H02K 11/30* (2016.01)
*H02K 11/33* (2016.01)
*H02K 15/14* (2006.01)

(52) U.S. Cl.
CPC ......... *F04C 2240/808* (2013.01); *H02K 5/20* (2013.01); *H02K 5/22* (2013.01); *H02K 5/225* (2013.01); *H02K 9/19* (2013.01); *H02K 9/193* (2013.01); *H02K 11/30* (2016.01); *H02K 11/33* (2016.01); *H02K 15/14* (2013.01)

(58) Field of Classification Search
CPC ........ H02K 11/30; H02K 11/33; H02K 15/14; F04D 29/5813
See application file for complete search history.

(56) References Cited

U.S. PATENT DOCUMENTS

| | | | |
|---|---|---|---|
| 9,441,630 B2 | 9/2016 | Kiem et al. | |
| 2012/0076679 A1* | 3/2012 | Saito | F04B 39/00 417/410.1 |
| 2013/0136633 A1* | 5/2013 | Kanda | F04D 13/06 417/410.1 |
| 2019/0195240 A1* | 6/2019 | Iizuka | H02K 5/18 |
| 2020/0313502 A1* | 10/2020 | Guntermann | B60H 1/3222 |
| 2020/0395823 A1* | 12/2020 | Zeng | H02K 5/20 |

FOREIGN PATENT DOCUMENTS

| | | | | |
|---|---|---|---|---|
| JP | H1047268 A | | 2/1998 | |
| JP | 2778585 B2 | | 7/1998 | |
| JP | 2785805 B2 | | 8/1998 | |
| JP | 2785806 B2 | | 8/1998 | |
| JP | 2870488 B2 | | 3/1999 | |
| JP | 2006274807 A | | 10/2006 | |
| JP | 4918338 B2 | | 4/2012 | |
| JP | 5209437 B2 | | 6/2013 | |
| JP | 5222444 B2 | | 6/2013 | |
| KR | 20100103139 A | | 9/2010 | |
| KR | 20130011656 A | * | 1/2013 | ............. F04C 18/02 |
| KR | 20130011658 A | | 1/2013 | |
| KR | 101278809 B1 | | 6/2013 | |
| KR | 101284953 B1 | | 7/2013 | |
| KR | 20130126837 A | | 11/2013 | |
| KR | 101362790 B1 | | 2/2014 | |
| KR | 20150104998 A | * | 9/2015 | ............. F04C 18/02 |
| KR | 101731653 B1 | | 5/2017 | |
| WO | 2013165157 A1 | | 11/2013 | |

OTHER PUBLICATIONS energy.gov; Solar Integration_ Inverters and Grid Services Basics _ Department of Energy pdf from the wayback machine from Dec. 2, 2020, archiving https://www.energy.gov/eere/solar/solar-integration-inverters-and-grid-services-basics#:~:text=Inverters%20are%20just%20one%20example,input%20bec (Year: 2020).*
KR20150104998A translation (Year: 2024).*

* cited by examiner

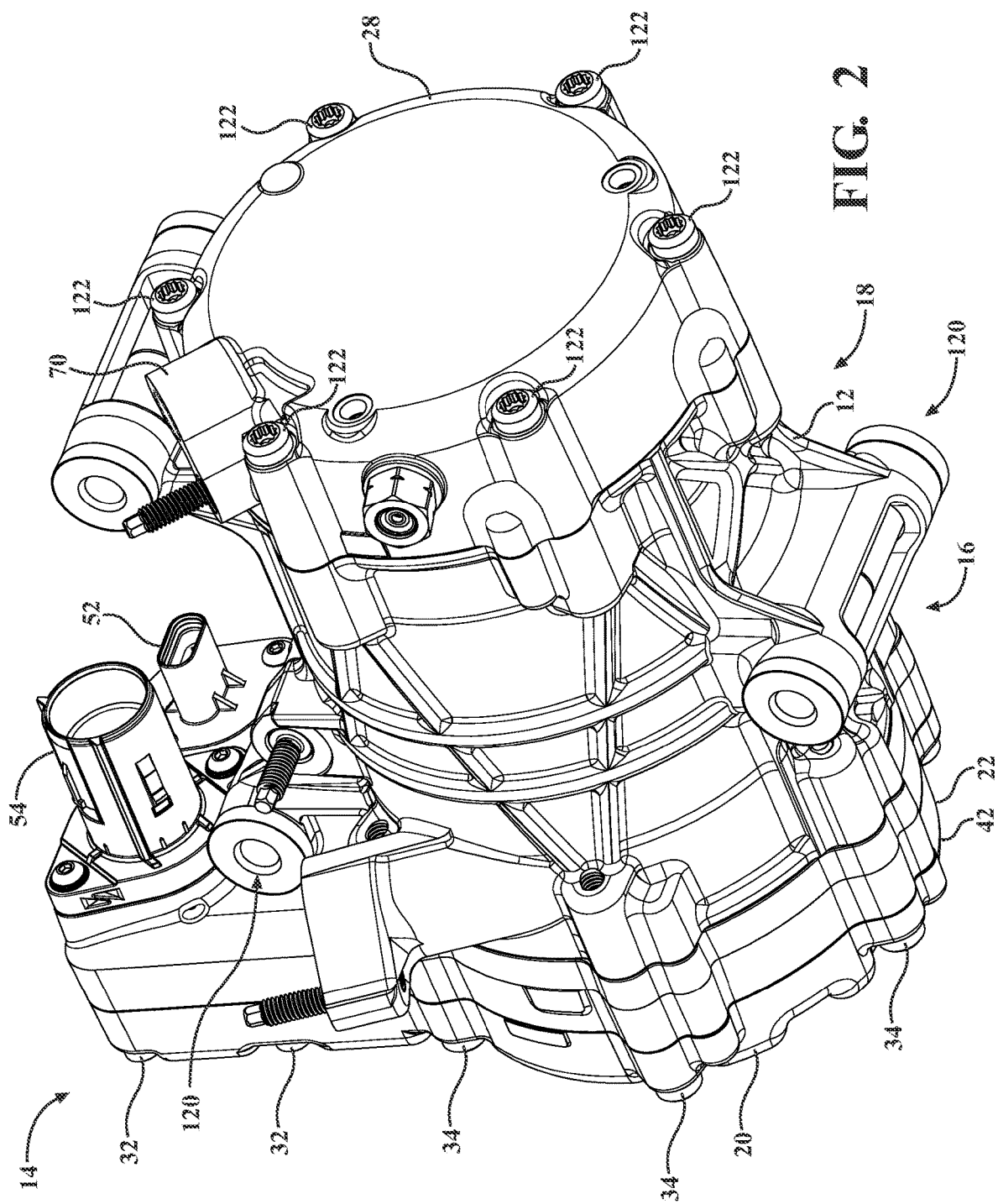

B: Copy of Static Structural - E-Compressor57cc -C-Sample- Current Design with Lug Bolt Pretension
X Axis - Directional Deformation -C- Sample Stator - 4s
Type: Directional Deformation (X Axis)
Unit: μm
Coordinate System
Time: 4
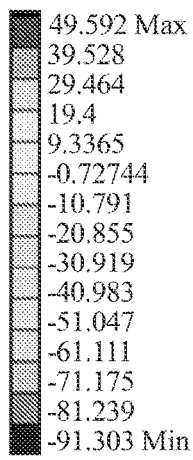
49.592 Max
39.528
29.464
19.4
9.3365
-0.72744
-10.791
-20.855
-30.919
-40.983
-51.047
-61.111
-71.175
-81.239
-91.303 Min
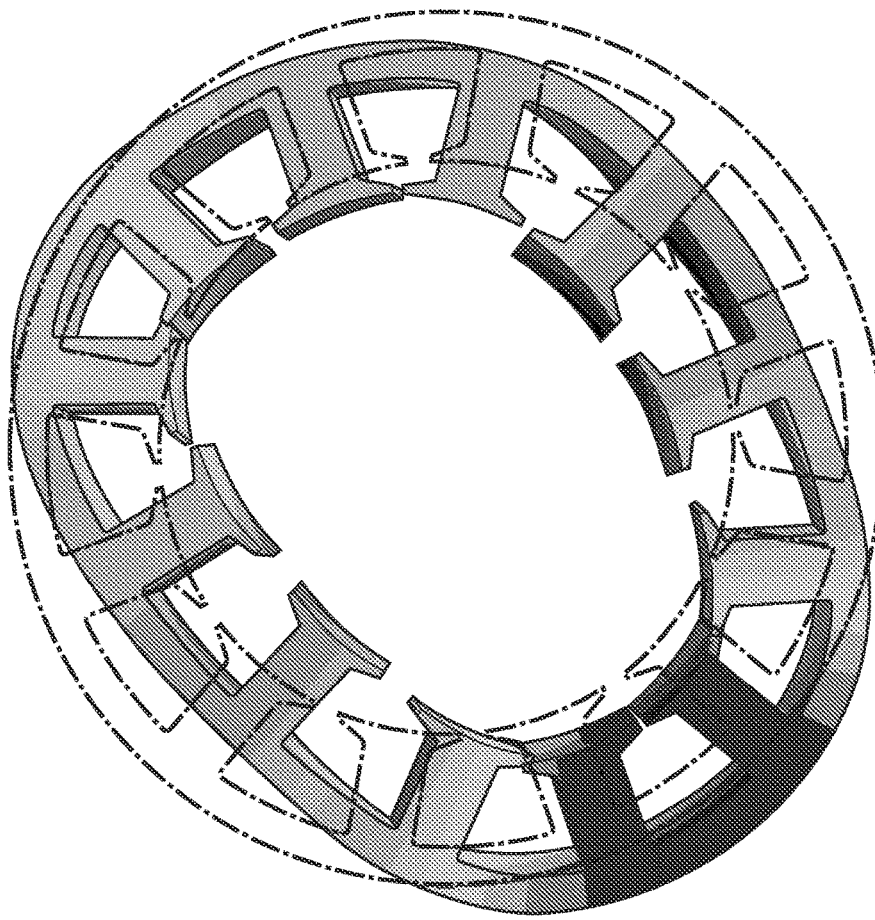
FIG. 21B
PRIOR ART

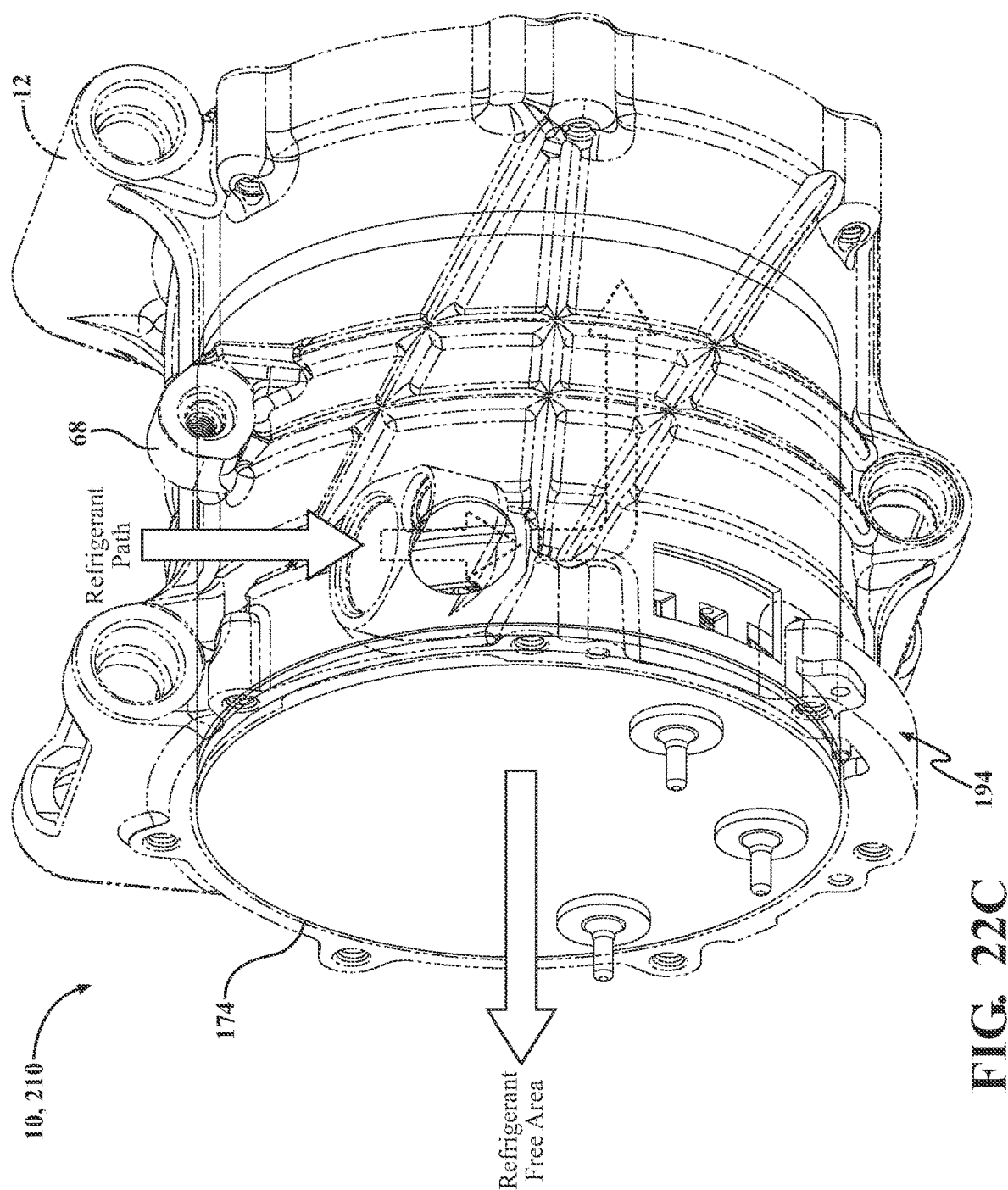

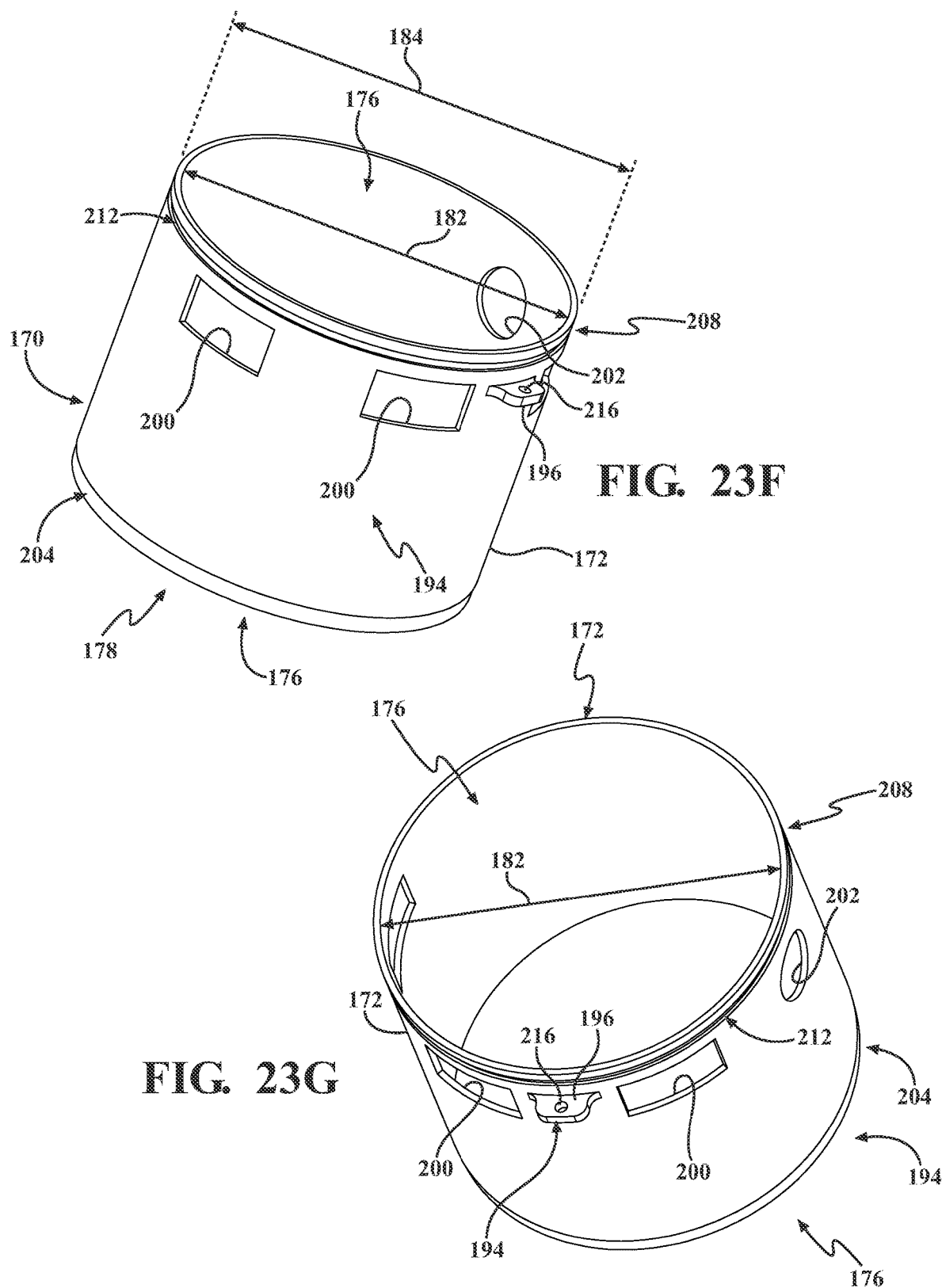

ASSEMBLY AND ELECTRIC COMPRESSOR WITH MODULAR STATOR ASSEMBLY

CROSS-REFERENCE TO RELATED APPLICATION

The present application is related to U.S. patent application Ser. No. 18/147,913, filed on Dec. 11, 2022, the entire contents of which are herein incorporated by reference.

FIELD OF THE INVENTION

The invention relates generally to electric compressors, and more particularly to an electric compressor that compresses a refrigerant using a scroll compression device.

BACKGROUND OF THE INVENTION

Compressors have long been used in cooling systems. In particular, scroll-type compressors, in which an orbiting scroll is rotated in a circular motion relative to a fixed scroll to compress a refrigerant, have been used in systems designed to provide cooling in specific areas. For example, such scroll-type compressors have long been used in the HVAC systems of motor vehicles, such as automobiles, to providing air-conditioning. Such compressors may also be used, in reverse, in applications requiring a heat pump. Generally, these compressors are driven using rotary motion derived from the automobile's engine.

With the advent of battery-powered or electric vehicles and/or hybrid vehicles, in which the vehicle may be solely powered by a battery at times, such compressors must be driven or powered by the battery rather than an engine. Such compressors may be referred to as electric compressors.

In addition to cooling a passenger compart of the motor vehicle, electric compressors may be used to provide heating or cooling to other areas or components of the motor vehicle. For instance, it may be desired to heat or cool the electronic systems and the battery or battery compartment, when the battery is being charged, especially during fast charging modes, as such generate heat which may damage or degrade. the battery and/or other system. It may also be used to cooling the battery during times when the battery is not being charged or used, as heat may damage or degrade the battery. Since the electric compressor may be run at various times, even when the motor vehicle is not in operation, such use, obviously, requires electrical energy from the battery, thus reducing the operating time of the battery.

Additionally, electric compressors may run at a very high speed, e.g., 2,000 RPM (or higher). Such high speed may generate unwanted levels of noise.

Generally, prior art electric compressors having a housing to contain the components of the compressors including a motor and a compression device driven by the motor to compress a refrigerant. The outer housing of the motor, which may be the stator of the motor, must be held in place relative to the housing the compressor. In some prior art compressors, a radial clamping force is applied along all, or part of, the outer diameter of the stator. The radial clamping force may be applied by an interference fit between the outer diameter of the stator and the inner diameter of the housing of 300 microns or more. This high radial clamping force may cause distortion in the geometry of the stator which may increase inefficiency in, and noise generated by, the compressor.

Reference is made to FIGS. 21A and 22A, in which a stator is held in place relative to a compressor housing through a radial clamping force applied by an interference fit. The compressor may be assembled, for example, by heating the housing to increase the inner diameter thereof. The motor is then inserted within an inner cavity of the housing and the housing is allowed to cool to create the interference fit. As shown in FIGS. 21A-21B, this may cause a distortion or change in the radius or outer diameter of the stator. FIG. 22A is not to scale. The distortions to the radius of the stator have been emphasized for illustration purposes. In the illustrated embodiment, the radius of the stator changed within a range of ~(−91) microns to ~(+49) microns.

In addition, electric power is generally supplied to the motor using a power circuit. The motor drives a mechanism to compress the refrigerant. As the refrigerant flows throughout the interior of the compressor including the interior of the motor, the electrical connections providing power to the motor must be electrically insulated from the interior of the compressor. For example, an encapsulating insulating material 2 (see FIG. 21C) may be applied to the junction between the power terminals of the motor and the electrical leads supplying power to the motor from the power circuit. Once the compressor is assembled, it may be difficult to access the interior cavity of the compressor in order to apply the encapsulating material. Further, in some embodiments, power may be supplied using a plurality of terminals located within a terminal block. This arrangement may require a hermetic seal within the housing that is complex and difficult to assemble (see FIG. 21D).

It is thus desirable to provide an electric compressor having high efficiency, low-noise and maximum operating life. The present invention is aimed at one or more of the problems or advantages identified above.

BRIEF SUMMARY OF THE INVENTION

In a first embodiment of the present invention, an electric compressor configured to compress a refrigerant is provided. The electric compressor includes a housing, a refrigerant inlet port, a refrigerant outlet port, an inverter module, a motor, a drive shaft, a cylindrical sleeve, and a compression device. The housing defines an intake volume and a discharge volume and has a generally cylindrical shape and a central axis. The refrigerant inlet port is coupled to the housing and configured to introduce the refrigerant to the intake volume. The refrigerant outlet port is coupled to the housing and is configured to allow compressed refrigerant to exit the electric compressor from the discharge volume. The inverter module is mounted inside the housing and is adapted to convert direct current electrical power to alternating current electrical power. The motor is mounted inside the housing. The drive shaft is coupled to the motor. The cylindrical sleeve has a tubular side wall and a top cover defining an interior cavity. The interior cavity has an open end and is configured to receive the motor therein and to constrain the motor within interior cavity. The compression device, coupled to the drive shaft, receives the refrigerant from the intake volume and compresses the refrigerant as the drive shaft is rotated by the motor.

In a second embodiment of the present invention, an assembly having a housing, a motor, a drive shaft, and a cylindric sleeve is provided. The housing has a generally cylindrical shape and has a central axis. The motor is mounted inside the housing. The drive shaft is coupled to the motor. The cylindrical sleeve has a tubular side wall and a top cover defining an interior cavity. The interior cavity has an open end. The cylindrical sleeve is configured to receive the motor therein and constrain the motor within interior cavity.

In a third embodiment of the present invention, an electric compressor having a central axis and being configured to compress a refrigerant, is provided. The compressor includes a housing, a refrigerant inlet port, a refrigerant outlet port, an inverter section, a motor section, a compression device and a plurality of clamping mechanisms.

The housing defines an intake volume and a discharge volume. The refrigerant inlet port is coupled to the housing and is configured to introduce the refrigerant to the intake volume. The refrigerant outlet port is coupled to the housing and is configured to allow compressed refrigerant to exit the electric compressor from the discharge volume.

The inverter section includes an inverter housing, an inverter back cover, and an inverter module. The inverter back cover is connected to the inverter housing and forms an inverter cavity. The inverter module is mounted inside the inverter cavity and is adapted to convert direct current electrical power to alternating current electrical power.

The motor section includes a drive shaft and a motor. The drive shaft is located within the housing, has first and second ends, and defines a center axis. The motor is located within the housing to controllably rotate the drive shaft about the center axis.

The compression device is coupled to the drive shaft for receiving the refrigerant from the intake volume and compressing the refrigerant as the drive shaft is rotated by the motor. The compression device includes a fixed scroll and an orbiting scroll. The fixed scroll is located within, and being fixed relative to, the housing. The orbiting scroll is coupled to the drive shaft. The orbiting scroll and the fixed scroll form compression chambers for receiving the refrigerant from the intake volume and for compressing the refrigerant as the drive shaft is rotated about the center axis.

The cylindrical sleeve has a tubular side wall and a top cover defining an interior cavity. The interior cavity has an open end. The cylindrical sleeve is configured to receive the motor therein and constrain the motor within interior cavity.

BRIEF DESCRIPTION OF THE SEVERAL VIEWS OF THE DRAWINGS

These and other features and advantages of the present invention will become more readily appreciated when considered in connection with the following detailed description and appended drawings.

FIG. 2 is a second perspective view of the electric compressor of FIG. 1A.

FIGS. 21A-21D are illustrations of a prior art compressor illustrating distortions in an outer diameter of a stator of a motor of the compressor.

FIG. 22C is a second perspective view of the cylindrical sleeve and motor of the compressor of FIG. 22A.

FIG. 23F is a first perspective view of a portion of the cylindrical sleeve of the compressor of FIG. 23A.

FIG. 23G is a second perspective view of a portion of the cylindrical sleeve of the compressor of FIG. 23A.

DETAILED DESCRIPTION OF THE INVENTION

Figure 1A:
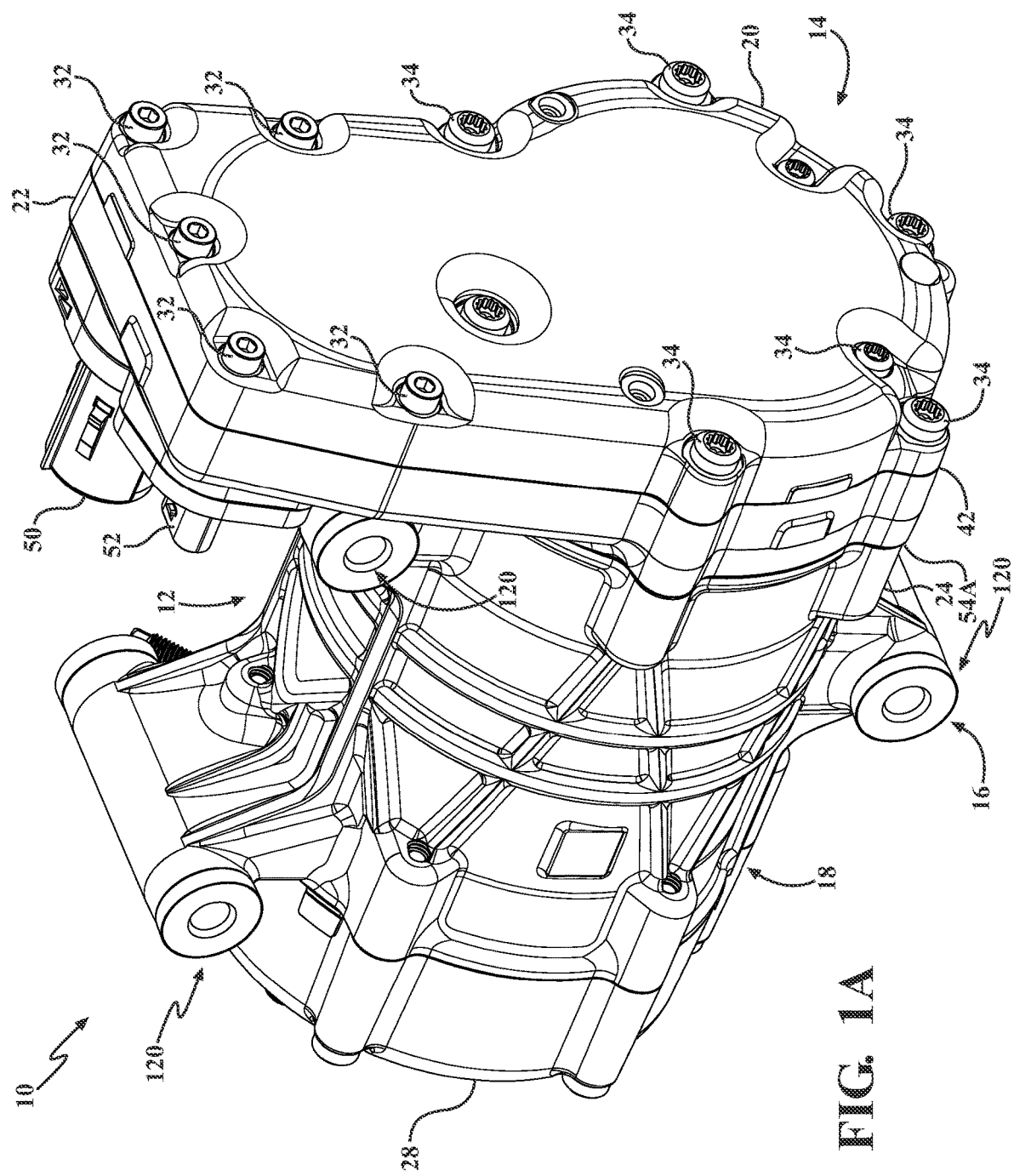
FIG. 1A is first perspective view an electric compressor, according to an embodiment of the present invention.

Referring to the FIGS. 1A-20D, wherein like numerals indicate like or corresponding parts throughout the several views, an electric compressor 10 having an outer housing 12 is provided. The electric compressor 10 is particularly suitable in a motor vehicle, such as an automotive vehicle (not shown). The electric compressor 10 may be used as a cooling device or as a heating pump (in reverse) to heat and/or cool different aspects of the vehicle. For instance, the electric compressor 10 may be used as part of the heating, ventilation and air conditioning (HVAC) system in electric vehicles (not shown) to cool or heat a passenger compartment. In addition, the electric compressor 10 may be used to heat or cool the passenger compartment, on-board electronics and/or a battery used for powering the vehicle while the vehicle is not being operated, for instance, during a charging cycle. The electric compressor 10 may further be used while the vehicle is not being operated and while the battery is not being charged to maintain, or minimize the degradation, of the life of the battery. In the illustrated embodiment, the electric compressor 10 has a capacity of 36 cubic centimeters (cc). The capacity refers to the initial volume captured within the compression device as the scrolls of the compression device initially close or make contact (see below). It should be noted that the electric compressor 10 disclosed herein is not limited to any such volume and may be sized or scaled to meet particular required specifications.

In the illustrated embodiment, the electric compressor 10 is a scroll-type compressor that acts to compress a refrigerant rapidly and efficiently for use in different systems of a motor vehicle, for example, an electric or a hybrid vehicle. The electric compressor includes 10 an inverter section 14, a motor section 16, and a compression device (or compression assembly) 18 contained within the outer housing 12. The outer housing 12 includes an inverter back cover 20, an inverter housing 22, a center housing 24, and a front cover 28 (which may be referred to as the discharge head). The center housing 24 houses the motor section 16 and the compression device 28.

In one aspect of the present invention, the electric compressor 10 includes a cylindrical sleeve 170 encompassing the motor section 16 configured to constrain the motor section 16 within the outer housing 12 (see below).

The inverter back cover 20, the inverter housing 22, the center housing 24, and the front cover 28 may be composed from machined aluminum. The inverter 10 may be mounted, for example, within the body of a motor vehicle, via a plurality of mount points 120.

General Arrangement, and Operation, of the Electric Compressor 10

The inverter back cover 20 and the inverter housing 22 form an inverter cavity 30. The inverter back cover 20 is mounted to the inverter housing 22 by a plurality of bolts 32. The inverter back cover 20 and the inverter housing 22 are mounted to the center housing 24 by a plurality of bolts 34 which extend through apertures 36 in the inverter back cover 20 and apertures 38 in the inverter housing 22 and are threaded into threaded apertures 40 in the center housing 24. An inverter gasket 42, positioned between the inverter back cover 20 and the inverter housing 22 keeps moisture, dust, and other contaminants from the internal cavity 30. A motor gasket 54B is positioned between the inverter housing 22 and the center housing 24 to provide and maintain a refrigerant seal to the environment.

Figure 11:
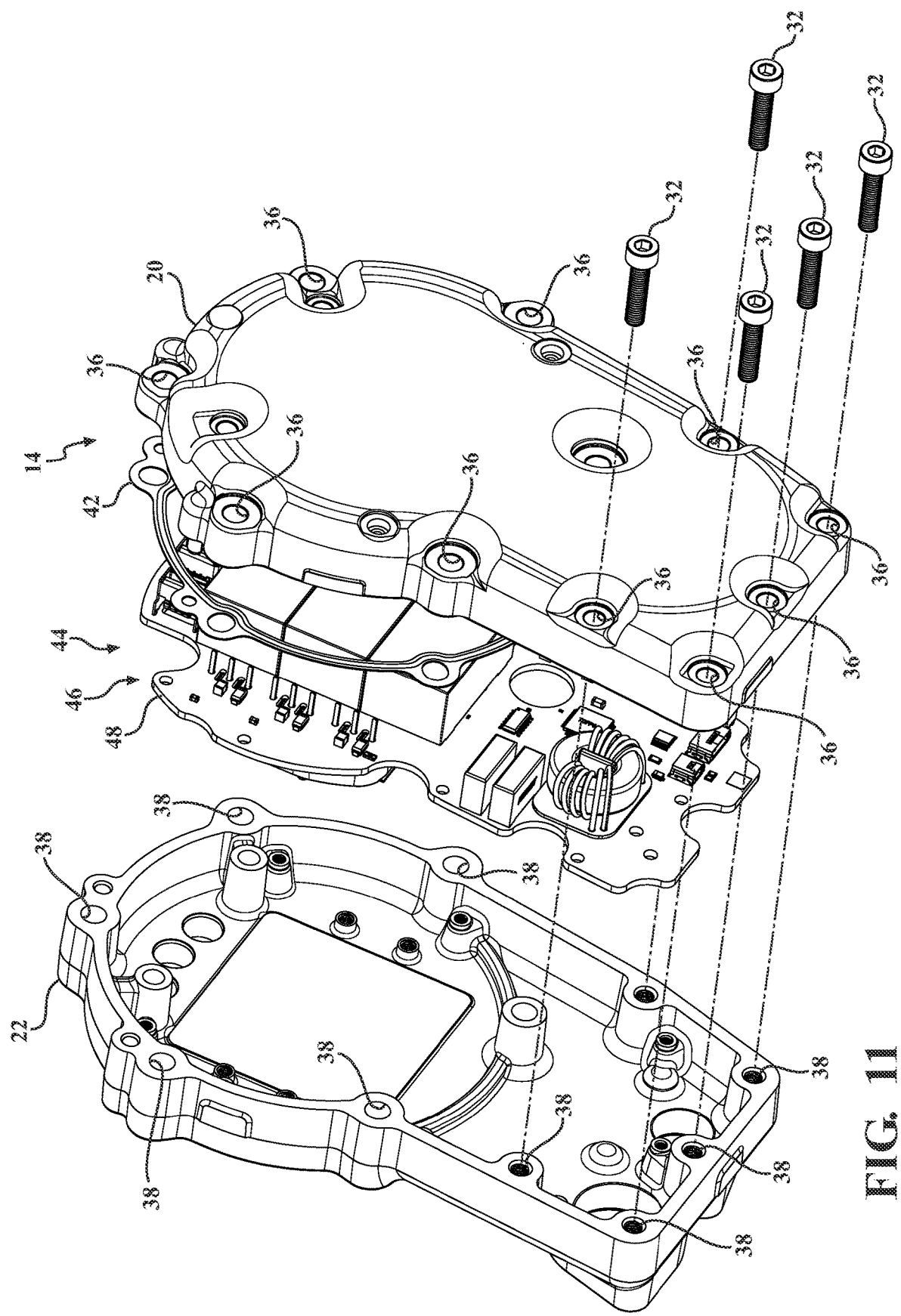
FIG. 11 is an exploded view of an inverter of the electric compressor of FIG. 1A.
Figure 12:
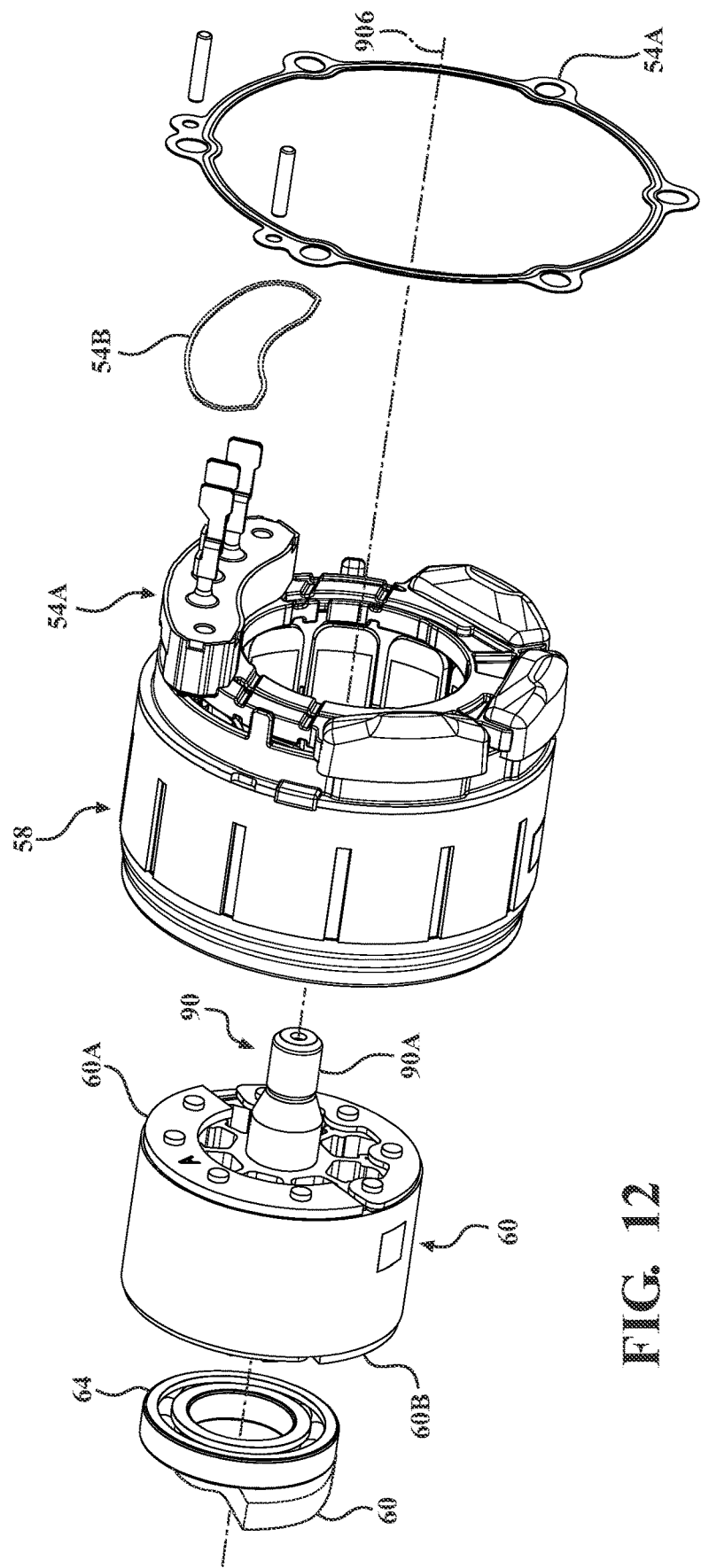
FIG. 12 is an exploded view of a portion of the electric compressor of FIG. 1, including a motor and drive shaft.

With reference to FIG. 11, an inverter module 44 mounted within the inverter cavity 30 formed by the inverter back cover 20 and the inverter housing 22. The inverter module 44 includes an inverter circuit 46 mounted on a printed circuit board 48, which is mounted to the inverter housing 22. The inverter circuit 46 converts direct current (DC) electrical power received from outside of the electric compressor 10 into three-phase alternating current (AC) power to supply/power the motor 54 (see below). The inverter circuit 46 also controls the rotational speed of the electric compressor 10. High voltage DC current is supplied to the inverter circuit 46 via a high voltage connector 50. Low voltage DC current to drive the inverter circuit 46, as well as control signals to control operation of the inverter circuit 46, and the motor section 16, is supplied via a low voltage connector 52.

The center housing 24 forms a motor cavity 56. The motor section 16 includes a motor 54 located within the motor cavity 56. The motor cavity 56 is formed by a motor side 22A of the inverter housing 22 and an inside surface 24A of the center housing 22. With specific reference to FIG. 12, the motor 54 is a three-phase AC motor having a stator 60. The stator 60 has a generally hollow cylindrical shape with six individual coils (two for each phase). The stator 60 is contained within, and mounted to, the motor housing 22 and remains stationary relative to the motor housing 22.

The motor 54 includes a rotor 60 located within, and centered relative to, the stator 58. The rotor 60 has a generally hollow cylindrical shape and is located within the stator 60. The rotor 60 has a number of balancing counterweights 60A, 60B, affixed thereto. The balancing counterweights balance the motor 54 as the motor 54 drives the compression device 18 and may be machined from brass.

Power is supplied to the motor 54 via a set of terminals 54A which are sealed from the motor cavity 56 by an O-ring 54B.

A drive shaft 90 is coupled to the rotor 60 and rotates therewith. In the illustrated embodiment, the draft shaft 90 is press-fit within a center aperture 60C of the rotor 60. The drive shaft 90 has a first end 90A and a second end 90B. The inverter housing 22 includes a first drive shaft supporting member 22B located on the motor side of the inverter housing 22. A first ball bearing 62 located within an aperture formed by the first drive shaft supporting member 22 supports and allows the first end of the drive shaft 90 to rotate. The center housing 24 includes a second drive shaft supporting member 24A. A second ball bearing 64 located within an aperture formed by the second drive shaft supporting member 24A allows the second end 90B of the drive shaft 90 to rotate. In the illustrated embodiment, the first and second ball bearing 62, 64 are press-fit with the apertures formed by the first drive shaft supporting member 22 of the inverter housing 22 and the second drive shaft supporting member 24A of the center housing 24, respectively.

As stated above, the electric compressor 10 is a scroll-type compressor. The compression device 18 includes the fixed scroll 26 and an orbiting scroll 66. The orbiting scroll 66 is fixed to the second end of the rotor 60B. The rotor 60 with the drive shaft 90 rotate to drive the orbiting scroll 66 motion under control of the inverter module 44 rotate.

With reference to FIGS. 14A, 14B, 16A and 16B, the drive shaft 90 has a central axis 90C around which the rotor 60 and the drive shaft 90 are rotated. The orbiting scroll 66 moves about the central axis 90C in an eccentric orbit, i.e., in a circular motion while the orientation of the orbiting scroll 66 remains constant with respect to the fixed scroll 26. The center of the orbiting scroll 66 is located along an offset axis 90D of the drive shaft 90 defined by an orbiting scroll aperture (or drive pin location) 90E (see FIG. 14A) located at the second end 90D of the drive shaft 90. As the drive shaft 90 is rotated by the motor 54, the orbiting scroll 66 follows the motion of the orbiting scroll aperture 90E through the drive pin 126 and the drive hub of the swinglink mechanism 124 and bearing 108 as the drive shaft 90 is rotated about the central axis 60C.

Figure 1B:
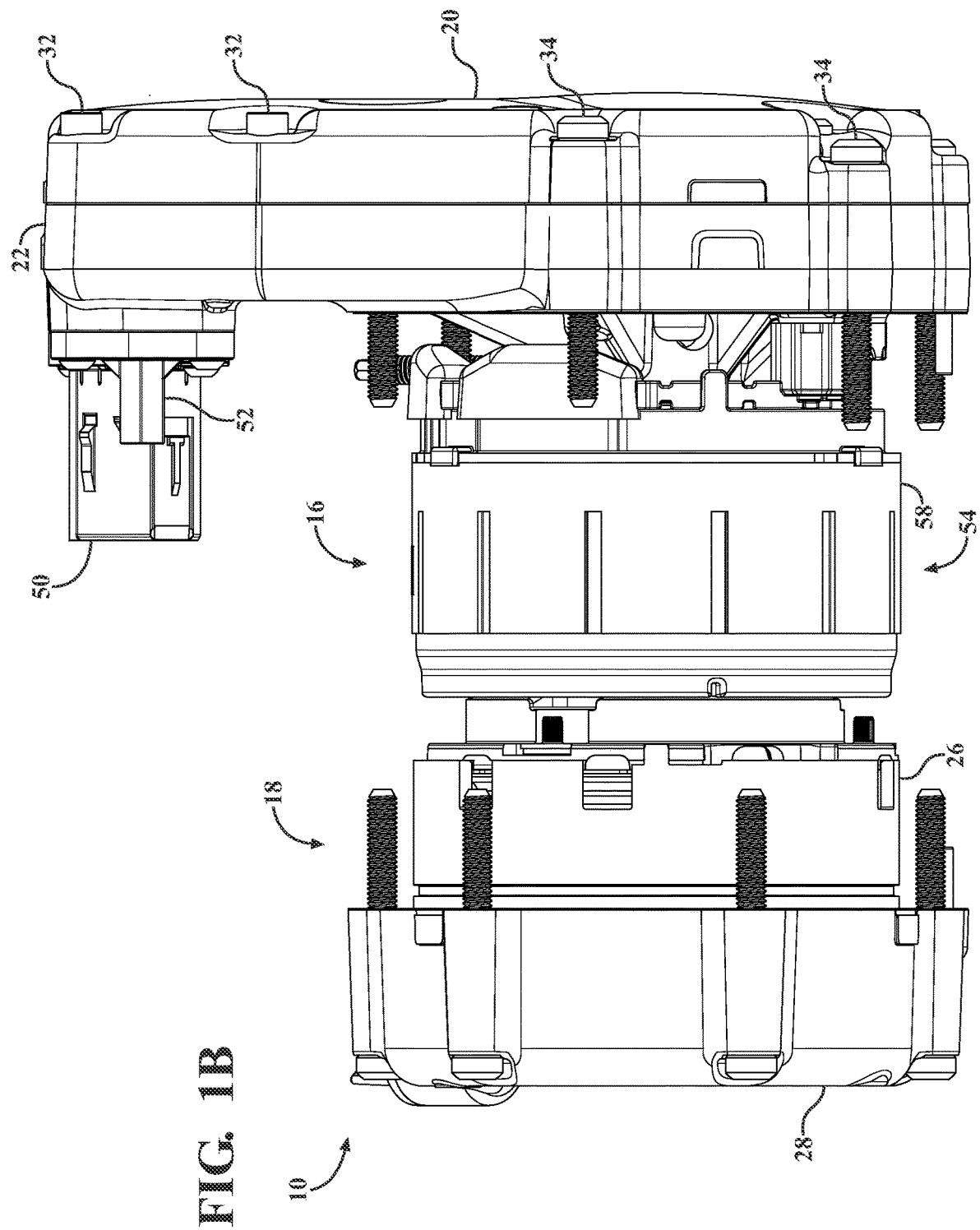
FIG. 1B is a partial view of the electric compressor of FIG. 1A with a center housing removed.
Figure 9:
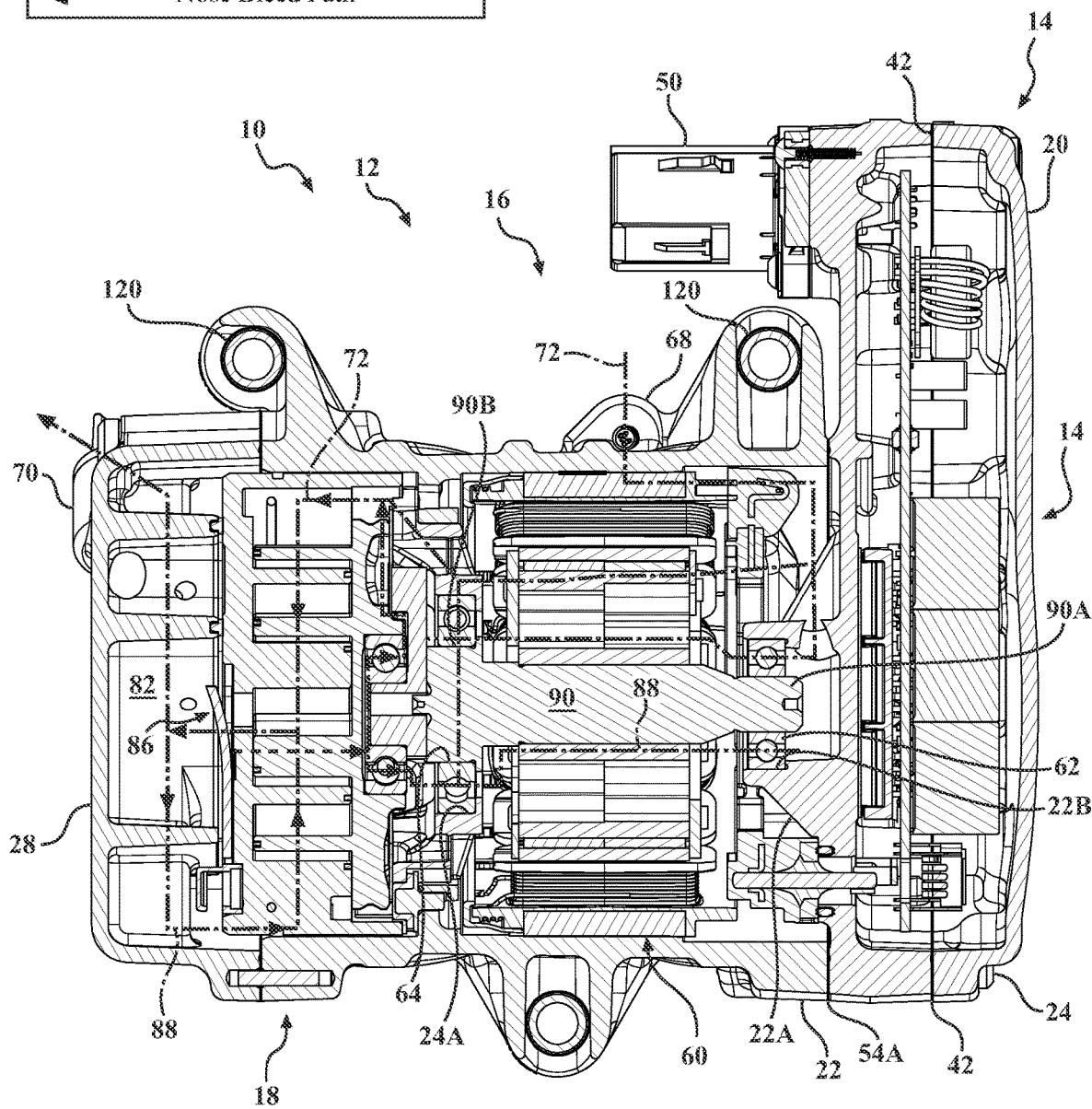
FIG. 9 is a first cross-sectional view of the electric compressor of FIG. 1A.
Figure 10:
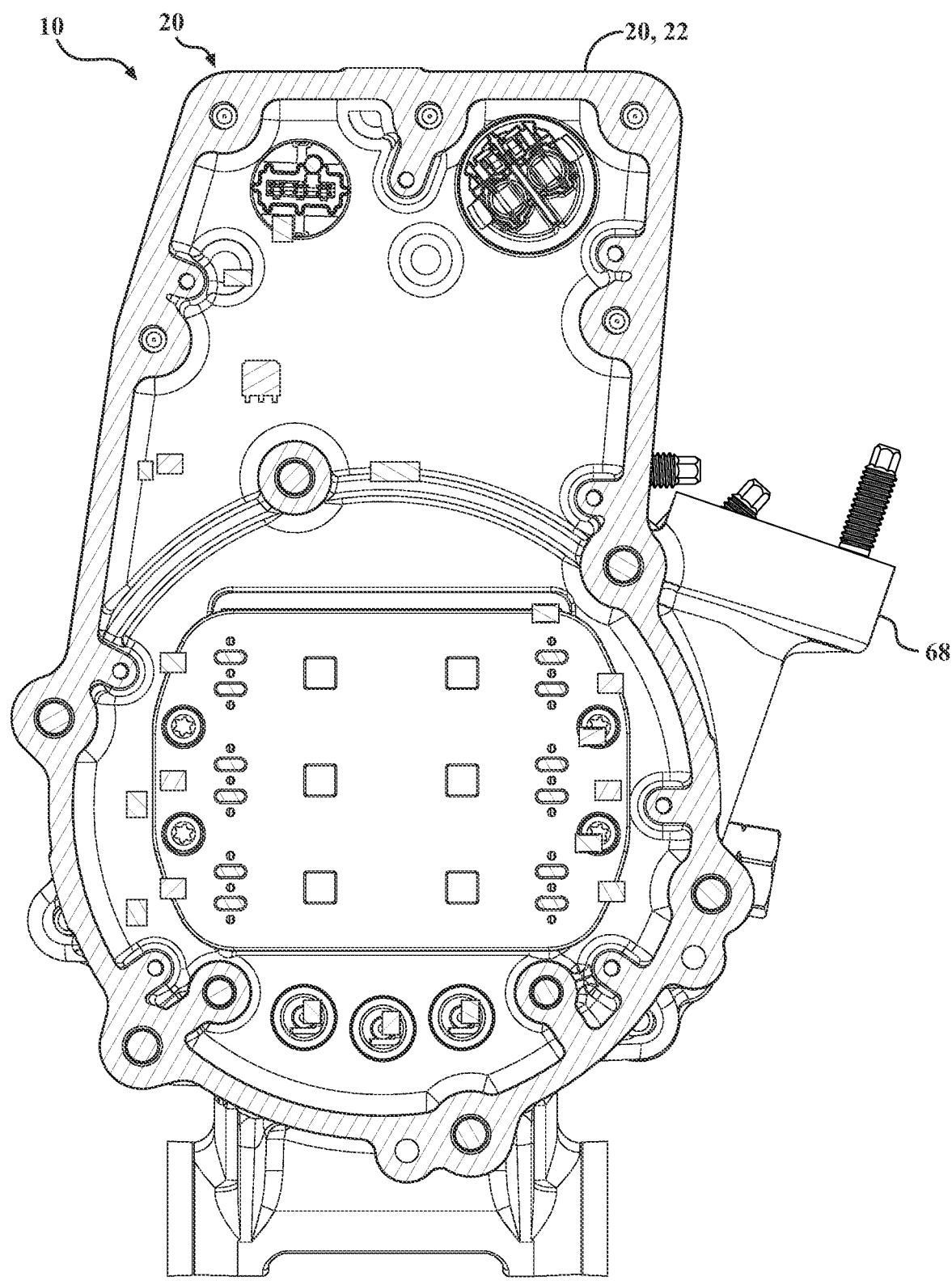
FIG. 10 is a second cross-sectional view of the electric compressor of FIG. 1A.

With specific reference to FIGS. 1, 2 and 9, intermixed refrigerant and oil (at low pressure) enters the electric compressor 10 via a refrigerant inlet port 68 and exits the electric compressor 10 (at high pressure) via refrigerant outlet port 70 after being compressed by the compression device 18. As shown in the cross-sectional view of FIG. 9, the refrigerant follows the refrigerant path 72 through the electric compressor 10. As shown, refrigerant enters the refrigerant inlet port 68 and enters an intake volume 74 formed between the motor side 22A of the inverter housing 22 and the center housing 24 adjacent the refrigerant inlet port 68. Refrigerant is then drawn through the motor section 16 and enters a compression intake volume 76 formed between an internal wall of the fixed scroll 26 and the orbiting scroll 66 (demonstrated by arrow 92 in FIG. 14A).

Figure 13:
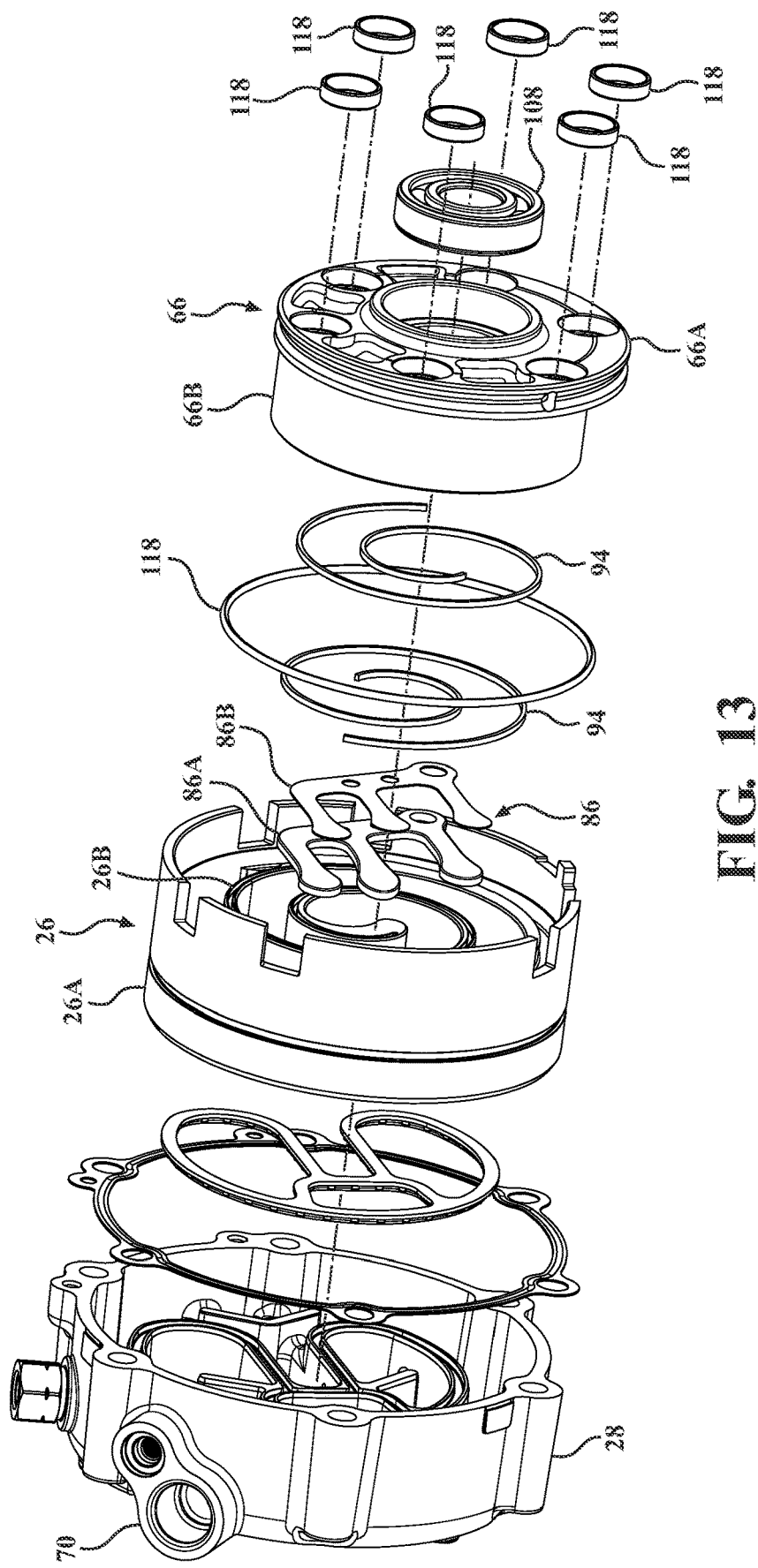
FIG. 13 is an exploded view of a compression device of the electric compressor of FIG. 1A.
Figure 14A:
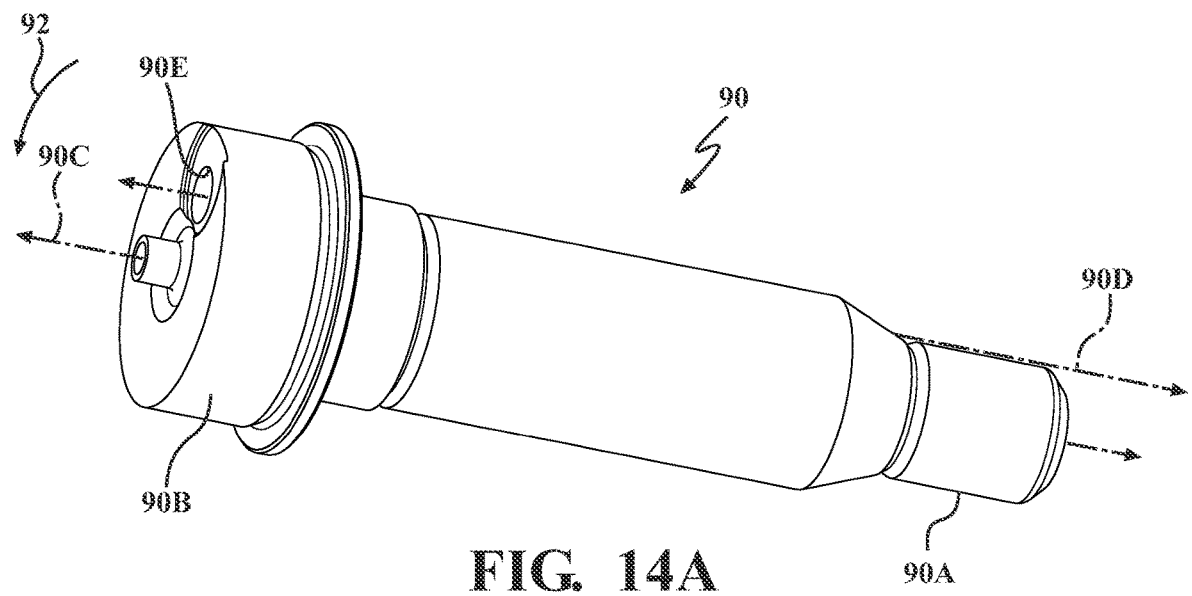
FIG. 14A is a first perspective view of a drive shaft of FIG. 12.
Figure 14B:
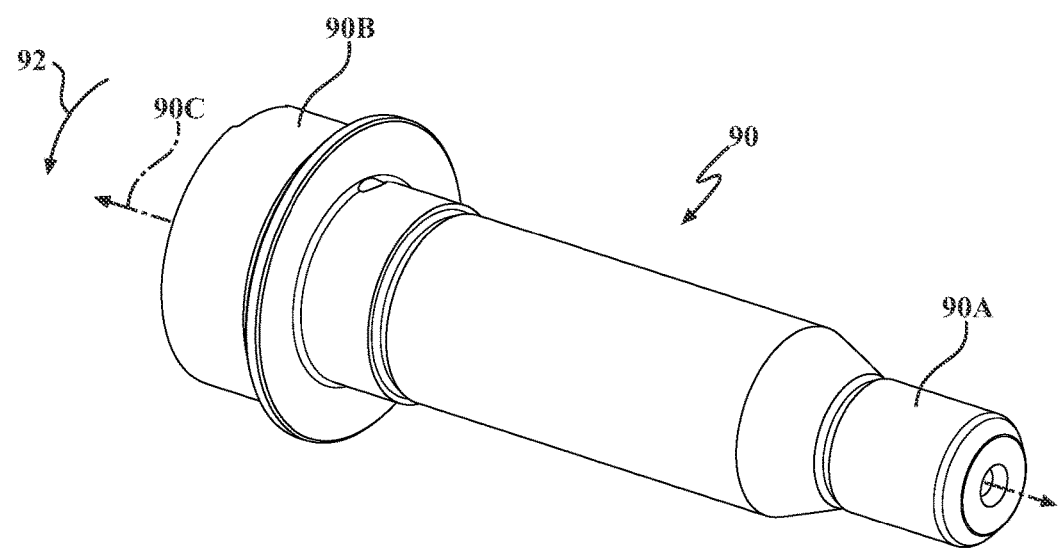
FIG. 14B is a second perspective view of the drive shaft of FIG. 14A.
Figure 15A:
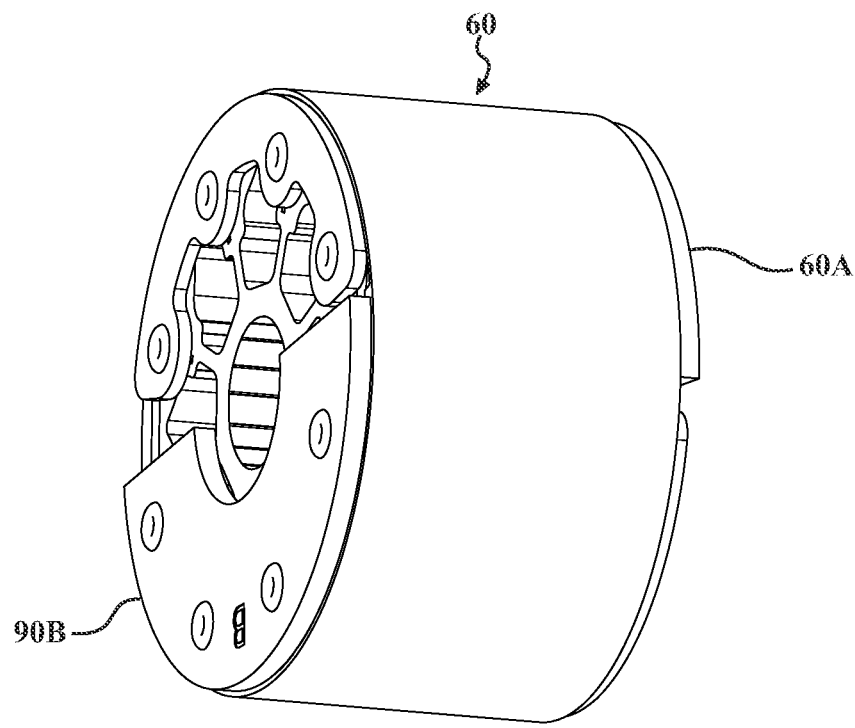
FIG. 15A is a first perspective view of a rotor and counterweights of the motor of FIG. 12.
Figure 15B:
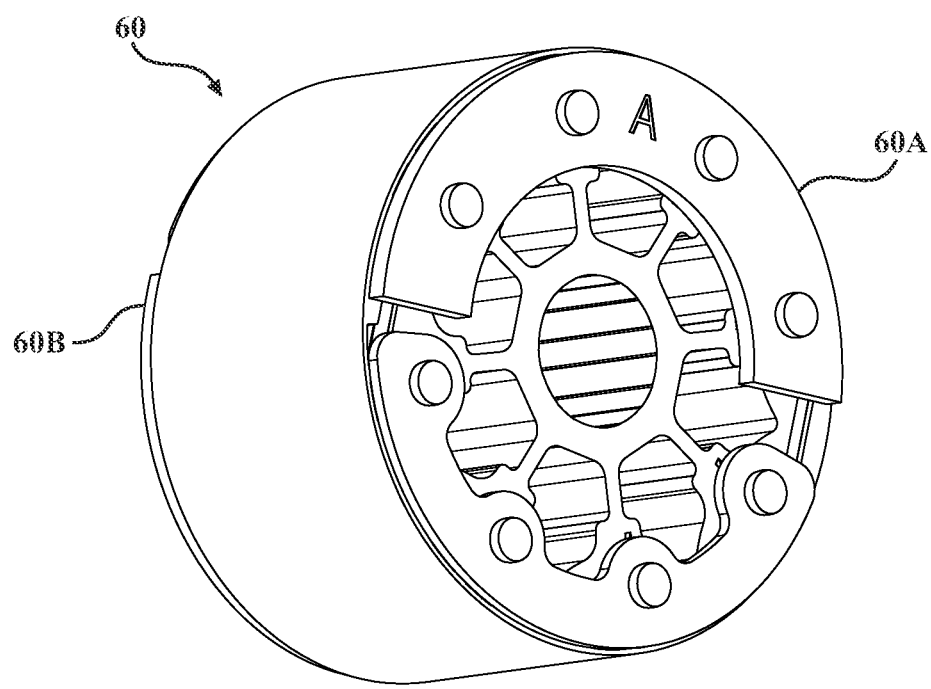
FIG. 15B is a second perspective view of the rotor and counterweights of FIG. 15A.
Figure 16A:
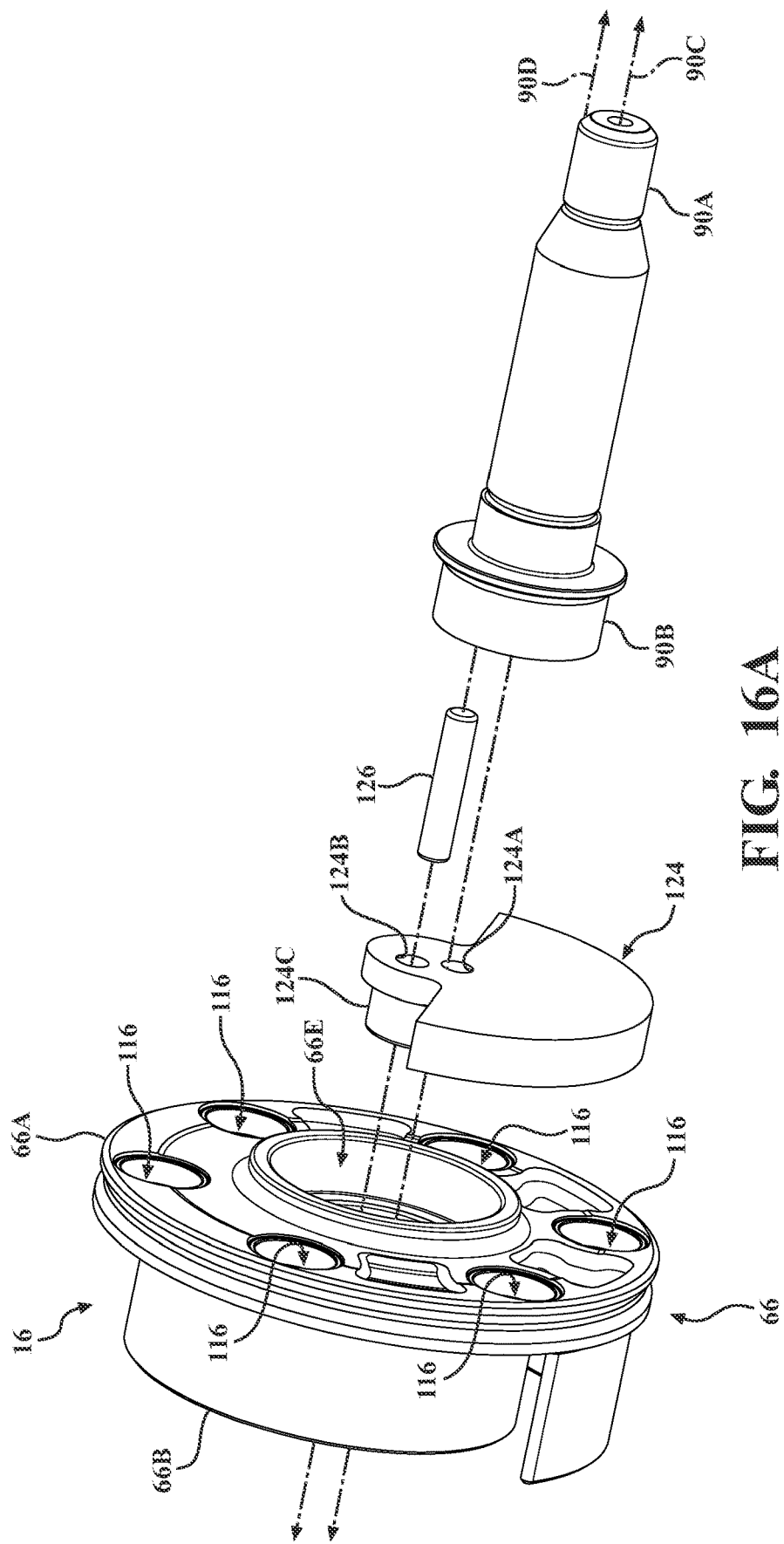
FIG. 16A is a first perspective view of a portion of the electric compressor of FIG. 1, including an orbiting scroll, drive pin and swing-link mechanism.
Figure 16B:
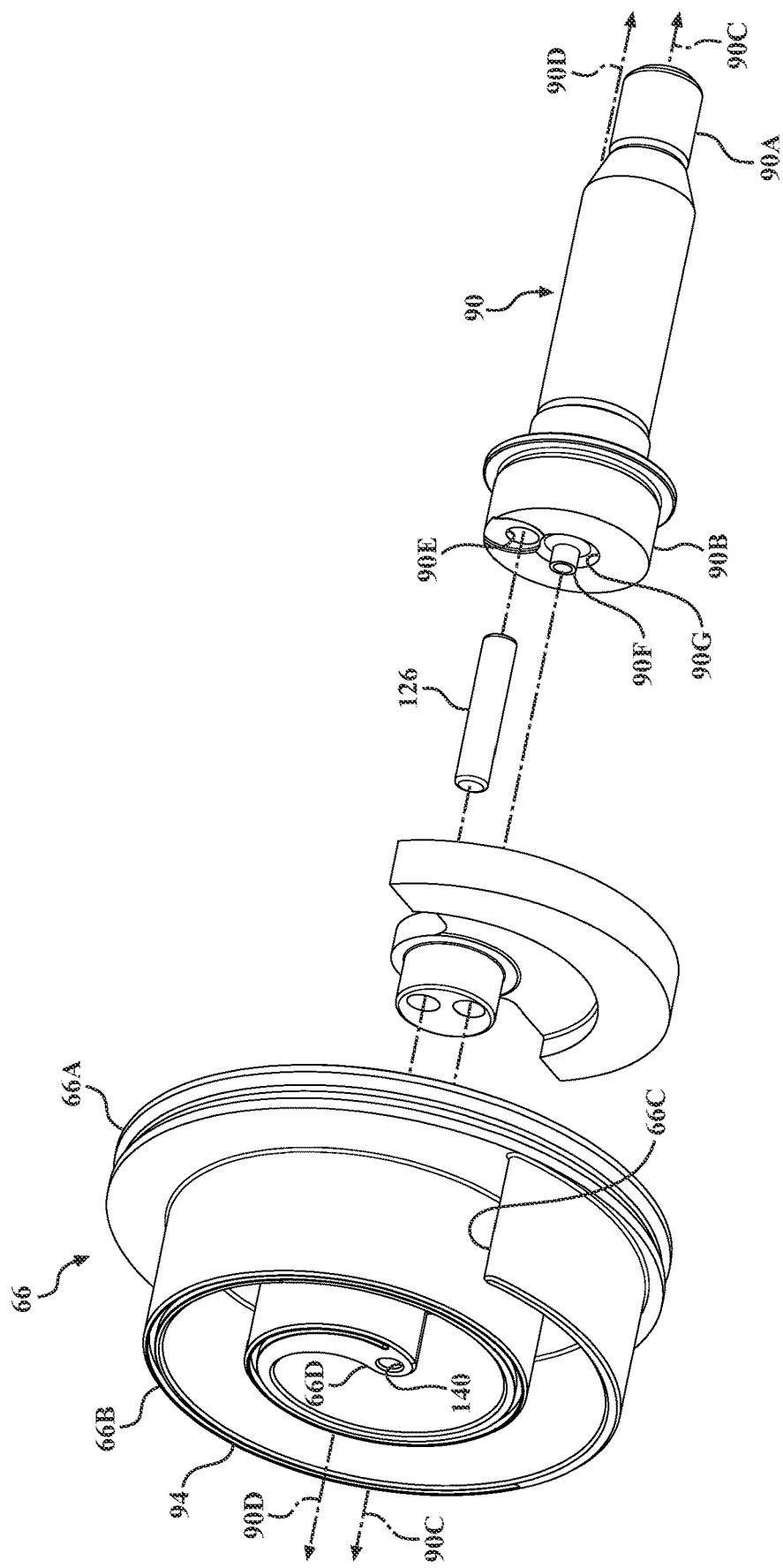
FIG. 16B is a second perspective view of the portion of the electric compressor of FIG. 16A.
Figure 16C:
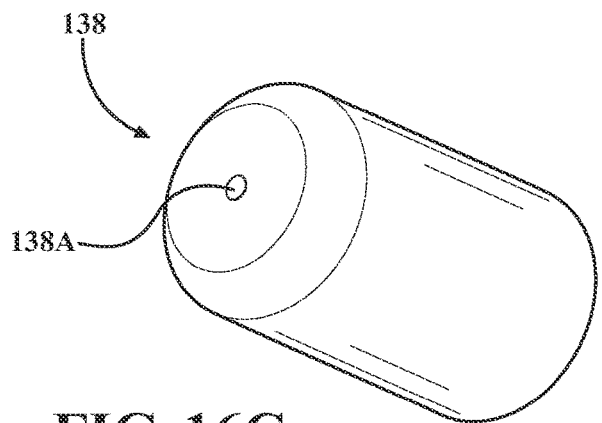
FIG. 16C is a perspective view of a plug of the compression device of FIG. 13.

The fixed scroll 26 is mounted within the center housing 24. As shown in FIGS. 9 and 13, the fixed scroll 26 has a fixed scroll base 26A and a fixed scroll lap 26B extending away from the fixed scroll base 26A towards the orbiting scroll 66. As shown in FIGS. 16A-16B, the orbiting scroll 66 has an orbiting scroll base 66A and an orbiting scroll lap 66B extending from the orbiting scroll base 66A towards the fixed scroll 26. The laps 26A, 66A have a tail end 26C, 66C adjacent an outer edge of the respective scroll 26A, 66B and scroll inward towards a respective center end 26D, 66D.

Respective tip seals 94 are located within a slot 26E, 66E located at a top surface of the fixed scroll 26 and the orbiting scroll 66, respectively. The tip seals 94 are comprised of a flexible material, such as a Polyphenylene Sulfide (PPS) plastic. When assembled, the tip seals 94 are pressed against the opposite base 26A 66A to provide a seal therebetween. In one embodiment, the slots 26E 66E, are longer than the length of the tip seals 94 to provide room for adjustment/movement along the length of the tip seals 94.

With reference to FIGS. 17A-17I, refrigerant enters the compression device 12 from the compression intake volume 76. In FIGS. 17A-17I, a cross-section view of the fixed scroll 26 shown and the top of the orbiting scroll 66 are shown.

As discussed in detail below, the fixed scroll lap 26A and the orbiting scroll lap 66A form compression chambers 80 in which low or unpressurized (saturation pressure) refrigerant enters from the compression device 12. As the orbiting scroll 66 moves to enable the compression chambers 80 to be closed off and the volume of the compression chambers 80 is reduced to pressurize the refrigerant. At any one time during the cycle, one or more compression chambers 80 are at different stages in the compression cycle. The below description relates just to one set of compression chambers 80 during a complete cycle of the electric compressor 10.

The refrigerant enters the compression chambers 80 formed between the orbiting scroll lap 66A and the fixed scroll lap 26A. During a cycle of the compressor 10, the refrigerant is transported towards the center of these chambers. The orbiting scroll 66 orbits in a circular motion indicated by arrow 78 formed by the relative position of the orbiting scroll 66 relative to the fixed scroll 26 is shown during one cycle of the electric compressor 10.

Figure 17A:
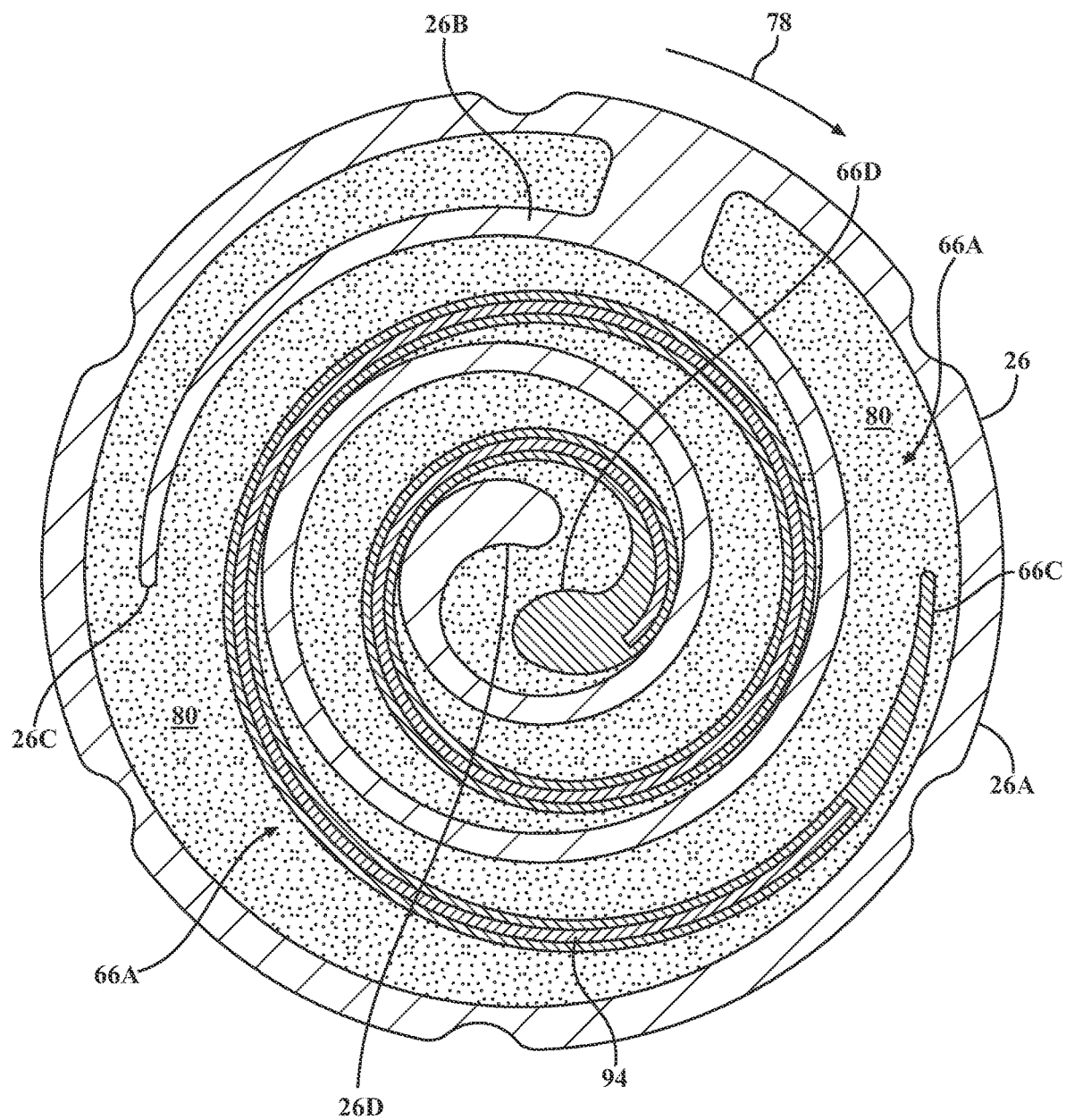
FIGS. 17A-17J are graphic representations of a fixed scroll and an orbiting scroll of a compression device of the electric compressor of FIG. 1, according to an embodiment of the present invention.
Figure 17B:
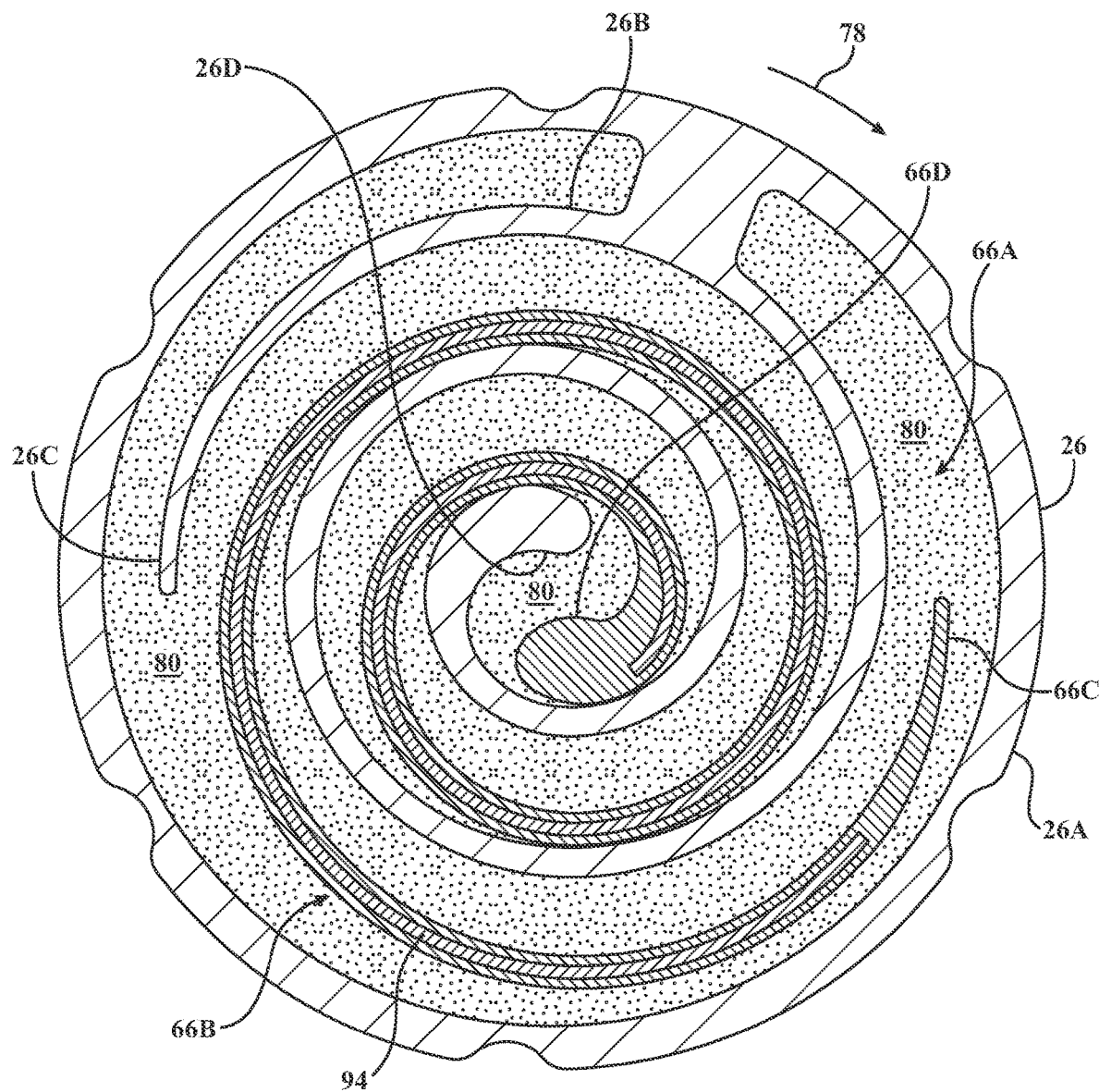
Figure 17C:
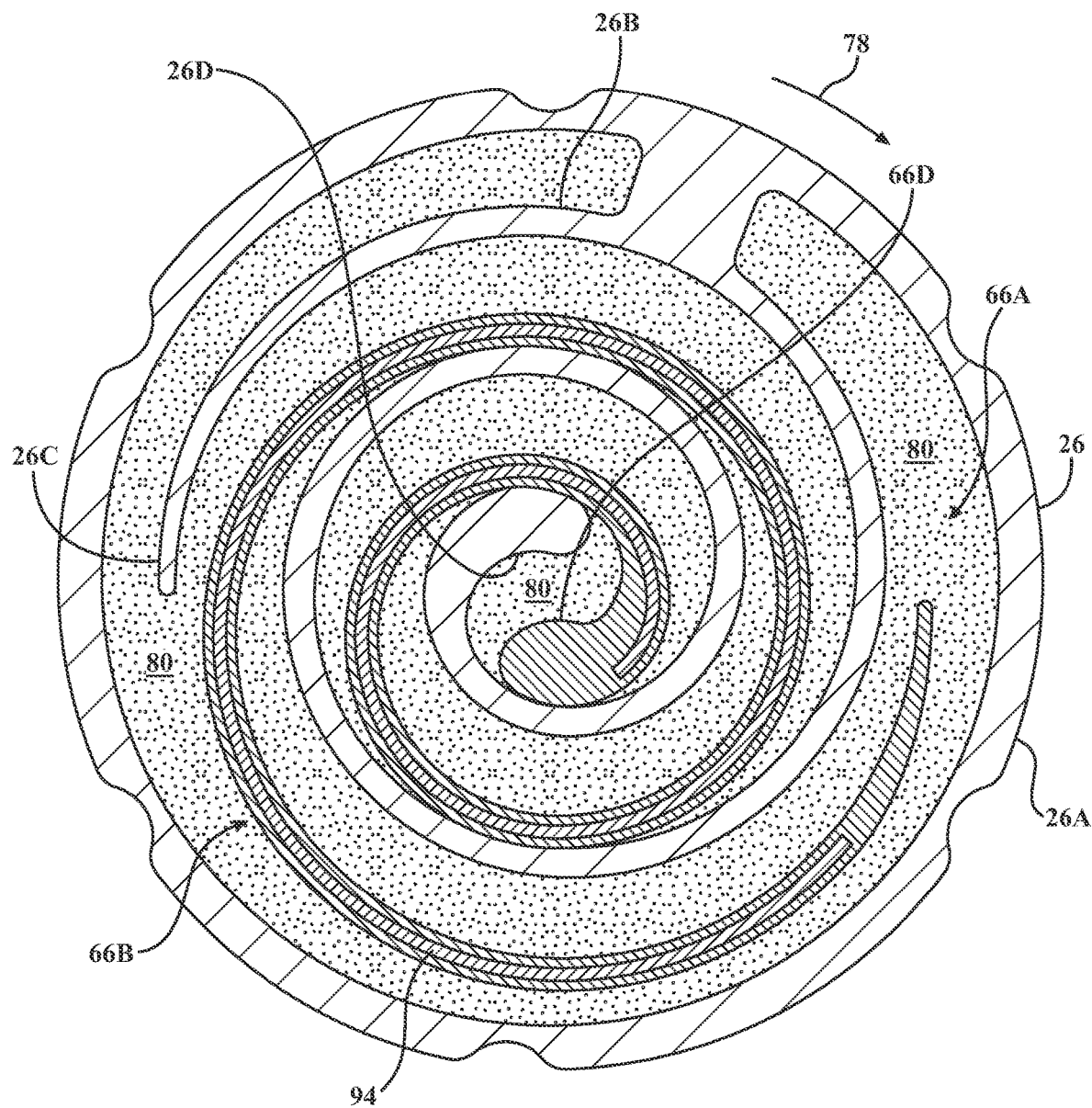
Figure 17D:
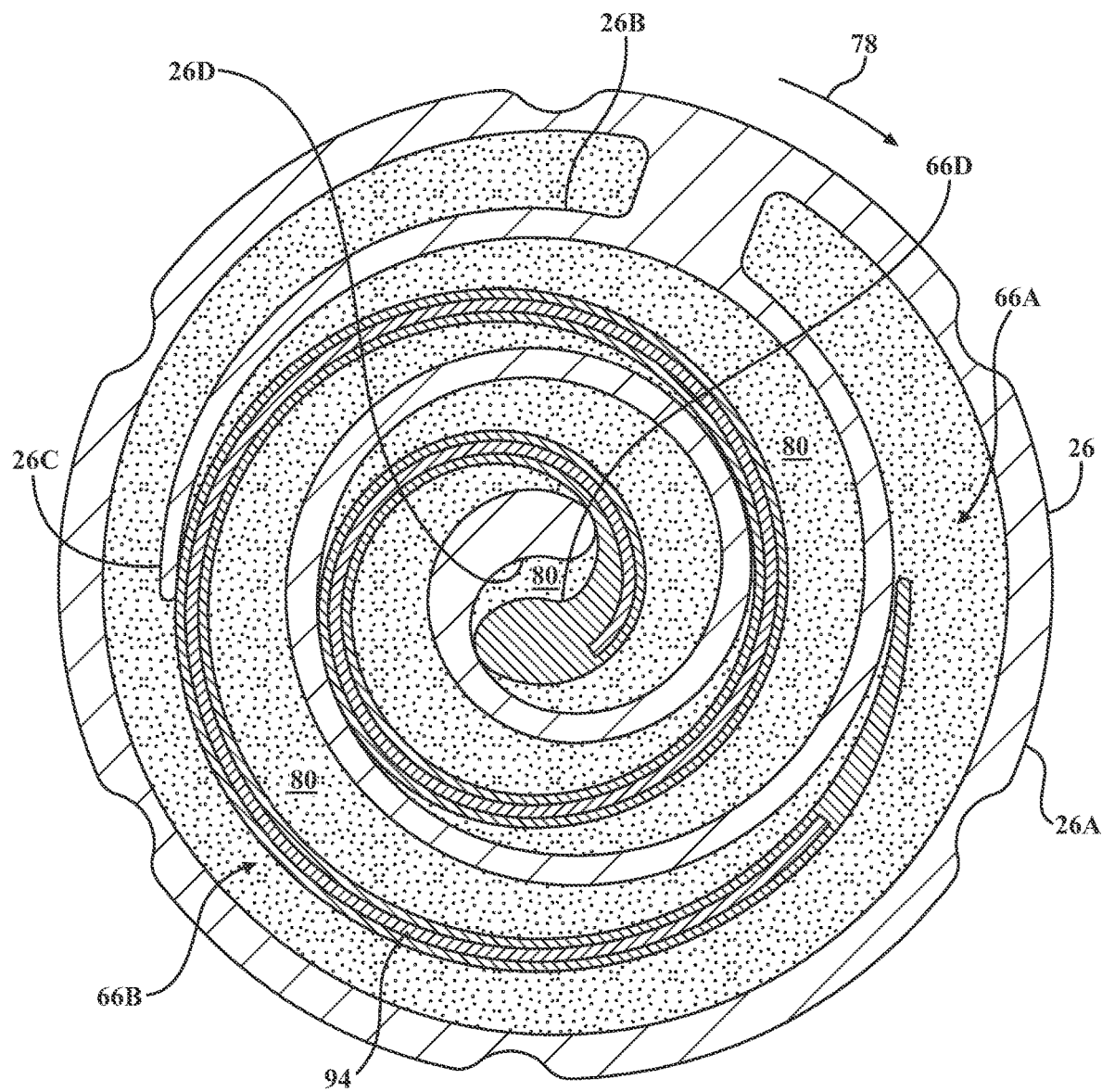
Figure 17E:
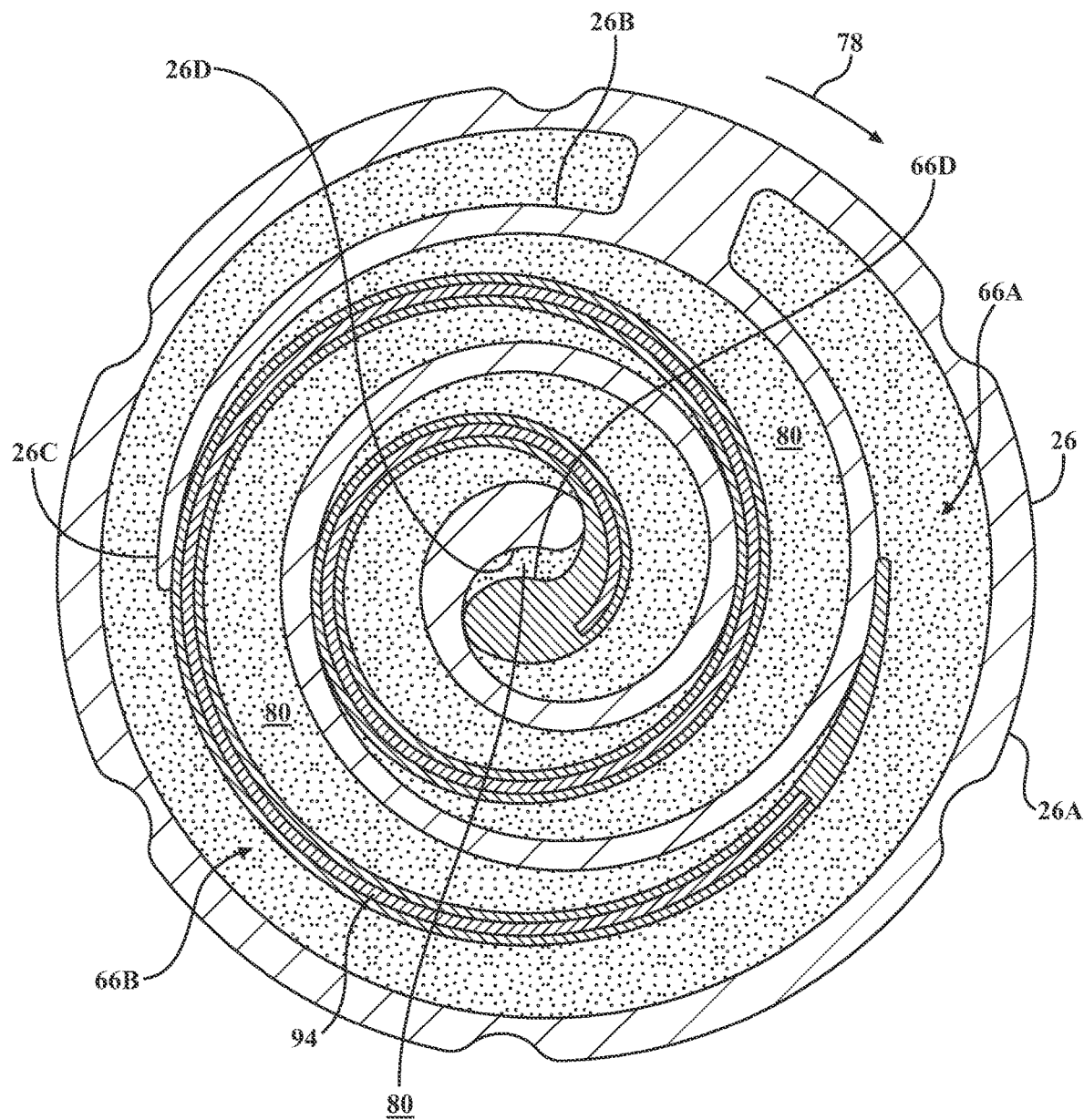
Figure 17F:
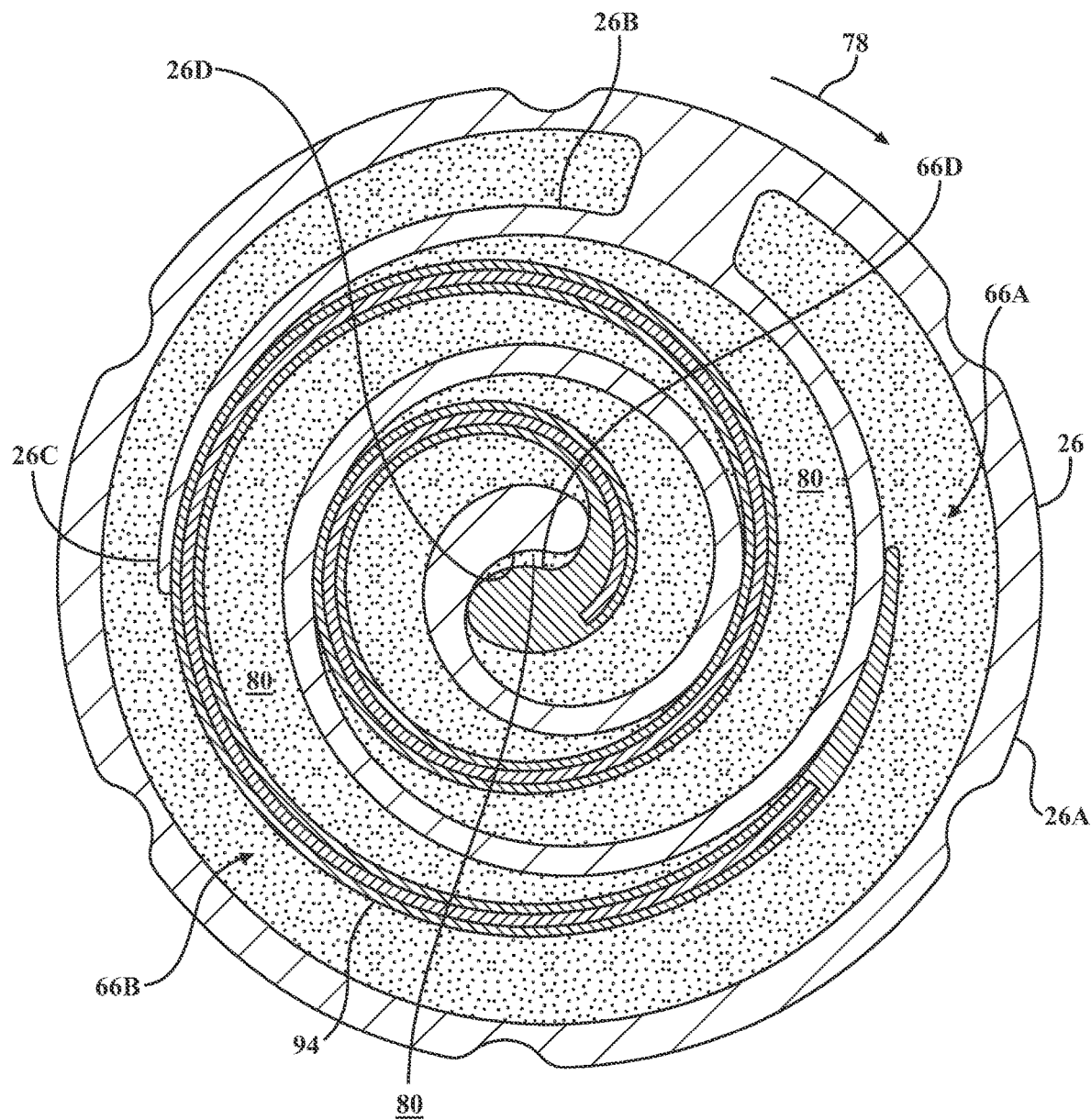
Figure 17G:
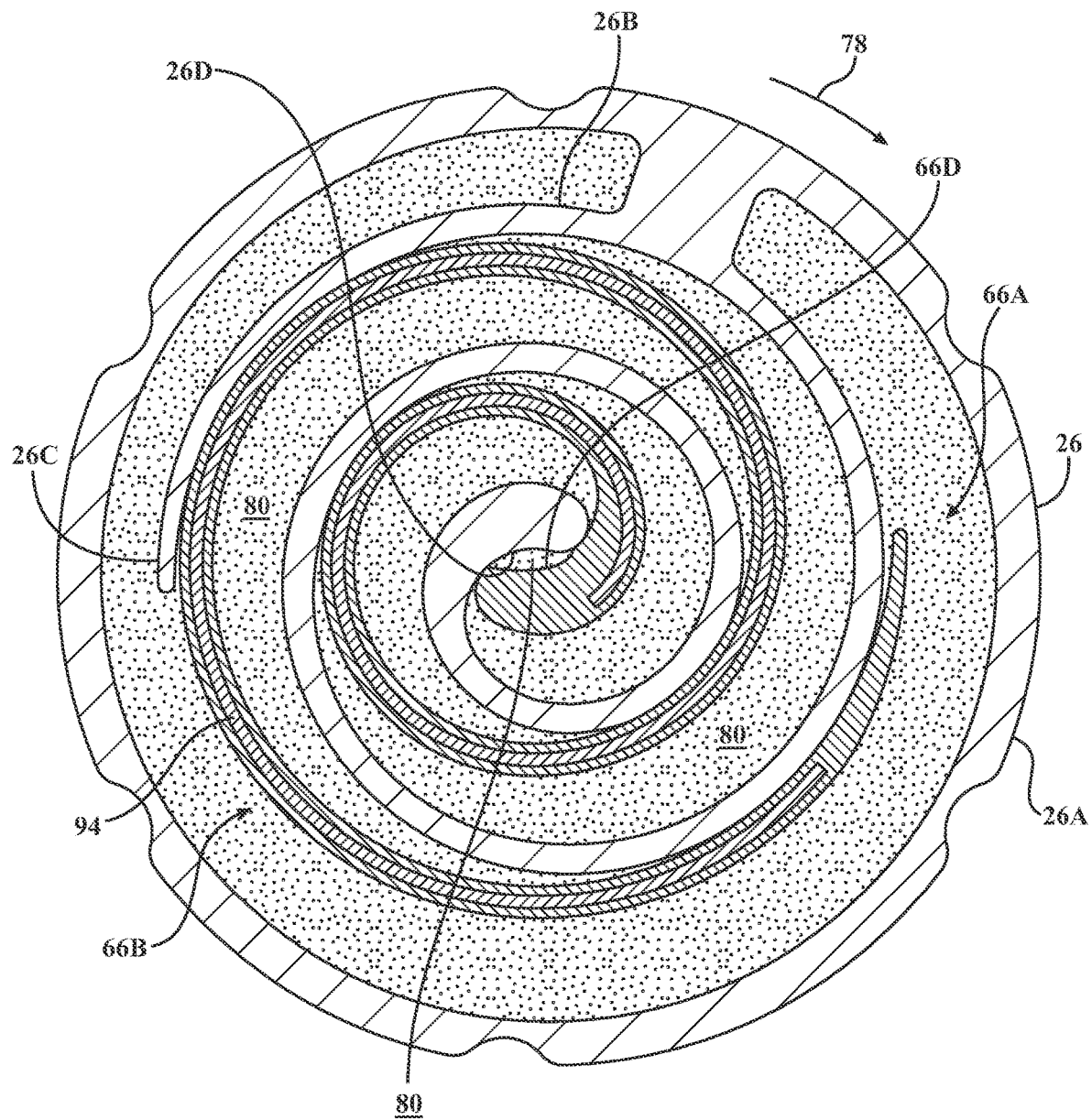
Figure 17H:
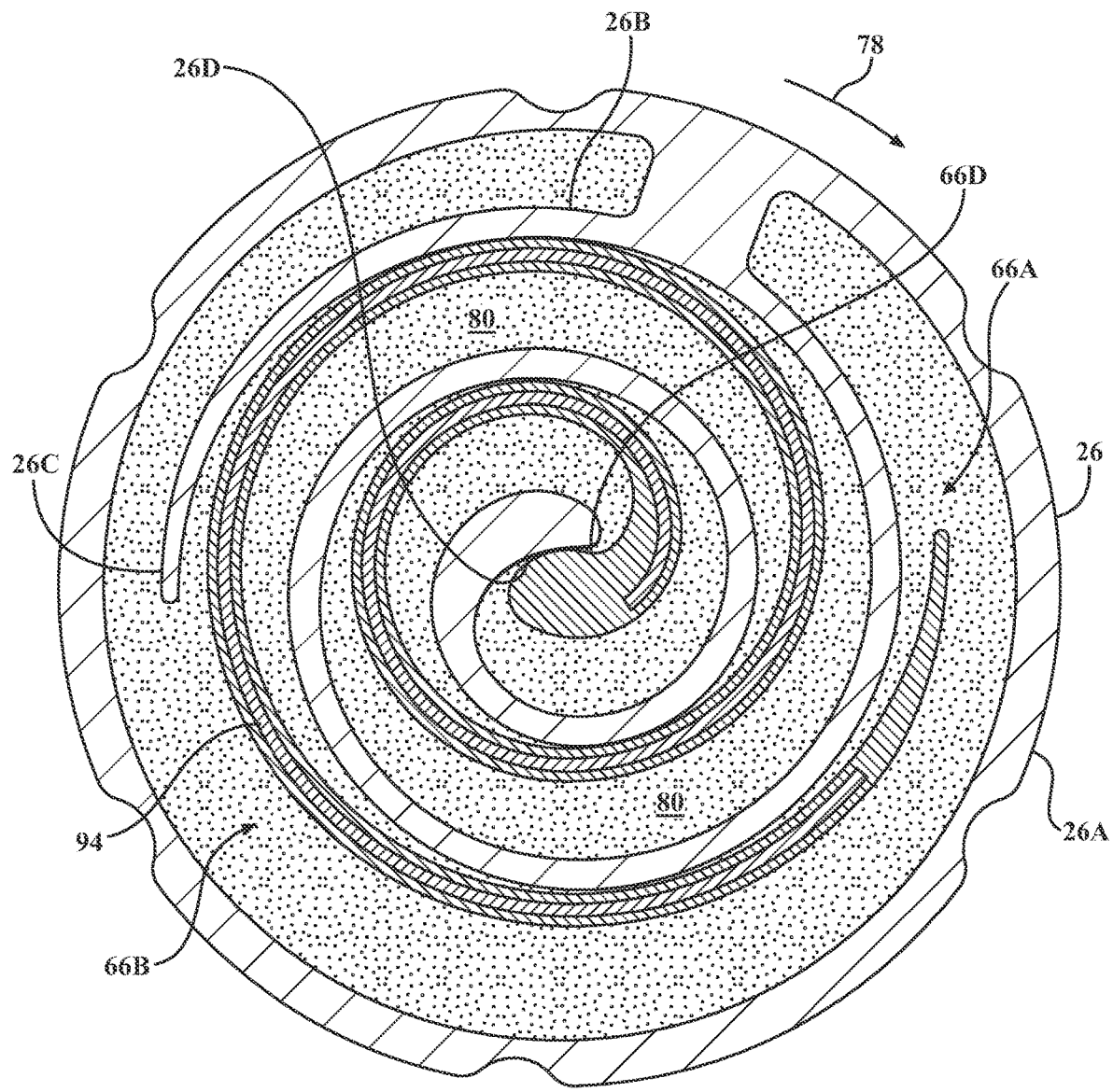
Figure 17I:
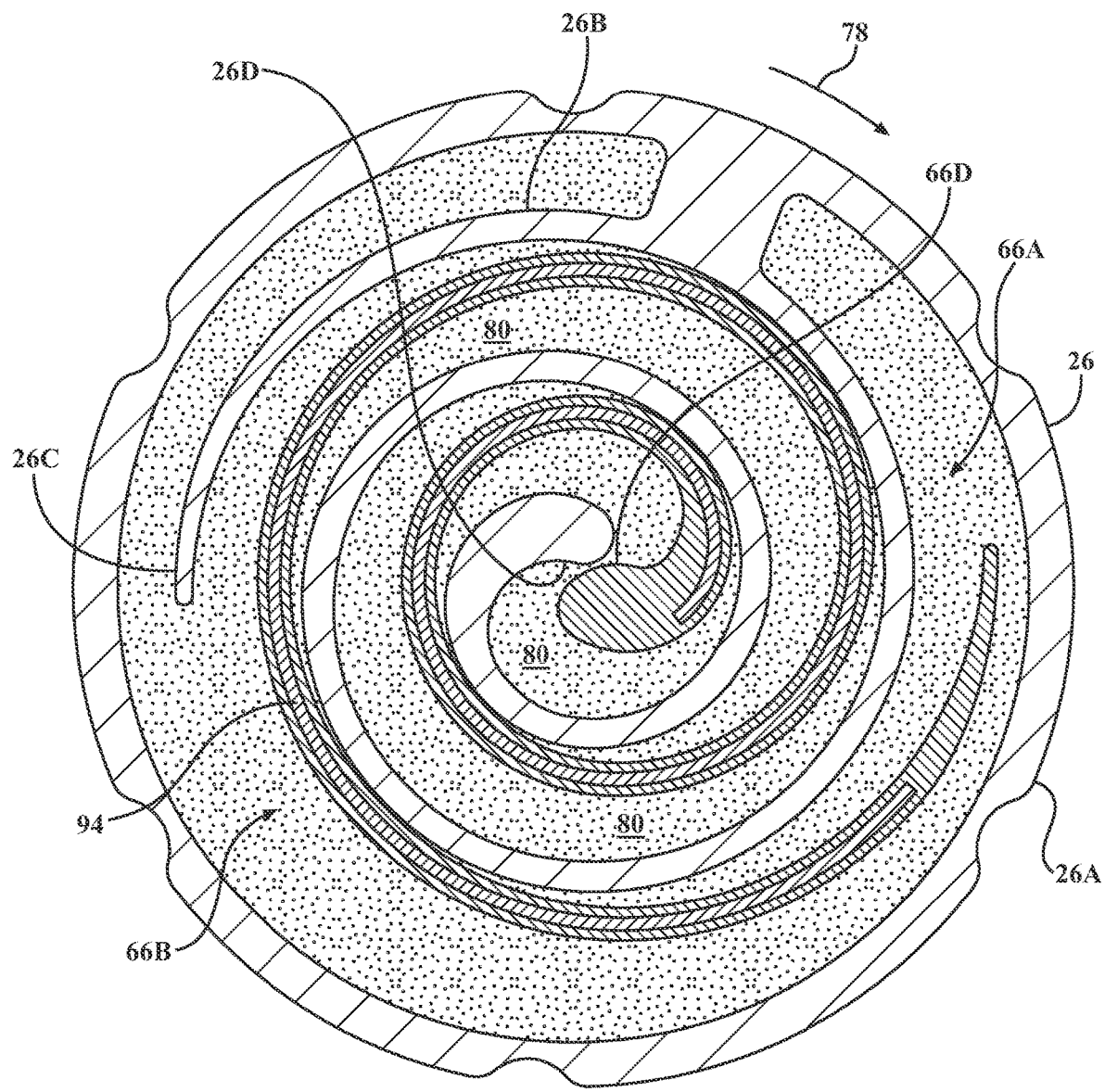
Figure 17J:
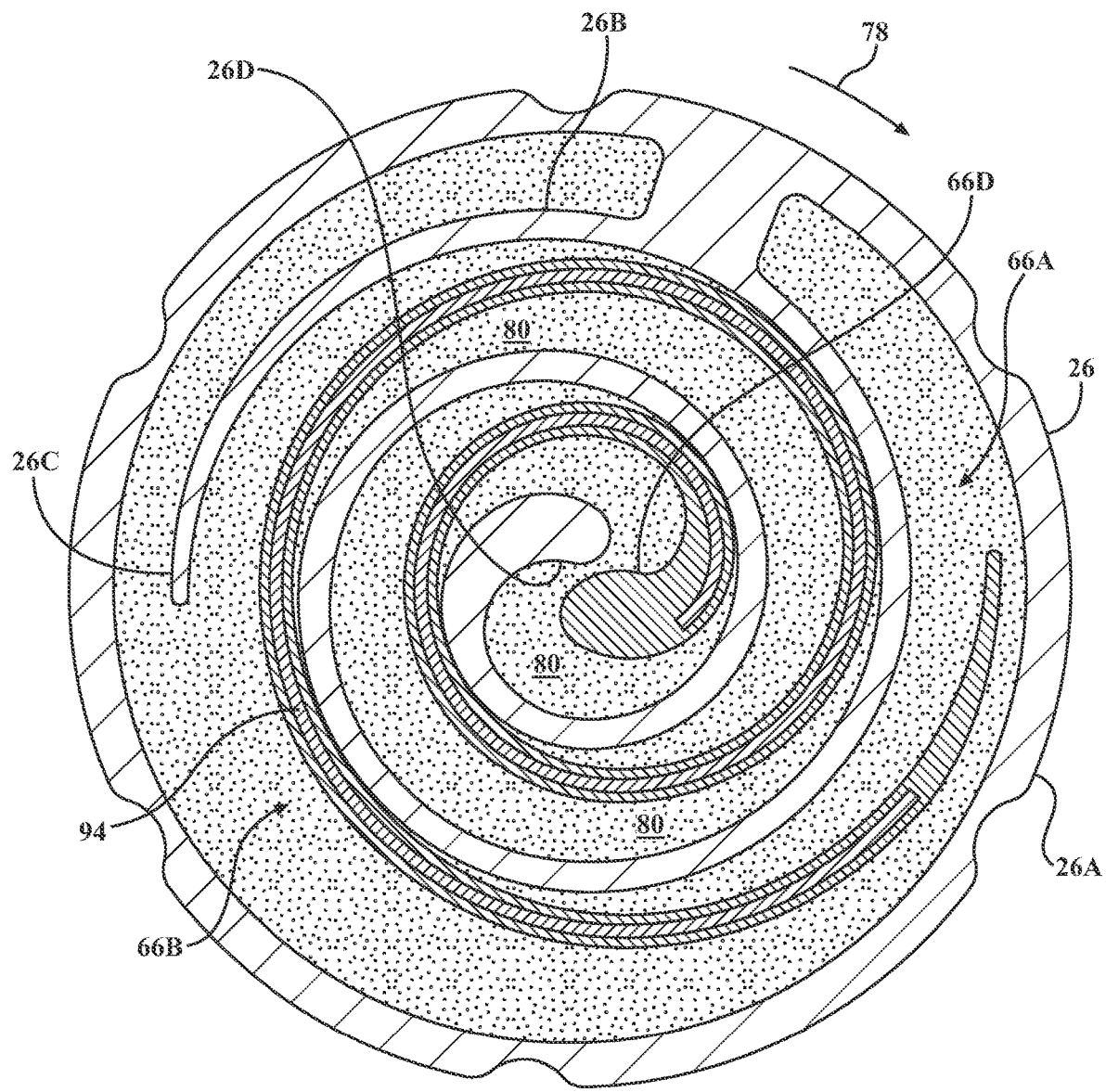

In FIG. 17A, the position of the orbiting scroll 66 at the beginning of a cycle is shown. As shown, in this initial position, the tail ends 16B, 66B are spaced apart from the other scroll lap 66B 16B. At this point, the compression chambers 80 are open to the compression intake volume 76 allowing refrigerant under low pressure to fill the compression chambers 80 from the compression intake volume 76. As the orbiting scroll 66 moves along path 78, the space between the tail ends 16A, 66A and the other scroll 66, 16 decreases until the compression chambers 80 are closed off from the compression intake volume 76 (FIGS. 17B-17E). As the orbiting scroll 66 continues to move along 78, the volume of the compression chambers 80 is further reduced, thus pressurizing the refrigerant in both compression chambers 80 (FIGS. 17F-H). As shown in FIGS. 17I-18J, as the orbiting scroll 66 continues to orbit, the two compression chambers 80 are combined into a single volume. This volume is further reduced until the pressurized refrigerant is expelled from the compression device 18 (see below)

As discussed below, the refrigerant enters chambers formed between the walls of the orbiting scroll 66 and the fixed scroll 26. During the cycle of the compressor 10, the refrigerant is transported towards the center of these chambers. The orbiting scroll 66 orbits or moves in a circular motion indicated by arrow 78 formed by the relative position of the orbiting scroll 66 relative to the fixed scroll 26 is shown during one cycle of the electric compressor 10.

Returning to FIG. 1, the front cover 28 forms a discharge volume 82. The discharge volume 82 is in communication with the refrigerant output port 70. As discussed in more detail below, pressurized refrigerant leaves the compression device 18 through a central orifice 84A and two side orifices 84B in the fixed scroll 26 (see FIGS. 18C and 18E) The release of pressurized refrigerant is controlled by a reed mechanism 86. In the illustrated embodiment, the reed mechanism 86 includes three reeds: a central reed 87A and two side reeds 87B corresponding to the central orifice 84A and the two side orifices 84B (see below).

Figure 18A:
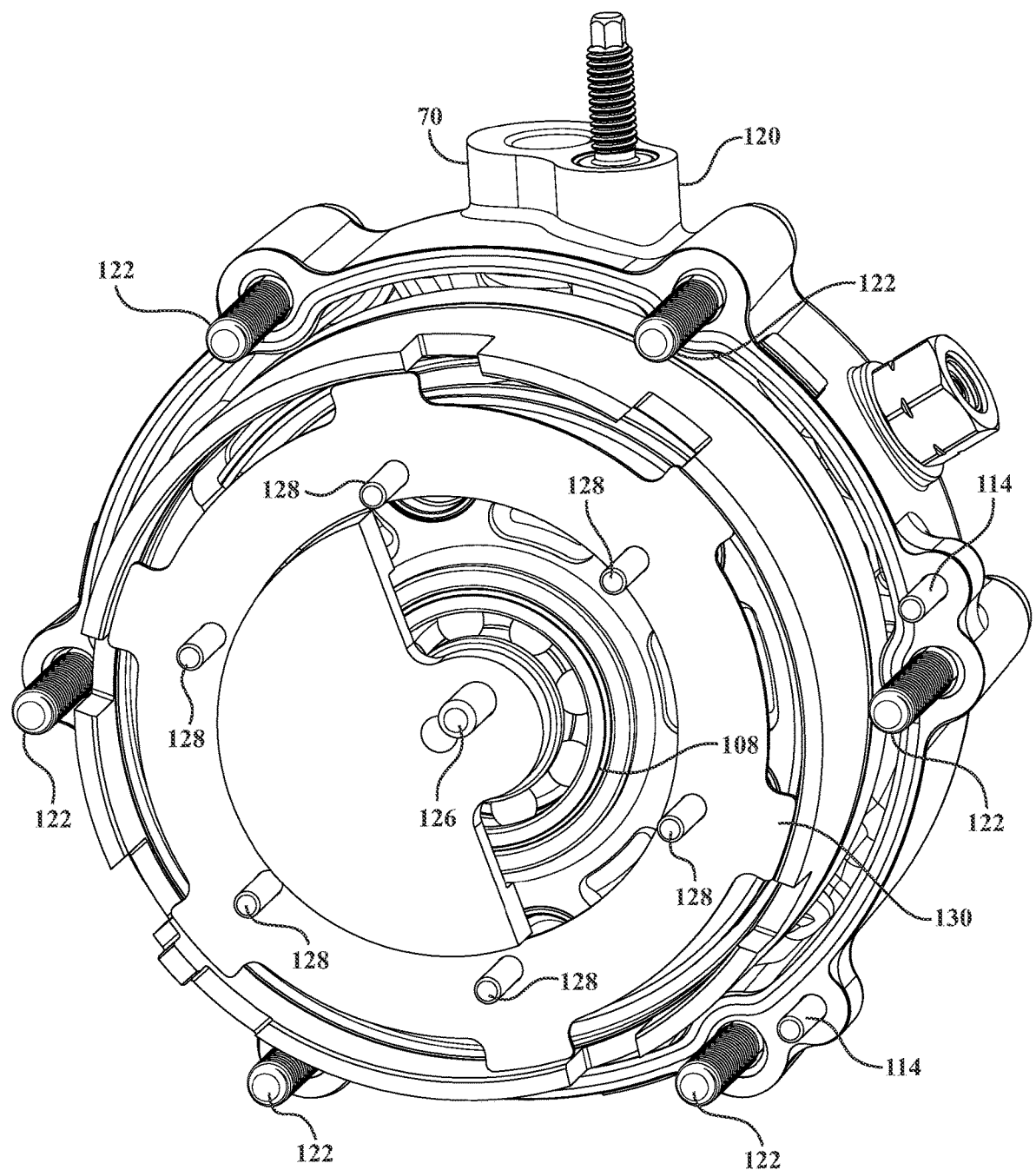
FIG. 18A is a first perspective view of a portion of the compression device of FIG. 13, including a fixed scroll and an orbiting scroll.
Figure 18B:
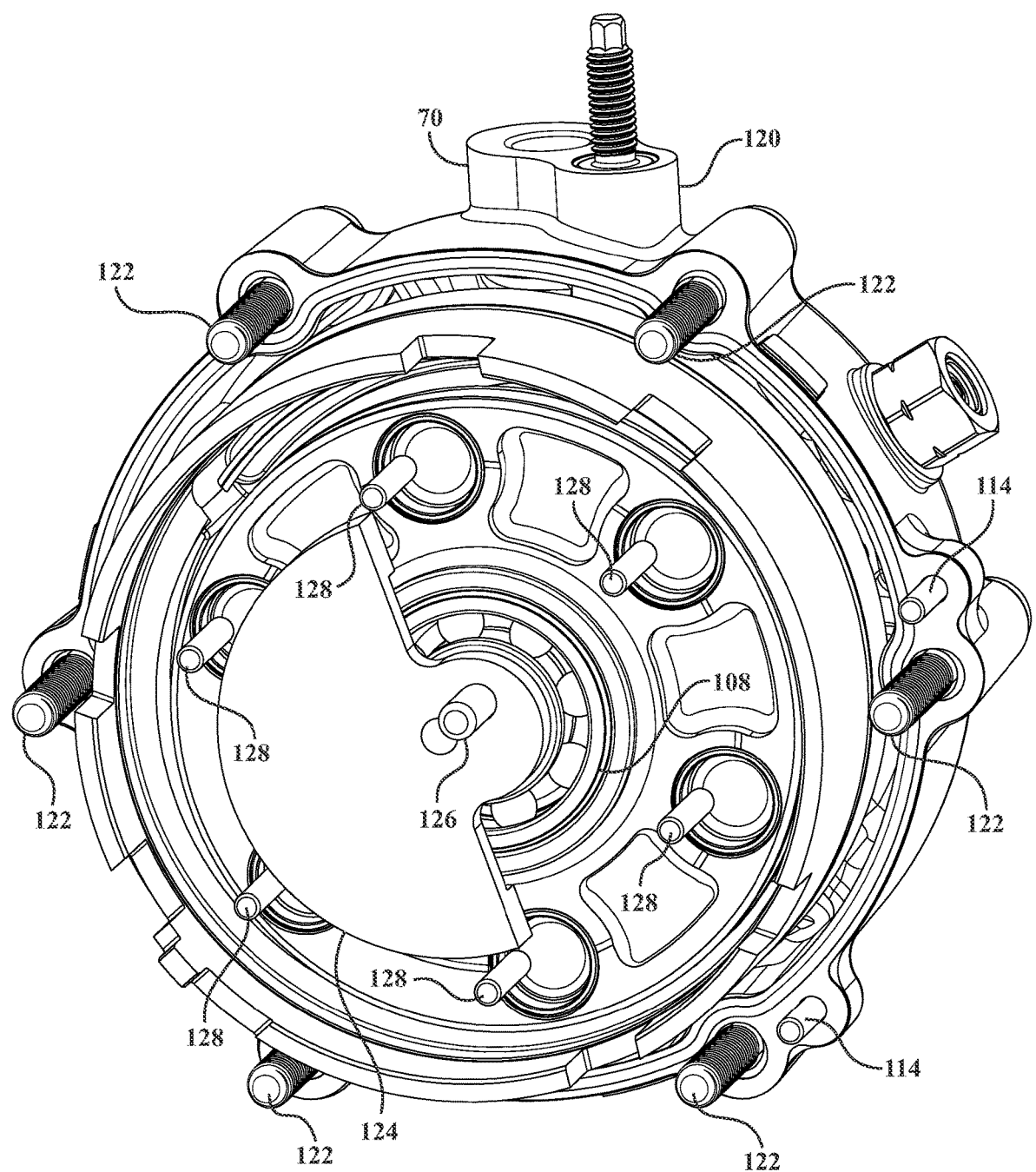
FIG. 18B is a second perspective view of the portion of the compression device of FIG. 18A.
Figure 18C:
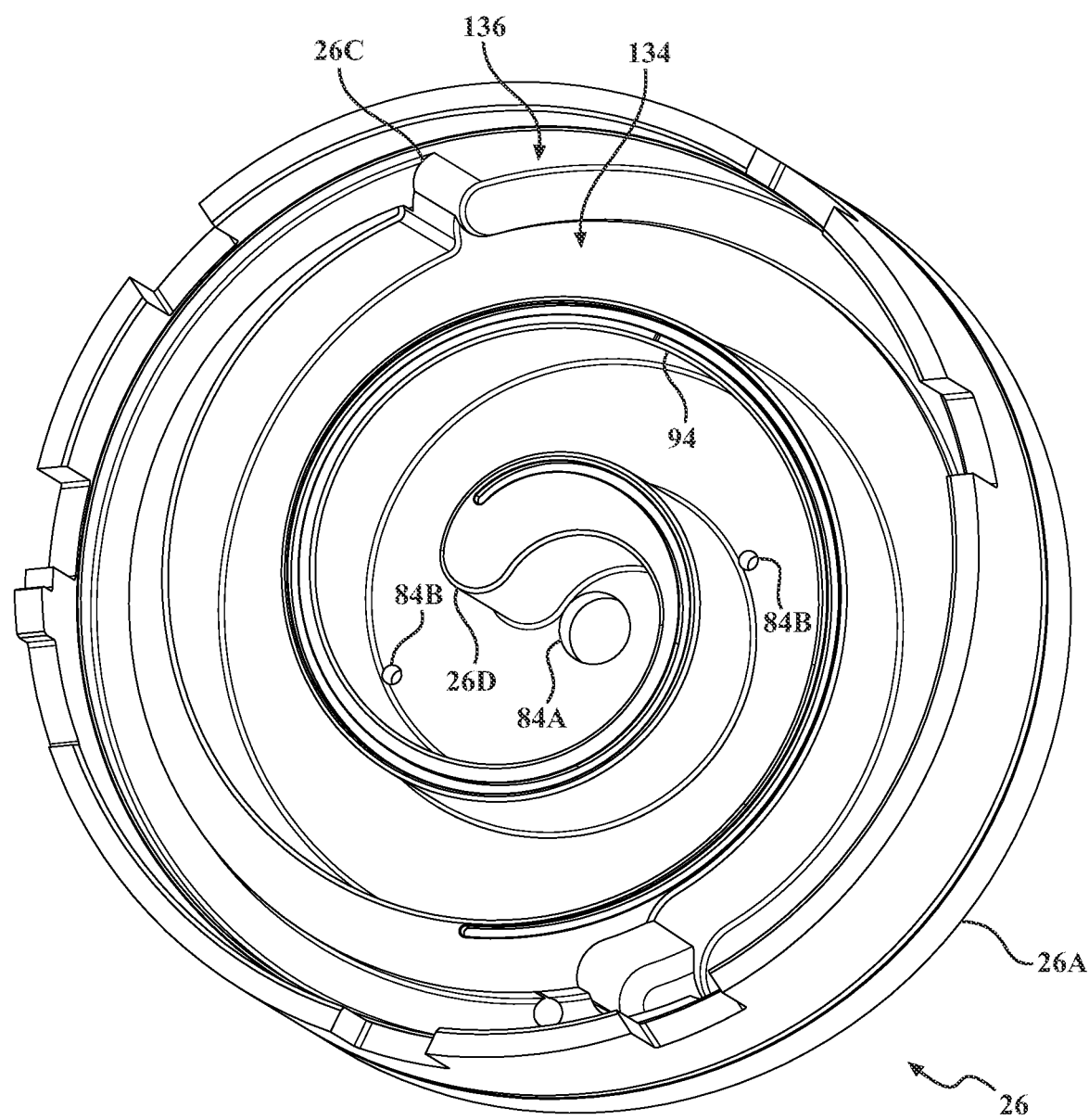
FIG. 18C is a first perspective view of the fixed scroll of the compression device of FIG. 13.
Figure 18D:
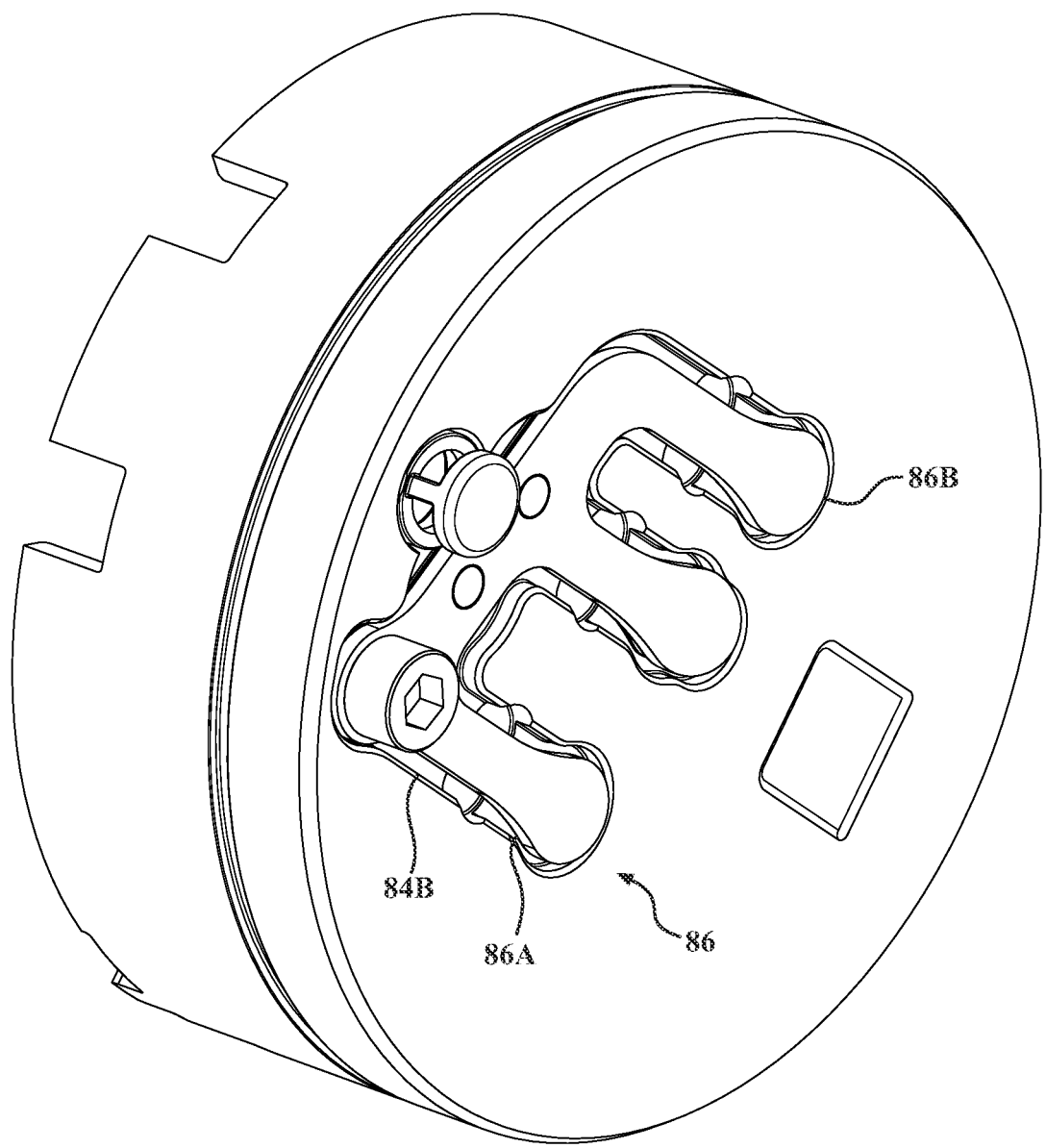
FIG. 18D is a second perspective view of the fixed scroll of the compression device of FIG. 13.
Figure 18E:
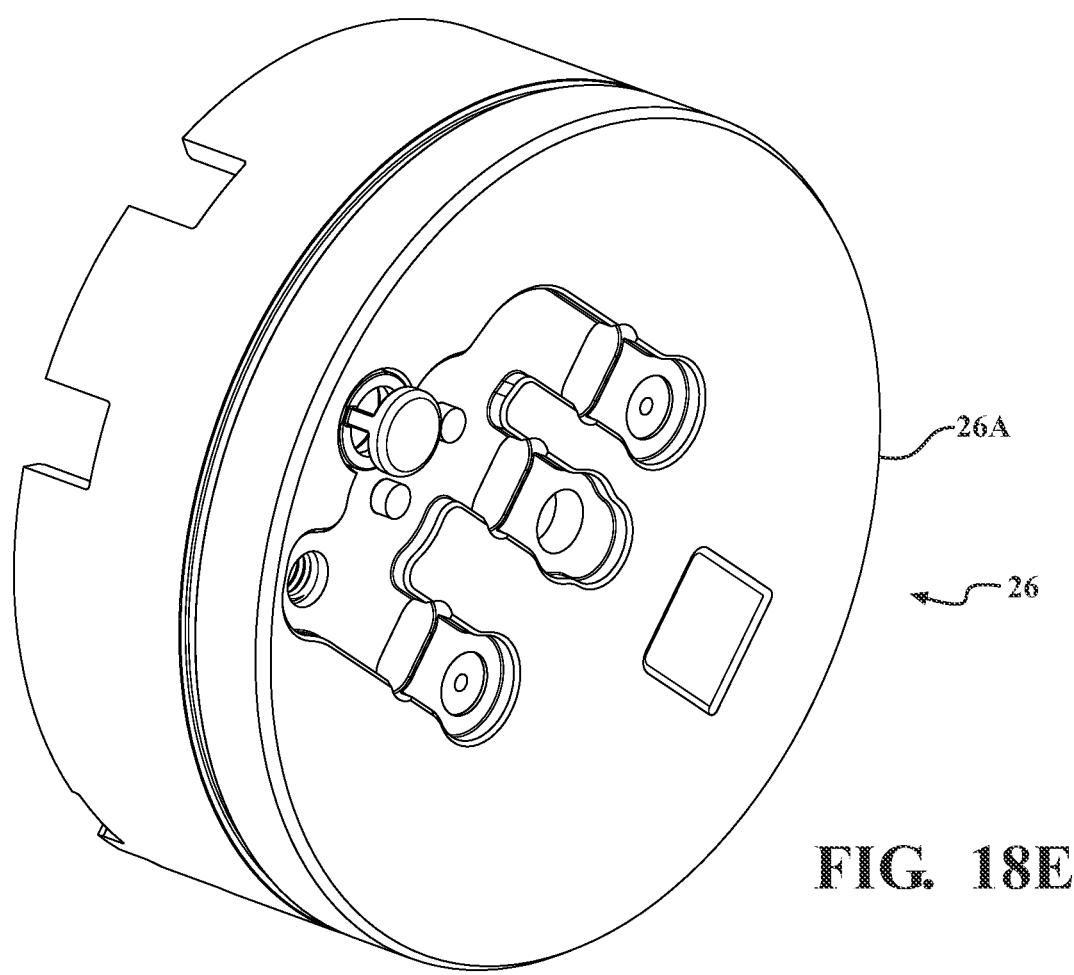
FIG. 18E is a third perspective view of the fixed scroll of the compression device of FIG. 13.
Figure 18F:
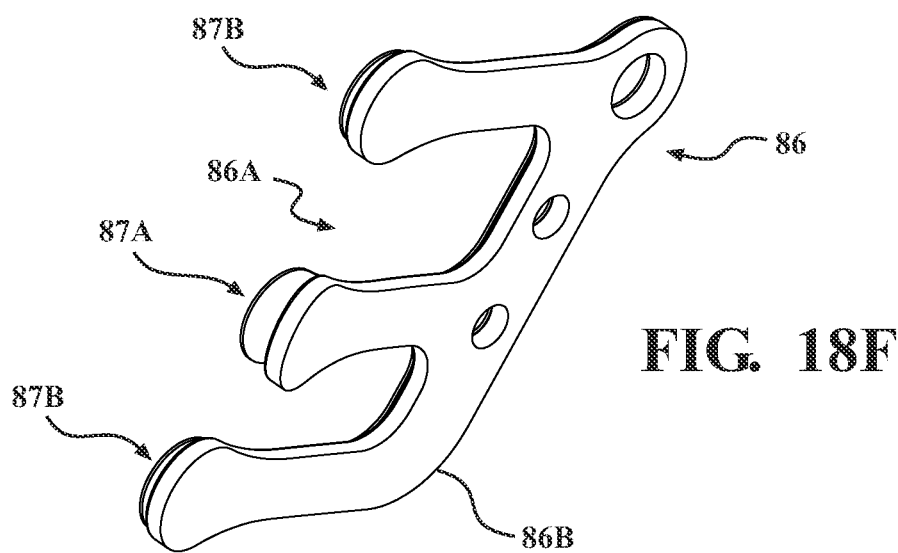
FIG. 18F is a perspective view of a reed mechanism associated with the compression device of FIG. 13.

As shown in FIGS. 18D and 18E, in the illustrated embodiment, the reed mechanism 86 includes a discharge reed 86A and a reed retainer 86B. The discharge reed 86A is made from a flexible material, such as steel. The characteristics, such as material and strength, are selected to control the pressure at which the pressurized refrigerant is released from the compression device 18. The reed retainer 86B is made from a rigid, inflexible material such as stamped steel. The reed retainer 86 controls or limits the maximum displacement of the discharge reed 86A relative to the fixed scroll 26. Generally, oil is directed rearward through the motor section 16, providing lubrication and cooling to the rotating components of the electric compressor 10, such as the rotor 60, the drive shaft 90 and all beatings 62, 64, 108. Oil is drawn upward towards the top of the motor 54 by the rotation of the rotor 60. From there, oil enters the interior of the motor 54 to lubricate the second ball bearing 64 and the oil by the rotational forces within the motor section 16 may impact against the motor side 22A of the inverter housing 22. The oil is further directed by the motor side 22A into the ball bearing 62, further discussed below In the illustrated embodiment, the read mechanism 86 is held or fixed in place via a separate fastener 89. As shown in FIGS. 18E and 18F, the reed mechanism 86 incudes a plurality of apertures 86C which are configured to receive associated posts 83A on the fixed scroll 26. As shown in FIG. 18E, the back surface of the fixed scroll 26 includes a bezel 83B surrounding the orifices 84 which assists in tuning the pressure at which refrigerant exits the compression device 18. Additionally, a debris collection slot 83C collects debris near the orifices 84A, 84B to prevent from interference with the reed mechanism 86.

As shown in FIG. 9, the path of refrigerant through the electric compressor is indicated by dashed arrow 72.

The electric compressor 10 utilizes oil (not shown) to provide lubrication to the between the components of the compression device 18 and the motor 54, for example, between the orbiting scroll 66 and the fixed scroll 26 and within the ball bearings 62, 64. The oil intermixes with the refrigerant within the compression device 18 and the motor 54 and exits the compression device 18 via the orifice 84. As discussed in more detail below, the oil is separated from the compressed refrigerant within the front cover 28 and is returned to the compression device 18.

Figure 3:
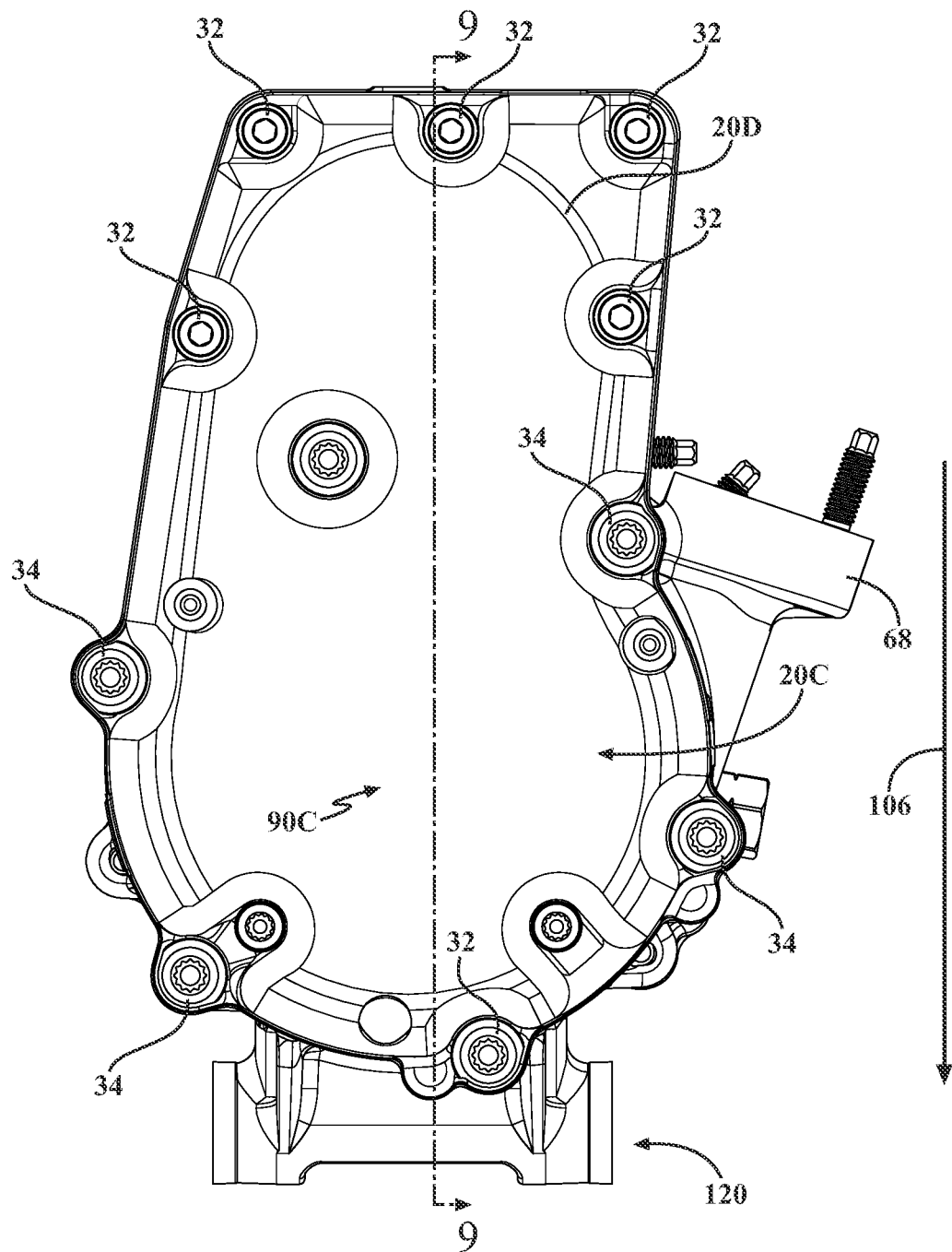
FIG. 3 is a first side view of the electric compressor of FIG. 1A.
Figure 4:
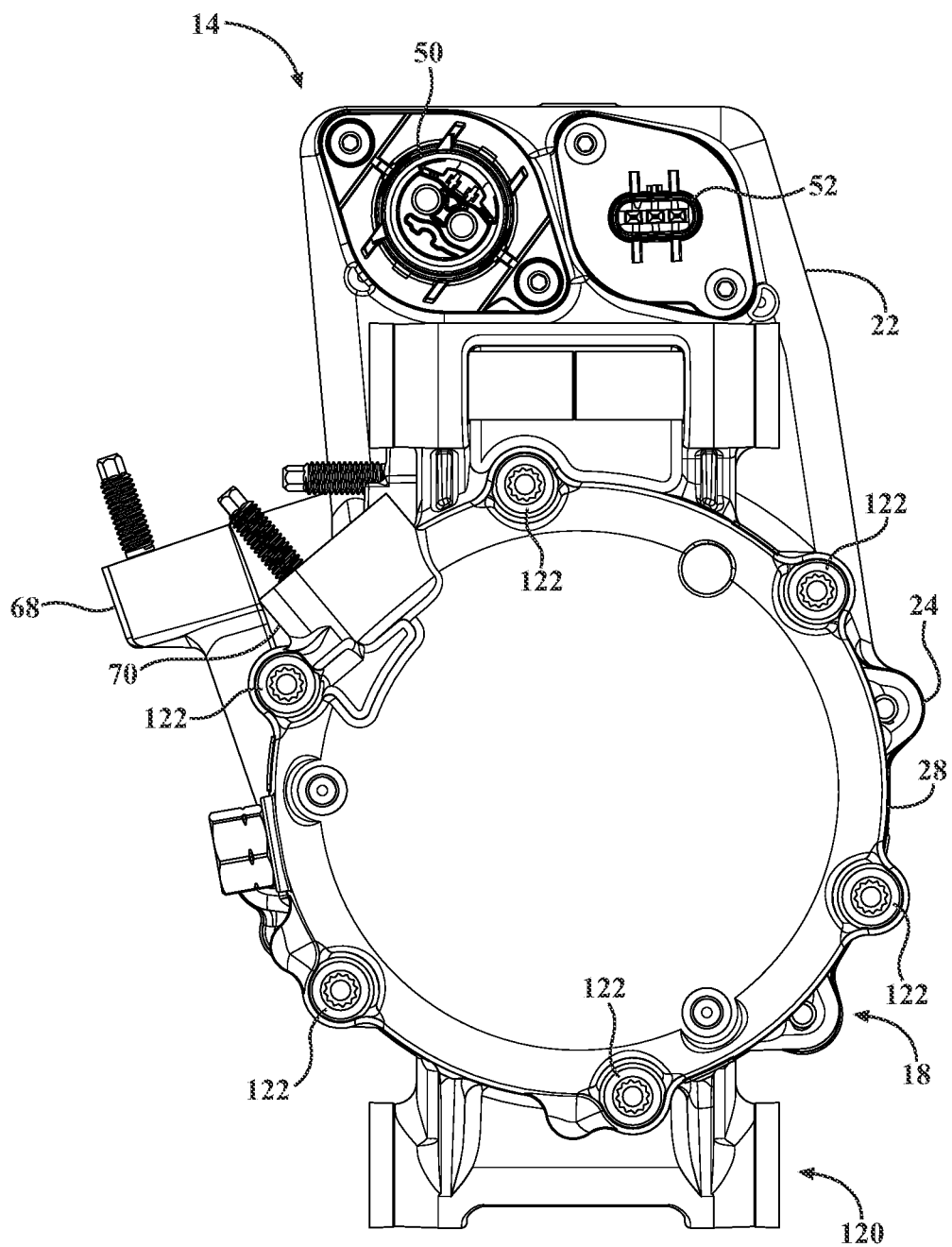
FIG. 4 is a second side view of the electric compressor of FIG. 1A.
Figure 5:
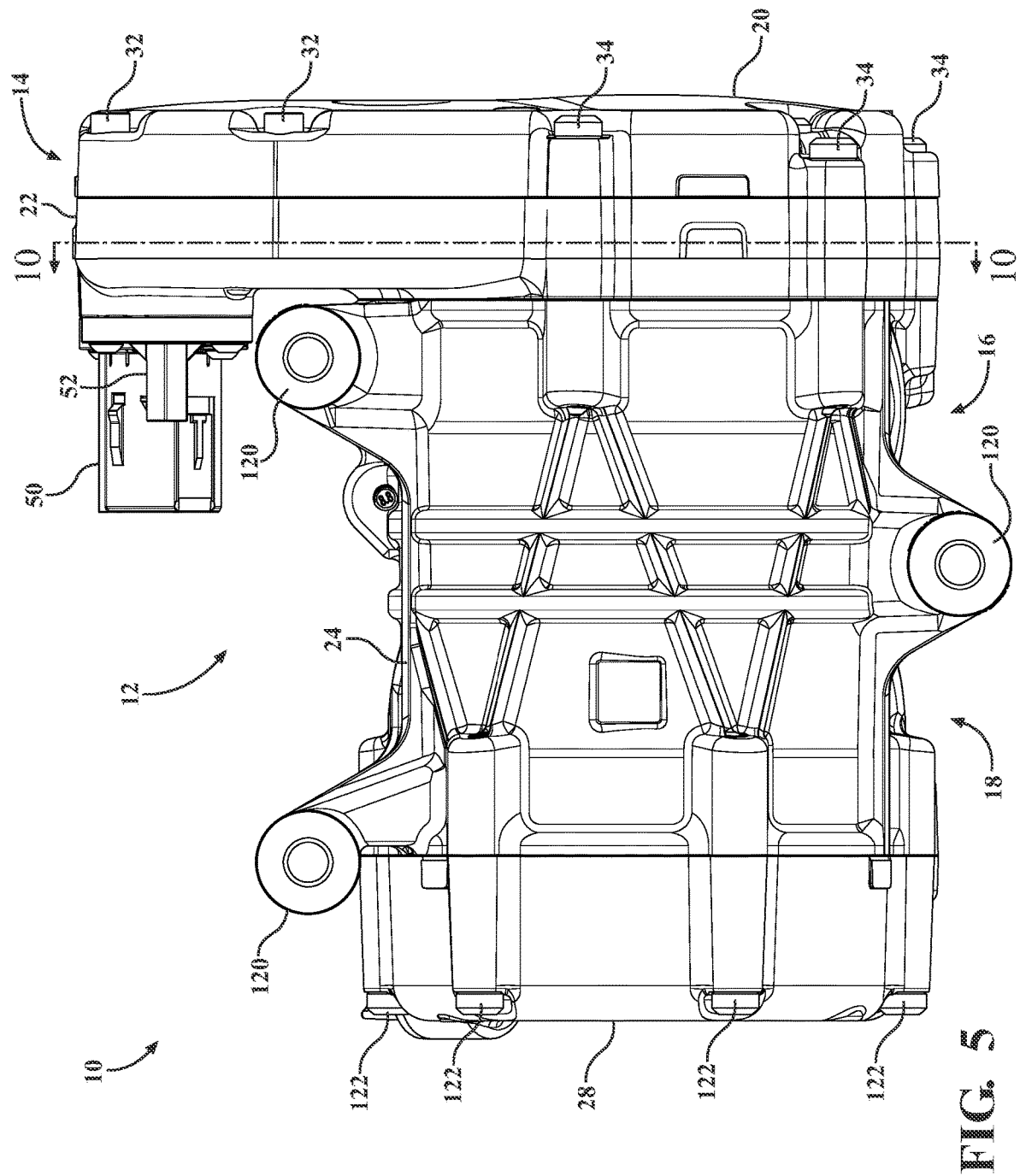
FIG. 5 is a front view of the electric compressor of FIG. 1A.

An oil separator 96 facilitates the separation of the intermixed oil and refrigerant. In the illustrated embodiment, the oil separator 96 is integrated within the front cover 28. The front cover 28 further defines an oil reservoir 98 which collects oil from the oil separator 96 before the oil is recirculated through the motor 54 and motor cavity 56 and the compression device 18. In use, the electric compressor 10 is generally orientated as shown in FIGS. 3-5, such that gravity acts as indicated by arrow 106 and oil collects within the oil reservoir 98.

With reference to FIG. 9, the general path oil travels from the bottom of the electric compressor 10 through the compression device 18, out the orifice 84 to the discharge volume 82 of the front cover 28 and back to the compression device 18 is shown by arrow 88.

In the illustrated embodiment, the front cover 28 is mounted to the center housing 24 by a plurality of bolts 122 inserted through respective apertures therein and threaded into apertures in the center housing 24. A fixed head gasket 110 and a rear heard gasket 112, are located between the center housing 24 and the fixed scroll 26 to provide sealing.

An oil separator 96 facilitates the separation of the intermixed oil and refrigerant. Generally, the oil separator 96 only removes some of the oil within the intermixed oil and refrigerant. The separator oil is stored in an oil reservoir and cycled back through the compression device 18, where the oil is mixed back in with the refrigerant.

In the illustrated embodiment, the oil separator 96 is integrated within the front cover 28. The front cover 28 further defines an oil reservoir 98 which collects oil from the oil separator 96 before the oil is recirculated through the motor 54 and motor cavity 56 and the compression device 18. In use, the electric compressor 10 is generally orientated as shown in FIGS. 3-5, such that gravity acts as indicated by arrow 106 and oil collects within the oil reservoir 98. With reference to FIG. 9, the general path oil travels from the bottom of the electric compressor 10 through the compression device 18, out the orifice 84 to the discharge volume 82 of the front cover 28 and back to the compression device 18 is shown by arrow 88. As shown, the oil is drawn back up into the compression device 18 where the oil mixed back into or with the refrigerant.

As stated above, refrigerant, which is actually a mixture of refrigerant and oil enters the electric compressor 10 via the refrigerant inlet port 70. The intermix of oil and refrigerant is drawn into the motor section 16, thereby providing lubrication and cooling to the rotating components of the electric compressor 10, such as the rotor 60, the drive shaft 90. Oil and refrigerant enters the interior of the motor 54 to lubricate the second ball bearing 64 and the oil by the rotational forces within the motor section 16, may impact against the motor side 22A of the inverter housing 22. The refrigerant and oil is further directed by the motor side 22A into the ball bearing 62, further discussed below.

Swing-Link Mechanism and Concentric Protrusion of the Drive Shaft

With specific reference to FIGS. 13-18B, in a first aspect of the electric compressor 10 of the disclosure, an electric compressor 10 includes a swing link mechanism 124 and the drive shaft 90 has a concentric protrusion 126. In one embodiment, the concentric protrusion 126 is integrally formed with the drive shaft 90. As discussed below, the swing-link mechanism 124 is used to rotate the orbiting scroll 66 in an eccentric orbit about the drive shaft 90.

In the prior art, the drive shaft is coupled to a swing-link mechanism by a drive pin and a separate eccentric pin, both of which are pressing into the drive shaft. The drive pin is used to rotate the swing link mechanism 124 which moves the orbiting scroll 66 along its eccentric orbit. The drive pin and the eccentric pin are inserted into respective apertures in the end of the drive shaft. The eccentric pin is used to limit articulation of the orbiting scroll 66 is the orbiting scroll 66 travels along the eccentric orbit. Neither the drive pin, nor the eccentric pin, are located along the central axis of the drive shaft. As the drive shaft is rotated, the drive pin and the eccentric pin are placed under considerable stress. This, both pins are composed from a hardened material, such as SAE 52100 bearing steel. In addition, the eccentric pin may require an aluminum bushing or other slide bearing to prevent damage to the eccentric pin, as the eccentric pin is used to limit the radial movement of the eccentric orbit of the orbiting scroll 66. Also, the prior art eccentric pin requires additional machining on the face of the drive shaft 90, including precise apertures for the drive pin, and eccentric pin.

As discussed in more detail below, the eccentric pin of the prior art is replaced with a concentric protrusion 90F.

In the illustrated embodiment, the scroll-type electric compressor 10 includes the housing 12, the refrigerant inlet port 68, the refrigerant outlet port 70, the drive shaft 90, the concentric protrusion 90F, the motor 54, the compression device 18, the swing link mechanism 124, a drive pin 126 and a ball bearing 108. The housing 12 defines the intake volume 74 and the discharge volume 82. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the scroll-type electric compressor 10 from the discharge volume 82. The drive shaft 90 is located within the housing 12 and has first and second ends 90A, 90B. The drive shaft 90 defines, and is centered upon, a center axis 90C.

The concentric protrusion 90F is located at the second end 90B of the drive shaft 90 and is centered on the center axis 90C. The concentric protrusion 90F and extends away from the drive shaft 90 along the central axis 90C. The concentric protrusion 90F includes a drive pin aperture 90E. The motor 54 is located within the housing 12 and is coupled to the drive shaft 90 to controllably rotate the drive shaft 90 about the center axis 90C. The drive pin 126 is located within the drive pin aperture 90E and extends away from the drive shaft 90. The drive pin 126 is parallel to the concentric protrusion 90F.

The concentric pin 90F may further include an undercut 90G, and the outer surface may be surface hardened or after treated with a coating or bearing surface. The concentric pin 90F may be further machined simultaneously with the drive shaft 90.

As explained above, the compression device 18 includes the fixed scroll 26 and the orbiting scroll 66. The fixed scroll 26 is located within, and being fixed relative to, the housing 12. The orbiting scroll 66 is coupled to the drive shaft 90. The orbiting scroll 66 and the fixed scroll 26 form compression chambers 80 (see above) for receiving the refrigerant from the intake volume 74 and for compressing the refrigerant as the drive shaft 90 is rotated about the center axis 90C. The orbiting scroll 66 has an inner circumferential surface 66E.

The swing-link mechanism 124 is coupled to the drive shaft 90 and has first and second apertures 124A, 124B for receiving the concentric protrusion 90F and the drive pin 126. The swing-link mechanism 124 further includes an outer circumferential surface 124C.

The ball bearing 108 is positioned between, and adjacent to each of, the inner circumferential surface 66E of the orbiting scroll 66 and the outer circumferential surface 124C of the swing-link mechanism 124. The drive shaft 90, drive pin 126, orbiting scroll 66 and swing-link mechanism 124 are arranged to cause the orbiting scroll 66 to rotate about the central axis 90C in an eccentric orbit.

In one embodiment, the concentric protrusion 90F is integrally formed with the drive shaft 90. The drive shaft 90, concentric protrusion 90F, and swing-link mechanism 124 may be machined from steel. The concentric protrusion 90F being formed simultaneously and within the same machining operation with the drive shaft 90 further increases manufacturing efficiencies.

Figure 16D:
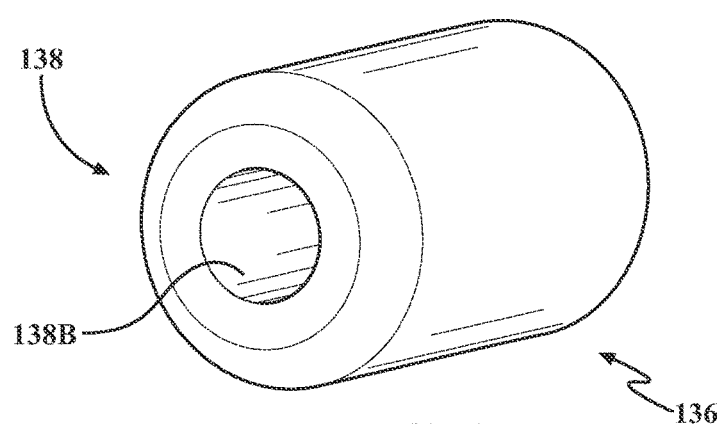
FIG. 16D is a second perspective view of the plug of FIG. 16C.
Figure 16E:
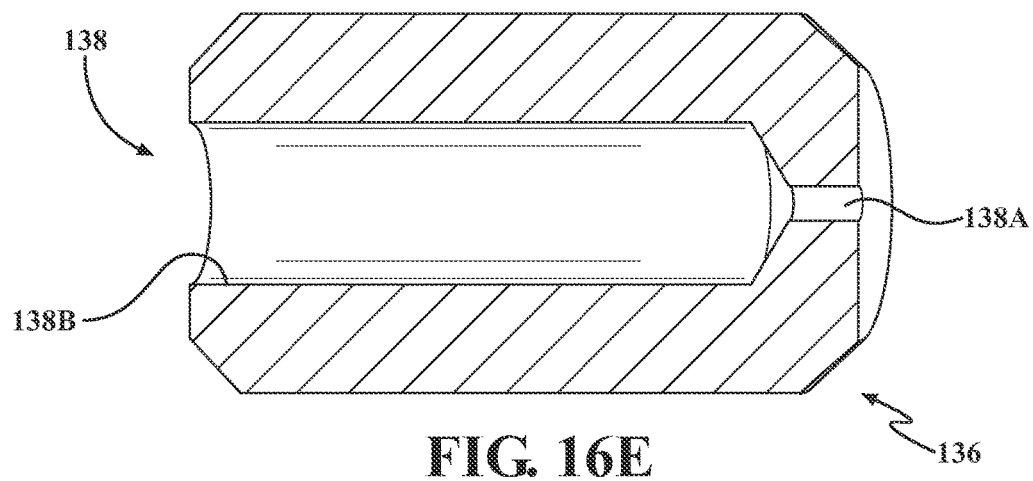
FIG. 16E is a cross-sectional view of the plug of FIG. 16C.
Figure 16F:
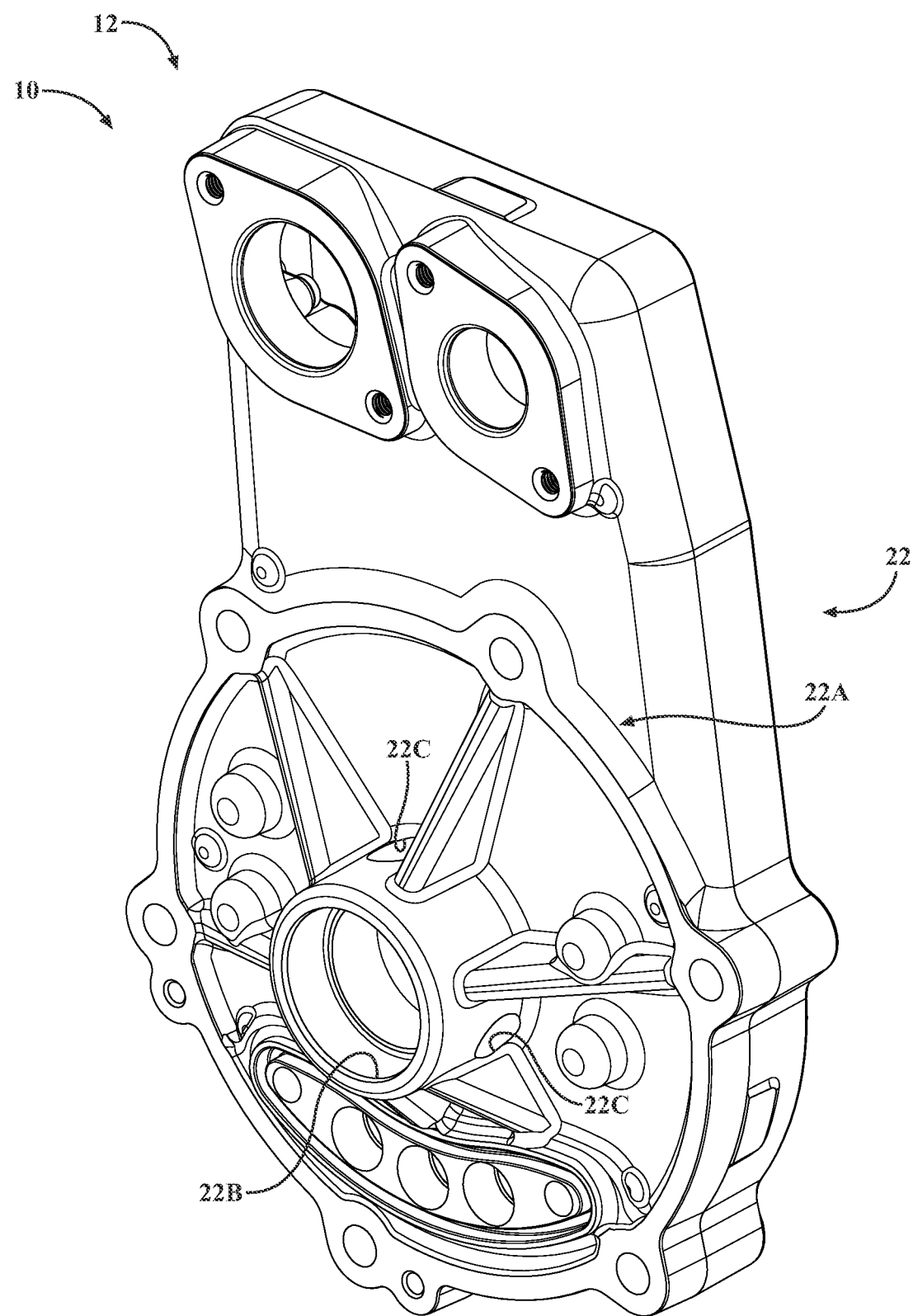
FIG. 16F is a perspective view of an inverter housing of the inverter of FIG. 11.
Figure 16G:
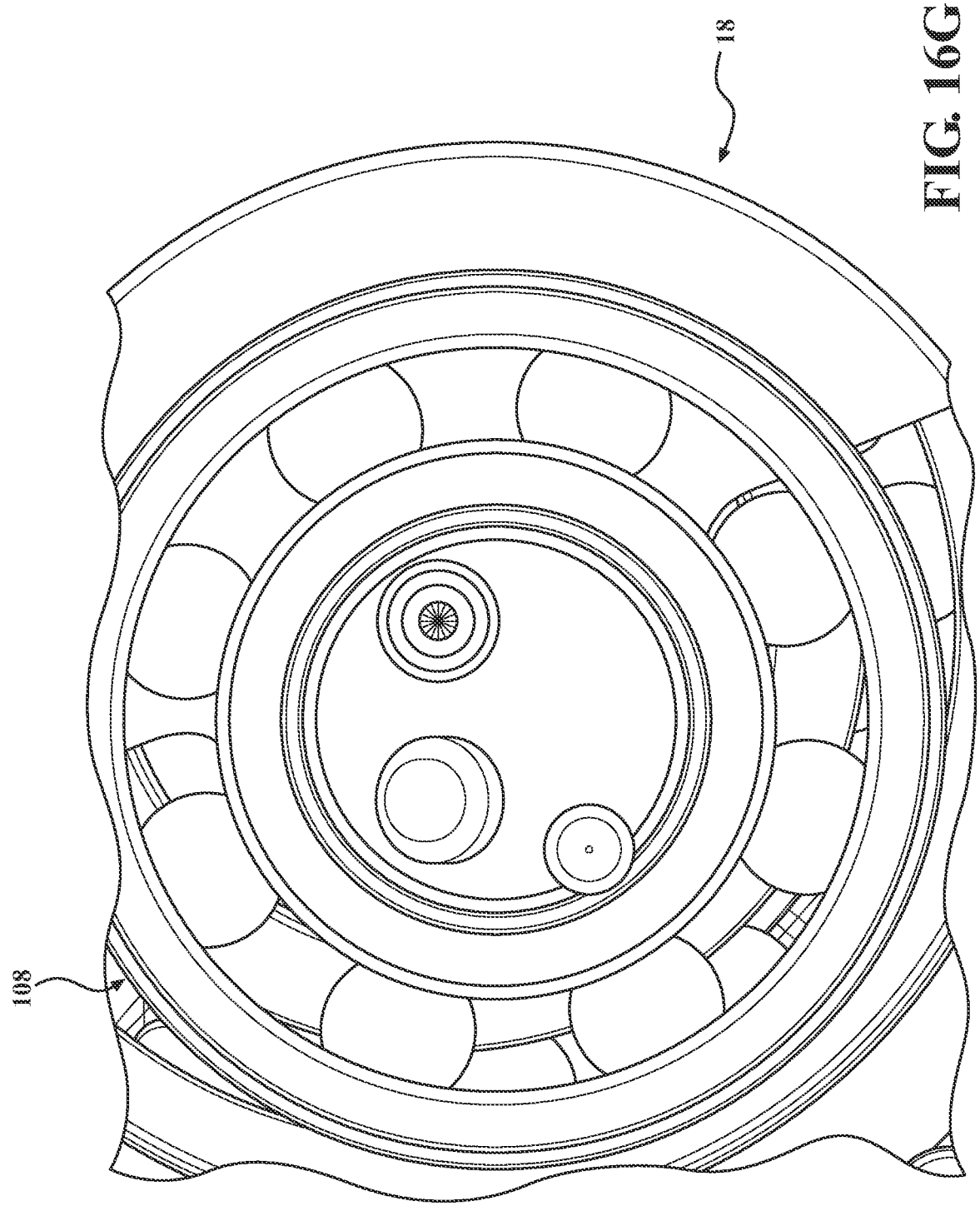
FIG. 16G is a partial expanded view of the compression device of FIG. 13.

The expanded view of a portion of the compression device 18 illustrated in FIG. 16G, further illustrates the concentric protrusion 90F. The concentric protrusion 90F interacts and guides the swink-link mechanism 124. The concentric protrusion 90F is sized and machined with a controlled tolerance with the first aperture 124A to create a controlled gap that limits the radial movement of the eccentric orbit of the orbiting scroll 66. Unlike the prior art, the concentric protrusion 90F does not require a second pin, or any additional machining operations. The concentric protrusion 90F further co-operates with the guidance pins 128 and the slots 66G on a lower surface 66F of the orbiting scroll 66, further discussed below.

The scroll-type electric compressor 10 includes an inverter section 14, a motor section 16, and the compression device 18. The motor section 16 includes a motor housing 54 that defines a motor cavity 56. The compression section 18 includes the fixed scroll 26. The housing 12 is formed, at least in part, the fixed scroll 26 and the center housing 24.

With specific reference to 13, 16B, and 18A-18F in the illustrated embodiment, the orbiting scroll 66 has a lower surface 66F. The lower surface 66F has a plurality of ring-shaped slots 66G. The center housing 24 includes a plurality of articulating guidance pin apertures 128. The guidance pins 128 are located within the guidance pin apertures 66G and extend towards the compression device 18 and into the ring-shaped slots 66G. The guidance pins 128 are configured to limit articulation of the orbiting scroll 66 as the orbiting scroll 66 orbits about the central axis 90C. In one embodiment, each of the ring-shaped slots 66G includes a ring sleeve 118. A thrust plate 130 is located between the fixed scroll 26 and a thrust body 150 (see below) and provides a wear surface therebetween.

Discharge Head Design Having a Three-Reed Reed Mechanism and an Oil Separator In the illustrated embodiment, the electric compressor 10 includes a multicavity pulsation muffler system 160 and an oil separator 96 which may be located in the discharge volume 82 and integrally formed with the discharge head or front cover 28. As discussed above, oil is used to provide lubrication between the moving components of the electric compressor 10. During operation, the oil and the refrigerant become mixed. The oil separator 96 is necessary to separate the intermixed oil and refrigerant before the refrigerant leaves the electric compressor 10.

Generally, refrigerant is released from the compression device 18 during each cycle, i.e., revolution (or orbit) of the orbiting scroll 66. In the illustrated embodiment, refrigerant leaves the compression device 18 through the central orifice 84A and two side orifices 84B in the fixed scroll 26. Release of the refrigerant through the orifices, 84A, 84B is controlled by the central reed 87A and two side reeds 87B, respectively. The multicavity pulsation muffler system 160 and the oil separator 96 are described in more detail below.

Scroll Bearing Oil Orifice

The electric compressor 10 may include a scroll bearing oil injection orifice. As discussed above, the compression device 18 of the present disclosure includes a ball bearing 108. In the illustrated embodiments, the ball bearing 108 is located between the swing-link mechanism 124 and the orbiting scroll 66. However, as a result of the location of the ball bearing 108 within the compression device 18, there may be limited oil delivery to the ball bearing 108 resulting in reduced durability. As shown in FIG. 9, the oil orifice 138 allows oil (and refrigerant) to travel from the discharge chamber 82 to the ball bearing 108 along the path 73 (which may be referred to as the "nose bleed" path).

The scroll-type electric compressor 10 may include a housing 12, a refrigerant inlet port 68, a refrigerant outlet port 70, an inverter module 144, a motor 54, a drive shaft 90 and a compression device 18. The housing 12 defines an intake volume 74 and a discharge volume 82. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the scroll-type electric compressor 10 from the discharge volume 82. The inverter module 144 is mounted inside the housing 12 and adapted to convert direct current electrical power to alternating current electrical power. The motor 54 is mounted inside the housing 12. The drive shaft 90 is coupled to the motor 54. The compression device 18 receives the refrigerant from the intake volume 74 and compresses the refrigerant as the drive shaft 90 is rotated by the motor 54. The compression device 18 includes a fixed scroll 26, an orbiting scroll 66, a swing-link mechanism 124, a ball bearing 108 and a pin 136.

The fixed scroll 26 is located within, and is fixed relative to, the housing 12. The orbiting scroll 66 is coupled to the drive shaft 90. The orbiting scroll 66 and the fixed scroll 26 form compression chambers 80 for receiving the refrigerant from the intake volume 72 and compressing the refrigerant as the drive shaft 90 is rotated about the center axis 90C. The orbiting scroll 66 has a first side (or the lower surface) 66F and a second side (or upper surface) 66G. The orbiting scroll 66 has an oil aperture 140 through the orbiting scroll 66 from the first side 66F to the second side 66G.

The swing-link mechanism 124 is coupled to the drive shaft 90. The ball bearing 108 is positioned between and adjacent to each of the orbiting scroll 66 and the swing-link mechanism 124. The drive shaft 90, orbiting scroll 66 and swing-link mechanism 124 are arranged to cause the orbiting scroll 66 to orbit the central axis 90C in an eccentric orbit.

As shown in FIGS. 16B-16E, the tip of the orbiting scroll 66 includes a plug 136 and has an oil orifice 138. The plug 136 may be press fit within the oil aperture 140 of the orbiting scroll 66. The oil orifice 138 is configured to allow oil with a controlled flow rate or compressed refrigerant to pass through the orbiting scroll 66 to the ball bearing 108.

The size of the oil orifice 138 may be tuned to the specifications of the electric compressor 10. For example, given the specifications of the electric compressor 10, the diameter of the oil orifice 138 may be chosen such that only oil is allowed to pass through and to limit the equalization of pressure between the first and second sides of the orbiting scroll 66. By using a separate plug 136, rather than machining the oil orifice 138 directly in the orbiting scroll 66, manufacturing efficiencies may be achieved. And the plug 136 may have an oil orifice 138 that is specifically designed and tuned to allow for oil flow and refrigerant flow to increase or decrease depending on the diameter and geometry of the oil orifice 138.

As shown in FIGS. 16D-16E, in one embodiment, the oil orifice 138 may have a first bore 138A and a second bore 138B, wherein a diameter of the first bore 138A is less than a diameter of the second bore 138B. For example, in one application of this embodiment the first bore 138A has an approximate diameter of 0.3 mm. The second bore 138B has a diameter greater than the diameter of the first bore 138A and is only used to shorten the length of the first bore 138A. The flow of the oil and coolant is designed to provide thermal and lubricant to the ball bearing 108 supporting the radial forces created by the eccentric orbit of the orbiting scroll 66.

Further, as discussed above, the orbiting scroll 66 has an orbiting scroll base 66A and an orbiting scroll lap 66B. The orbiting scroll lap 66B may have an orbiting scroll tail end 66C and an orbiting scroll center end 66D. As shown, the oil aperture 140 is located within the orbiting scroll center end 66D. The plug 136 may be secured into the oil aperture 140, by press fit or any other method that will secure the plug 136.

As shown in FIG. 9, the oil orifice 138 allows oil (and refrigerant) to travel from the discharge chamber 82 to the ball bearing 108 along the path 73 (which may be referred to as the "nose bleed" path).

Bearing Oil Communication Hole

The electric compressor 10 may include one or more bearing oil communication holes. As discussed above, in the illustrated embodiment, a drive shaft 90 is rotated by the motor 54 to controllably actuate the compression device 18. The drive shaft 90 has a first end 90A and a second and 90B. The housing 10 of the electric compressor 10 forms a first drive shaft supporting member 22B and a second drive shaft support member 24A. In the illustrated embodiment, the first drive shaft supporting member 22B is formed in a motor side 22 of the inverter housing 22A and the second drive shaft supporting member 24A is formed within the center housing 24. First and second ball bearings 62, 64 are located within the first and second drive shaft support members 22B, 24A.

The location of the first drive shaft supporting members 22B is not a flow-through area for refrigerant (and oil). This may result in a low lubricating condition and affect the durability of the electric compressor 10.

As shown in FIG. 16F, the first drive supporting member 22B may include one or more holes 22C to allow oil to enter the first drive support member 22B and lubricate the first ball bearing 62.

In the illustrated embodiment, the scroll-type electric compressor 10 includes a housing 12, a first ball bearing 62, a second ball bearing 64, a refrigerant inlet port 68, a refrigerant outlet port 70, an inverter module 44, a motor 54, a drive shaft 90, and a compression device 18.

The housing 12 defines an intake volume 74 and a discharge volume 82 and includes first and second drive shaft supporting members 22B, 24A. The first ball bearing 62 is located within the first drive shaft supporting member 22B. The first drive shaft support member 22B of the housing 12 includes one or more oil communication holes 22C for allowing oil to enter the first ball bearing 62.

The second ball bearing 64 is located within the second drive shaft supporting member 24A. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the scroll-type electric compressor 10 from the discharge volume 82. The inverter module 144 is mounted inside the housing 12 and is adapted to convert direct current electrical power to alternating current electrical power. The motor 54 is mounted inside the housing 12. The drive shaft 90 is coupled to the motor 54. The drive shaft 90 has a first end 90A and a second end 90B. The first end 90A of the drive shaft 90 is positioned within the first bearing 62 and the second end 90B of the drive shaft 90 is positioned within the second bearing 64. The compression device 18 receives the refrigerant from the intake volume 74 and compresses the refrigerant as the drive shaft 90 is rotated by the motor 54. As discussed above, in the illustrated embodiment, the first drive shaft support member 22 may be formed on the motor side 22A of the inverter housing 22.

The rotational movement within the motor section 16 of the compression device 18 creates a flow path and movement to the oil from the oil reservoir 98, as shown by arrows 88 in FIG. 9. As shown the oil flows from the oil reservoir 98 toward the motor section 16 and continues toward the stator 58 and rotor 60. The rotational motion of the orbiting scroll, rotor and drive shaft pulls the oil upward to mix with the inlet flow of the refrigerant path 72. The rotational movement of the rotor 60 and drive shaft 90 will further propel the oil against the motor side 22A of the inverter housing 22. The motor side 22A surface further includes a series of ribs 22D, shown in FIG. 16F. The ribs 22D provide the needed rigidity for supporting the first drive shaft support member 22 and allow for a ridged backing and pocket to secure the first bearing 62. The inverter housing 22 may further defines an oil cavity (not shown) where the oil collected between the ribs 22D is directed by gravity downward and into the oil. The ribs 22D and the sloped surface of the motor side 22A cooperate to capture and direct the oil splashed against the motor side 22A by the rotor 60 or drive shaft 90, to assist in increasing the oil flow into the oil cavity 22E and first bearing 62. FIG. 16F illustrates two communication holes 22C, but it is appreciated additional or less than 2 oil communication hole 22C may be included above and between the ribs 22D on the motor side 22A of the inverter housing 22. For example in the illustrated embodiment the hole is 3.5 mm in diameter and the motor side 22A includes a sloping wall between the ribs 22D. In addition, the motor side 22A may include a outer oil collection area 22

Domed Inverter Cover

The scroll-type electric compressor 10 of the present invention may include a domed inverter cover 20. The scroll-type electric compressor 10 includes the housing 12, the refrigerant inlet port 68, the refrigerant outlet port 70, the inverter module 44, the motor 54, the drive shaft 90, the compression device 18 and the inverter cover 20. The housing 12 defines the intake volume 70 and the discharge volume 82. The housing 12 has a generally cylindrical shape and the central axis 90C. The refrigerant inlet port 68 is coupled to the housing 12 and is configured to introduce the refrigerant to the intake volume 70. The refrigerant outlet port 82 is coupled to the housing 12 and is configured to allow compressed refrigerant to exit the scroll-type electric compressor 10 from the discharge volume 82.

The inverter module 44 is mounted inside the housing 12 and adapted to convert direct current electrical power to alternating current electrical power. The motor 54 is mounted inside the housing 12. The drive shaft 90 is coupled to the motor 54. The compression device 18 is coupled to the drive shaft 90 and is configured to receive the refrigerant from the intake volume and to compress the refrigerant as the drive shaft 90 is rotated by the motor 54.

As discussed above, the compression device 18 may rotate at a high speed (>2,000 RPM) which may create undesirable noise, vibration, and harshness (NVH) and low durability conditions. In the prior art, the inverter cover 20 is generally flat and tends to amplify and/or focus, the vibrations from the compression device 18.

To disperse vibrations rather than focus, the vibrations from the compression device 18, the inverter back cover 20 of the electric scroll-like compressor 10 of the fifth aspect of the disclosure is provided with a generally curved or domed profile.

Figure 6:
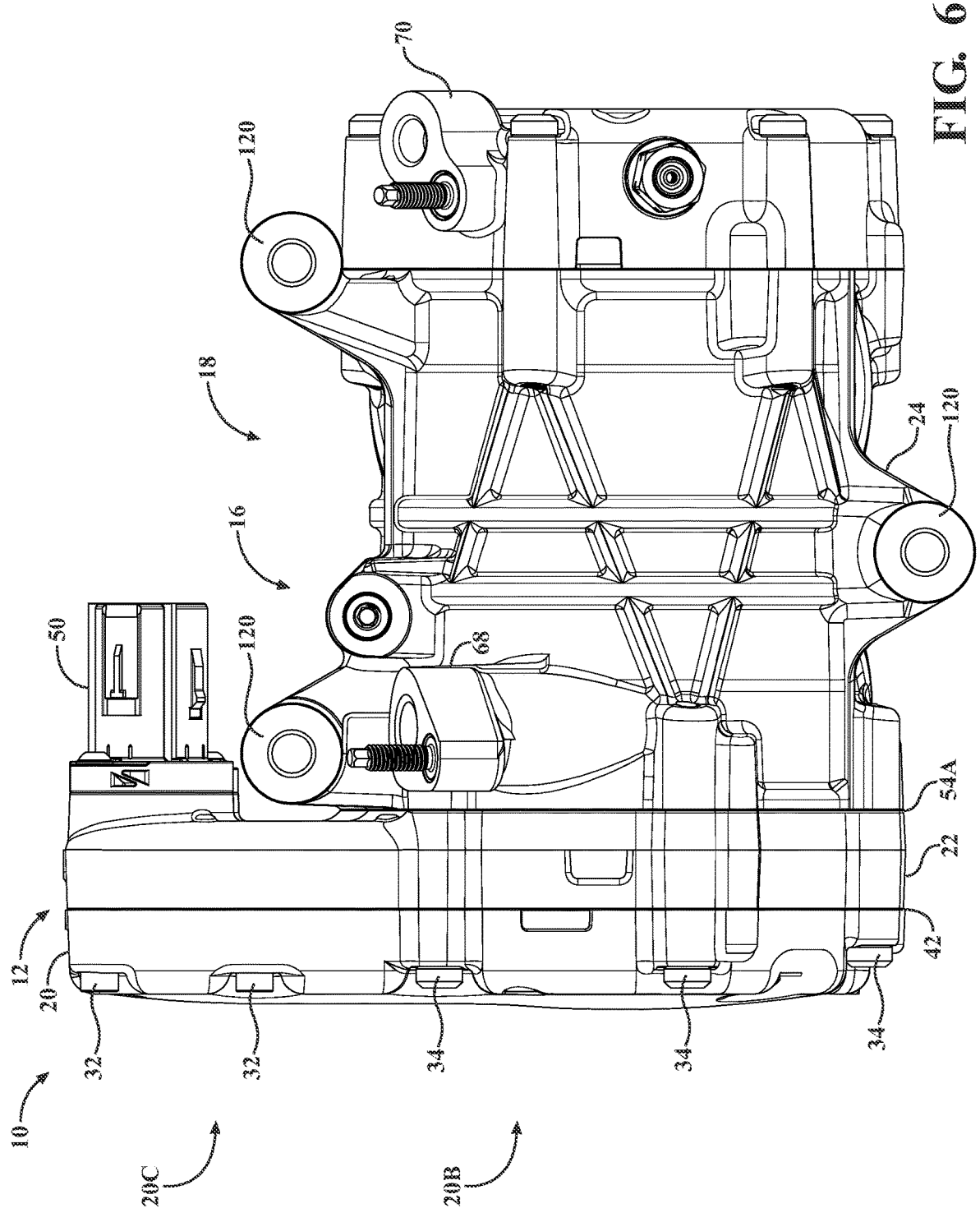
FIG. 6 is a rear view of the electric compressor of FIG. 1A.
Figure 7:
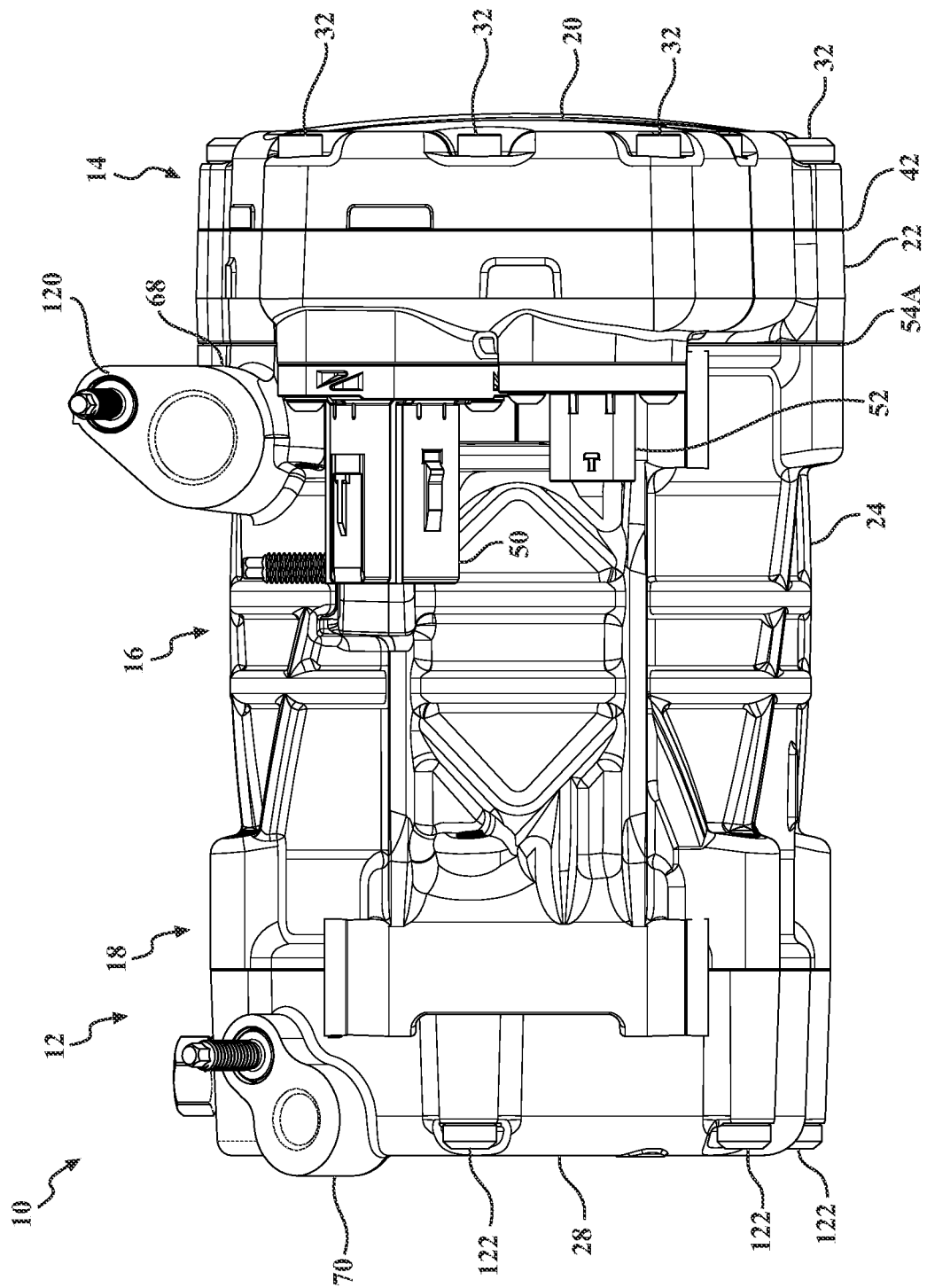
FIG. 7 is a top view of the electric compressor of FIG. 1A.
Figure 8:
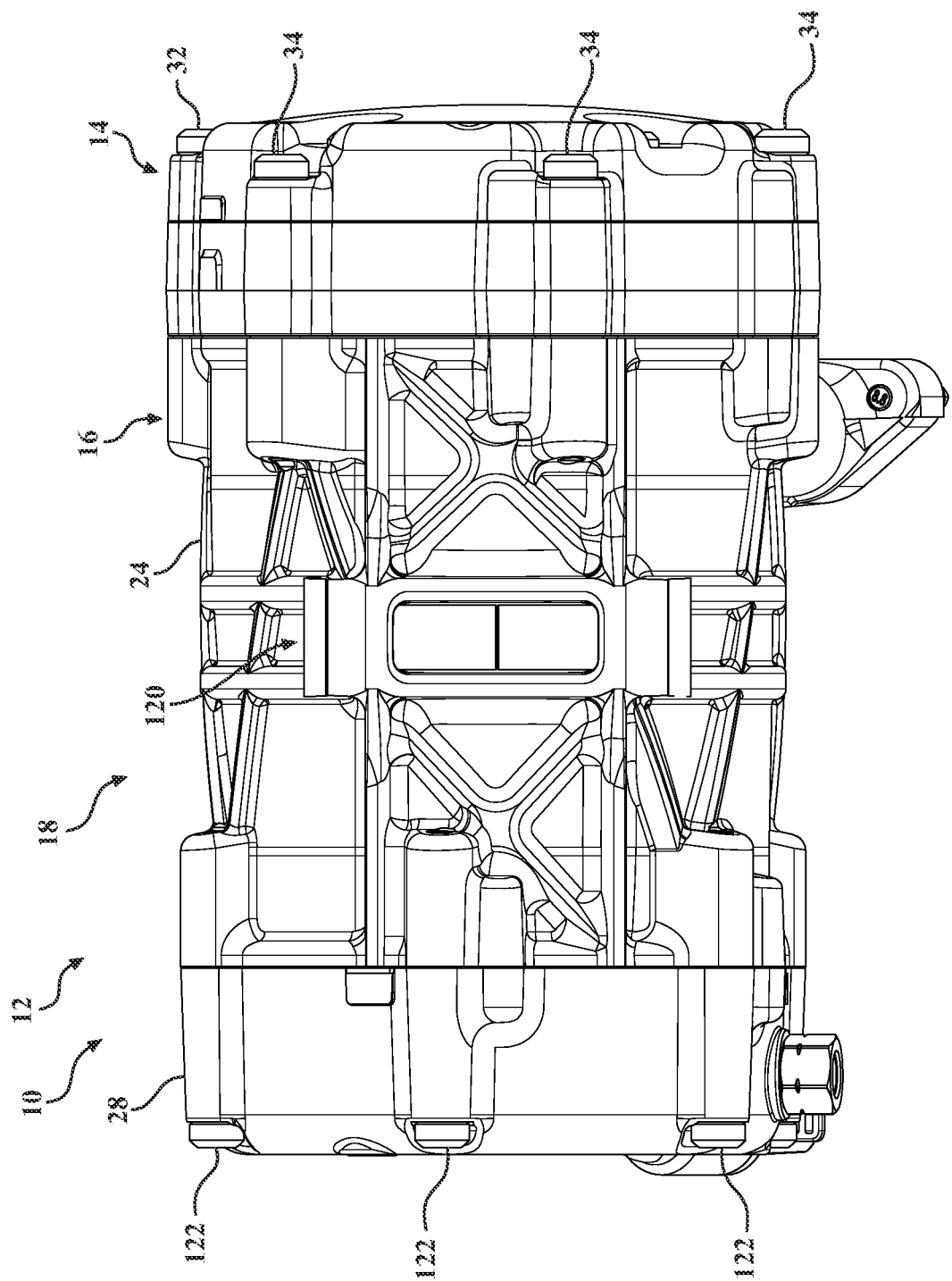
FIG. 8 is a bottom view of the electric compressor of FIG. 1A.

As shown in the FIGS., specifically FIGS. 1, 3 and 6, the inverter cover 20 is located at one end of the scroll-type electric compressor 10 and includes a first portion 20A and a second portion 20B. The first portion 20A includes an apex or apex portion 20C and is generally perpendicular to the central axis 90C and has an apex 20C and an outer perimeter 20D. The first portion 20A has a relatively domed-shaped such that the inverter cover 20 has a curved profile from the apex 20C towards the outer perimeter 20D. The amount and location of the curvature may be dictated or limited by other considerations, such as packaging constraints, i.e., the space in which the electric scroll-type compressor 10 must fit, and constraints placed by internal components, i.e., location and size). The first portion 20A may also have to incorporate other features, e.g., apertures to receive fastening bolts. The second portion 20B may include a portion of the inverter cover 20 that is not domed, i.e., is relatively flat that is located about the perimeter of the inverter cover.

Fixed Scroll Having Modified Scroll Flooring

In a first aspect of the present invention, the scroll-type electric compressor 10 with a modified fixed scroll flooring is configured to compress a refrigerant. The scroll-type electric compressor 10 includes the housing 12, the refrigerant inlet port 68, the refrigerant outlet port 70, the inverter module 44, the motor 54, the drive shaft 90, and the compression device 18. The housing 12 defines an intake volume 74 and a discharge volume 82.

The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the scroll-type electric compressor 12 from the discharge volume 82. The inverter module 144 is mounted inside the housing 12 and adapted to convert direct current electrical power to alternating current electrical power. The motor 54 is mounted inside the housing 12 and the drive shaft 90 is coupled to the motor 54.

In general, and as described above, the compression device 18 receives the refrigerant from the intake volume 74 and compresses the refrigerant as the drive shaft 90 is rotated by the motor 54.

The compression device 18 includes a fixed scroll 26 and an orbiting scroll 66. The compression device 18 defines antechamber volume 134. The antechamber volume 134 (see FIGS. 18C and 18G) feeds refrigerant to the chambers 80 at the start of a compression cycle. During the compression cycle, when the chambers 80 close (as the laps 26B, 66B come into contact, the pressure within the antechamber volume 134 drops due to suction which can affect the efficiency of the electric compressor 10. In one aspect of the present invention, it is desirable to increase the volume of the antechamber (to make additional refrigerant available to the compression device 18). This increases the "capacitance" of the compression device 18 and smooths out the compression cycle.

In the illustrated embodiment, the base 26A, 66A of one of the fixed scroll 26 and the orbiting scroll 66 has a cutout 136 to increase the antechamber volume 134.

In the illustrated embodiment, the cutout 136 is located in the floor or base 26A of the fixed scroll 26.

Figure 18G:
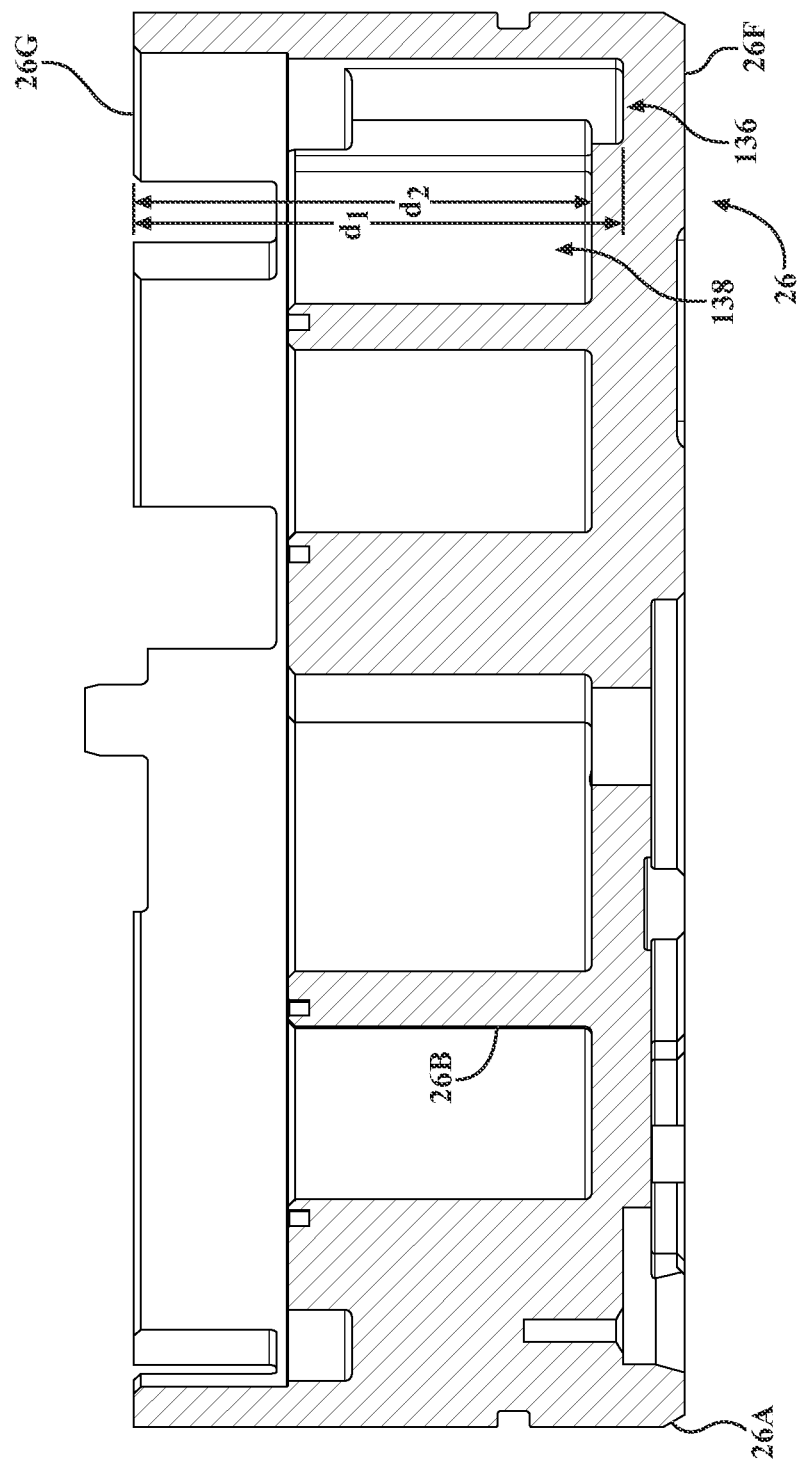
FIG. 18G is a cross-sectional view of the fixed scroll of the compression device of FIG. 13.
Figure 19A:
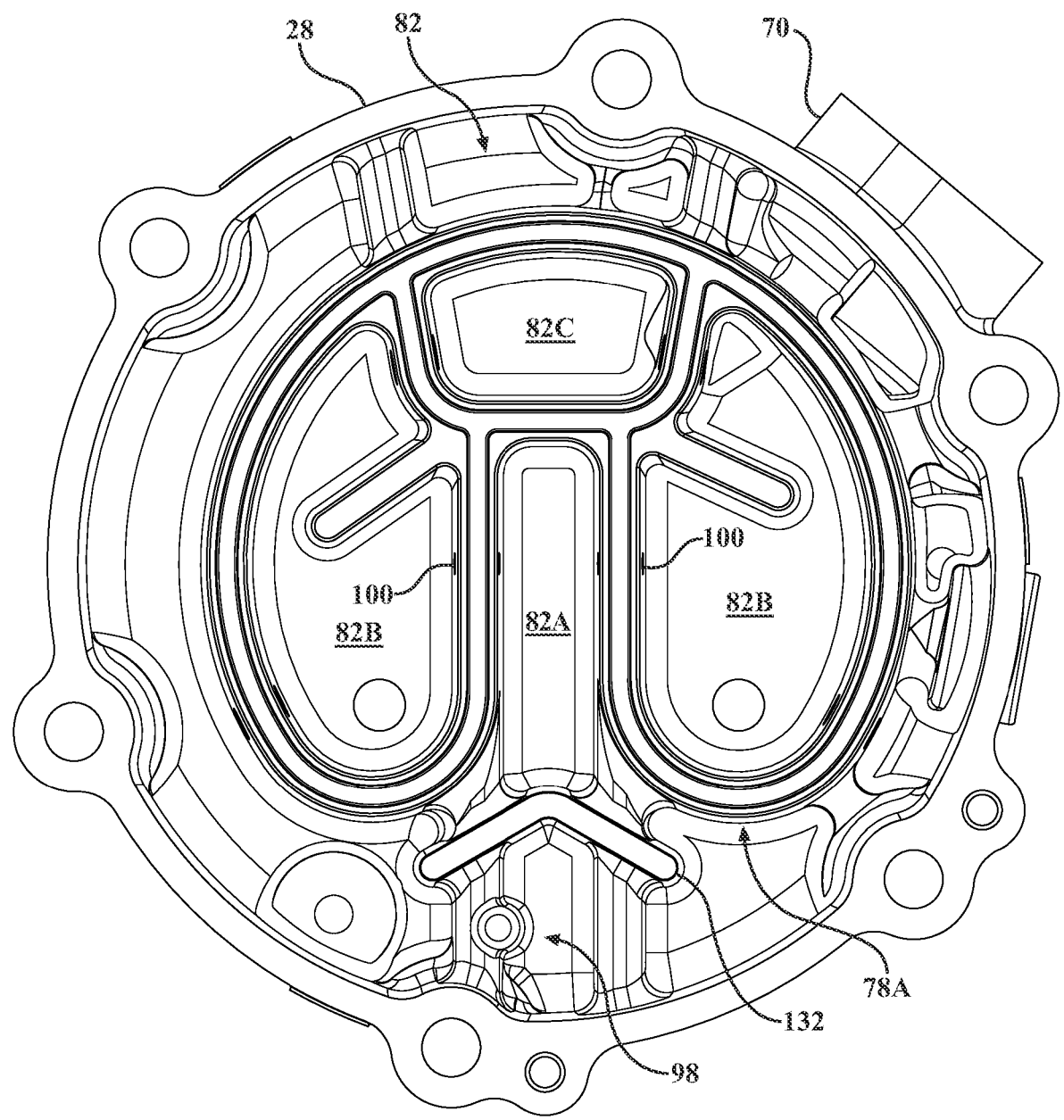
FIG. 19A is a first perspective view of a front cover of an electric compressor forming an oil separator, according to an embodiment of the present invention.
Figure 19B:
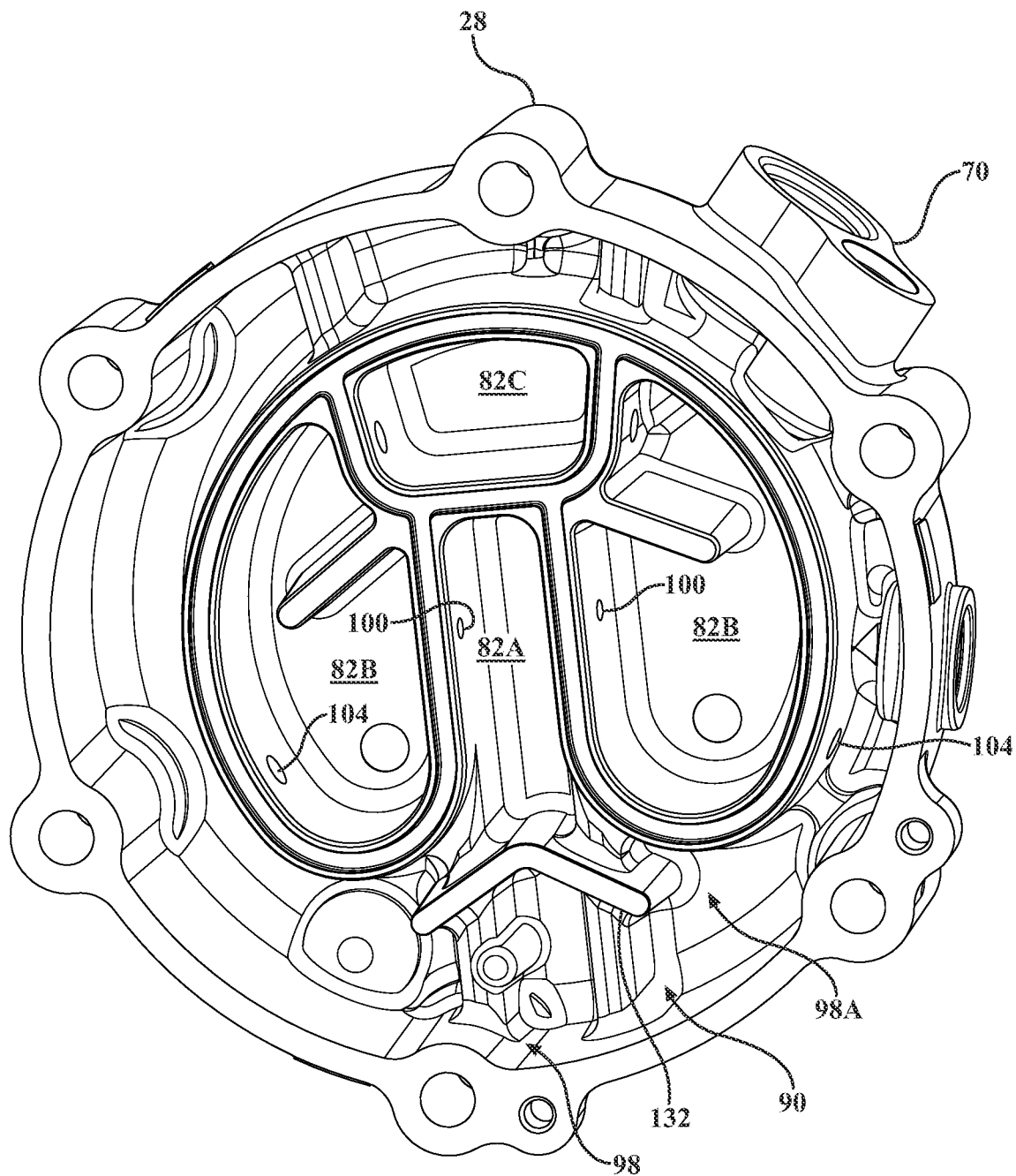
FIG. 19B is a second perspective view of the front cover of FIG. 19A.
Figure 19C:
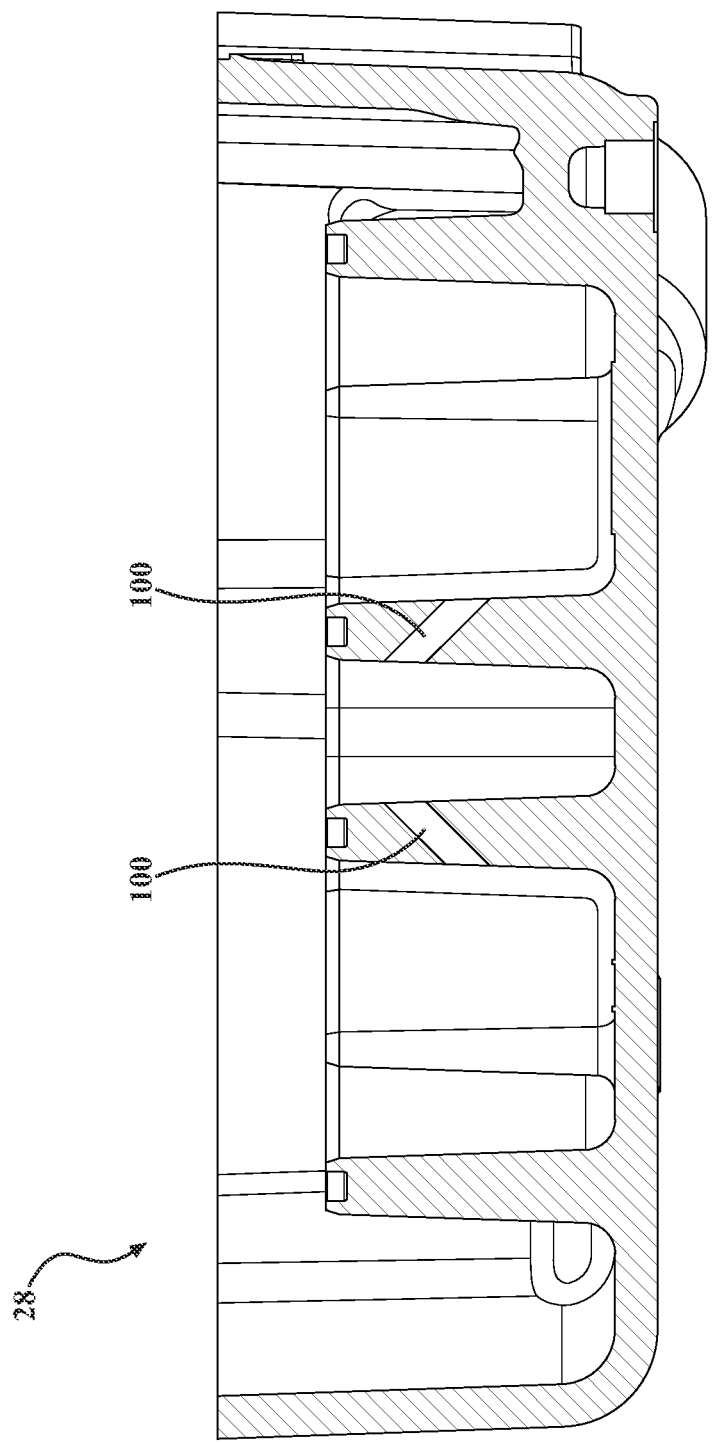
FIG. 19C is a cross-sectional view of the front cover of FIG. 19A.

As shown, the fixed scroll 26 has a first side 26F defined by fixed scroll base 26A and a second side 26G defined by a top surface of the fixed scroll lap 26B. The fixed scroll lap 26B extends from the fixed scroll base 26A towards the second side 26G of the fixed scroll 26. As shown in FIGS. 18C and 18G, the cutout 136 in the floor of the fixed scroll base 26 defines a first portion which has a depth, $d_1$, which is greater than a depth, $d_2$, of a second portion 138.

The size of the first portion or cutout 136 may be limited by a couple constraints. First, the depth, $d_1$, must leave sufficient material to maintain the structural integrity of the fixed scroll 26. In addition, to ensure that the chamber 80 is sealed, the geometry of the cutout must remain outside the orbiting lap 66B, to allow the chamber 80 to close and seal as shown in 17D. The cutout 136 may be provide additional volume within the antechamber 134 to allow the volumes within chambers 80 in 17D to be fully filled. The cutout 136 is limited by the path of the orbiting scroll 66B, and limitations to the floor and wall thickness needed to the fixed scroll 26. In addition, machine tooling and access to the floor of the fixed scroll may provide additional limitations to the size and areas outside the seal area of the orbiting scroll 66B.

Isolation/Constraint System

In a second aspect of the present invention, an isolation and constraint system 148 may be used to isolate the housing 12 from the oscillations and pulsations caused by the orbiting scroll 66.

In a typical, scroll-type electric compressor, the motor and the fixed scroll are directly coupled to the housing, is directly coupled to the housing. As discussed above, guidance pins directly coupled to the housing may cooperate with ring shaped slots on the orbiting scroll to limit articulation of the orbiting scroll as it orbits the drive shaft. With this type of arrangement, oscillations and pumping pulsations from the orbiting scroll may be transmitted to the housing and through the mounts to the, e.g., vehicle structure.

The scroll-type electric compressor 10 is configured to compress a refrigerant. The scroll-type electric compressor includes the housing 12, the refrigerant inlet port 68, the refrigerant outlet port 70, the inverter module 144, the motor 54, the drive shaft 90 and a compression device 18. The housing 12 defines an intake volume 74 and a discharge volume 82 and has a generally cylindrical shape. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the scroll-type electric compressor 12 from the discharge volume 82. The inverter module 144 is mounted inside the housing 12 and adapted to convert direct current electrical power to alternating current electrical power. The motor 54 is mounted inside the housing 12. The drive shaft 90 is coupled to the motor 54. The compression device 18 is coupled to the drive shaft 90 for receiving the refrigerant from the intake volume 74 and compressing the refrigerant as the drive shaft 90 is rotated by the motor 54.

As discussed above, the compression device 16 includes a fixed scroll 26 and an orbiting scroll 66. The fixed scroll 26 is located within, and is fixed relative to, the housing 12. The orbiting scroll 66 is coupled to the drive shaft 90. The orbiting scroll 66 and the fixed scroll 26 form compression chambers 80 for receiving the refrigerant from the intake volume 74 and for compressing the refrigerant as the drive shaft 90 is rotated about the center axis 90C.

The orbiting scroll 66 has a lower surface having a plurality of ring-shaped slots 66G (see above).

Figure 20A:
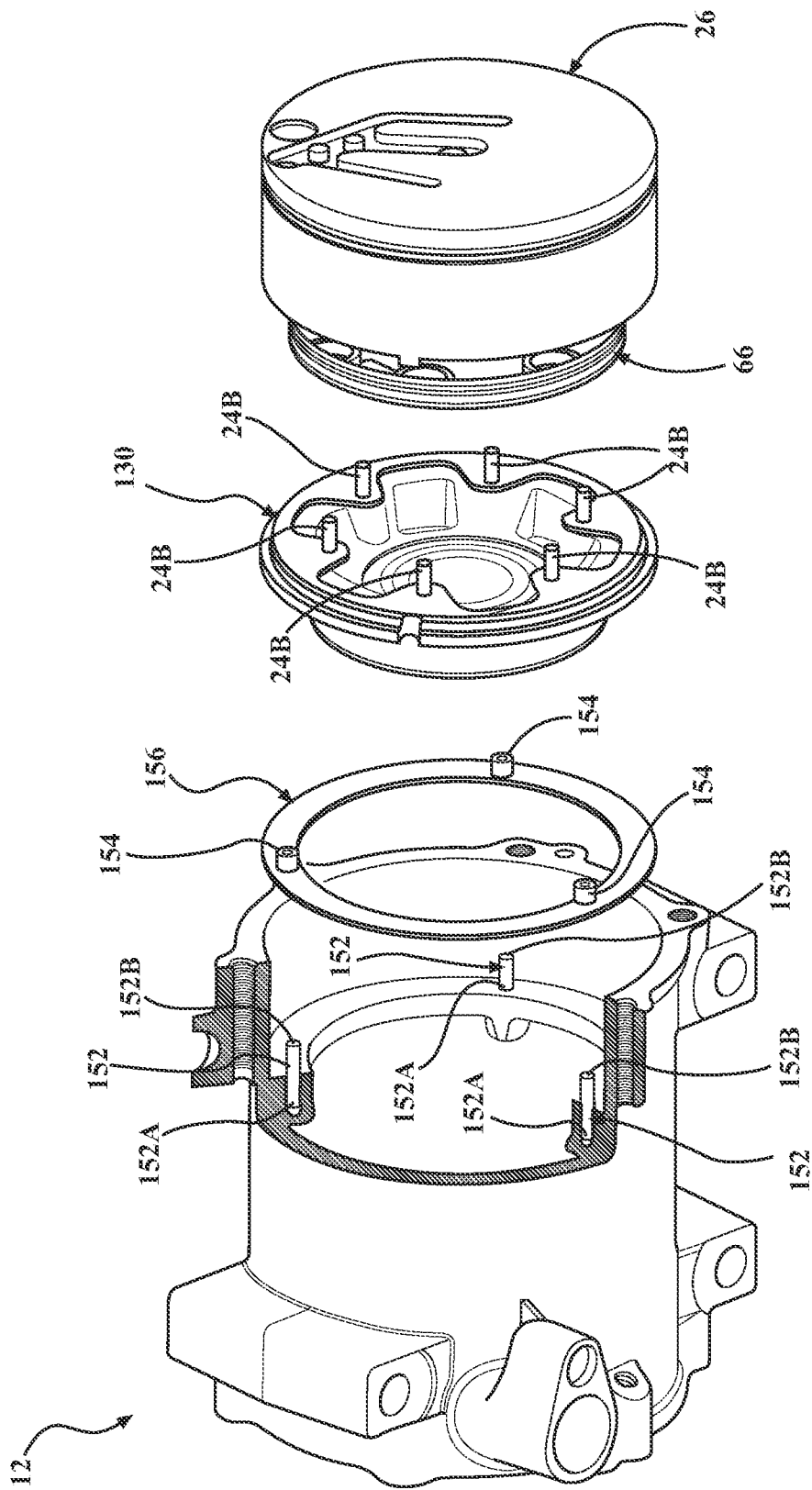
FIG. 20A is a partial view of an electric compressor with a cutaway view of the housing and an isolation and constraint system, according to an embodiment of the present invention.

With specific reference to FIG. 20A, the scroll-type electric compressor 10 further includes a thrust body 150, the plurality of articulating guidance pins 24B, a plurality of mounting pins 152 and a plurality of isolating sleeves 154. The thrust body 150 has a plurality of guidance pin apertures 152A. The plurality of articulating guidance pins 24B extend from the guidance pin apertures 152 and extend towards the compression section 18 and into the ring-shaped slots 66B. The guidance pins 24B are configured to limit articulation of the orbiting scroll 66 as the orbiting scroll 66 orbits about the central axis 90.

Each mounting pin 152 has a housing end 152A and a thrust body end 152B. The housing end 152 is press fit within respective receiving apertures in the housing 12. The thrust body end 152B is cylindrical with an outer surface. The plurality of isolating sleeves 154 are composed from a flexible material, such as a chemically resistant synthetic rubber. One such material is ethylene propylene diene monomer (EPDM). The thrust body end 152 of each mounting pin 152 is encapsulated within a respective sleeve 154 and is received in a respective slot 150A within the thrust body 150. In this way, the only connection between the thrust body 150 and the housing 12 is through the mounting pins 152 which is isolated or insulated by the sleeves 154 to prevent or minimize vibrations from the orbiting scroll 66 from being transmitted to the housing 12.

As shown in FIG. 20A, in one embodiment, the isolating sleeves 152 are integrally formed with a circular gasket or ring 156.

Figure 20B:
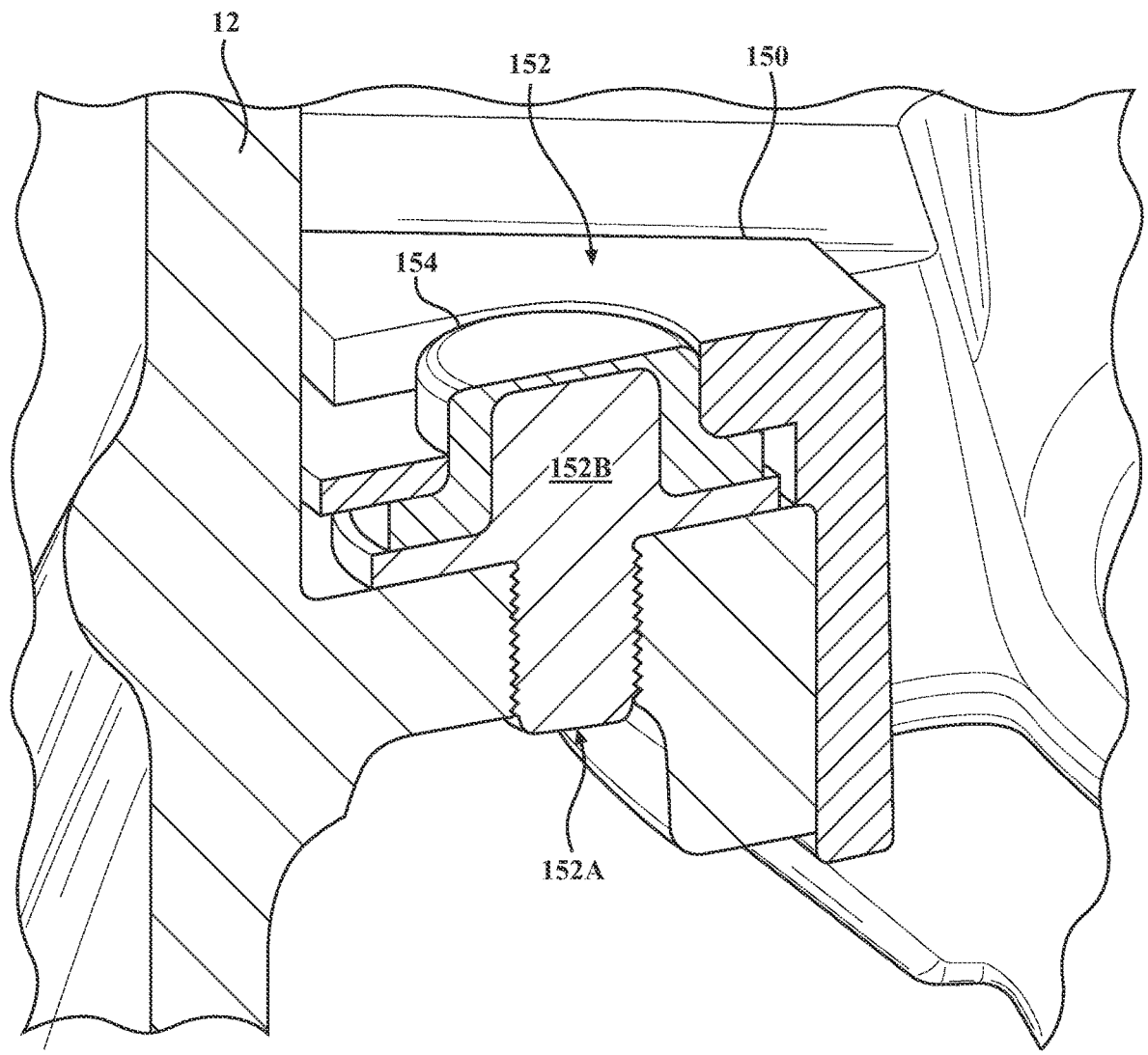
FIG. 20B is a partial view of an isolation and constraint system for use with an electric compressor, according to another embodiment of the present invention.
Figure 20C:
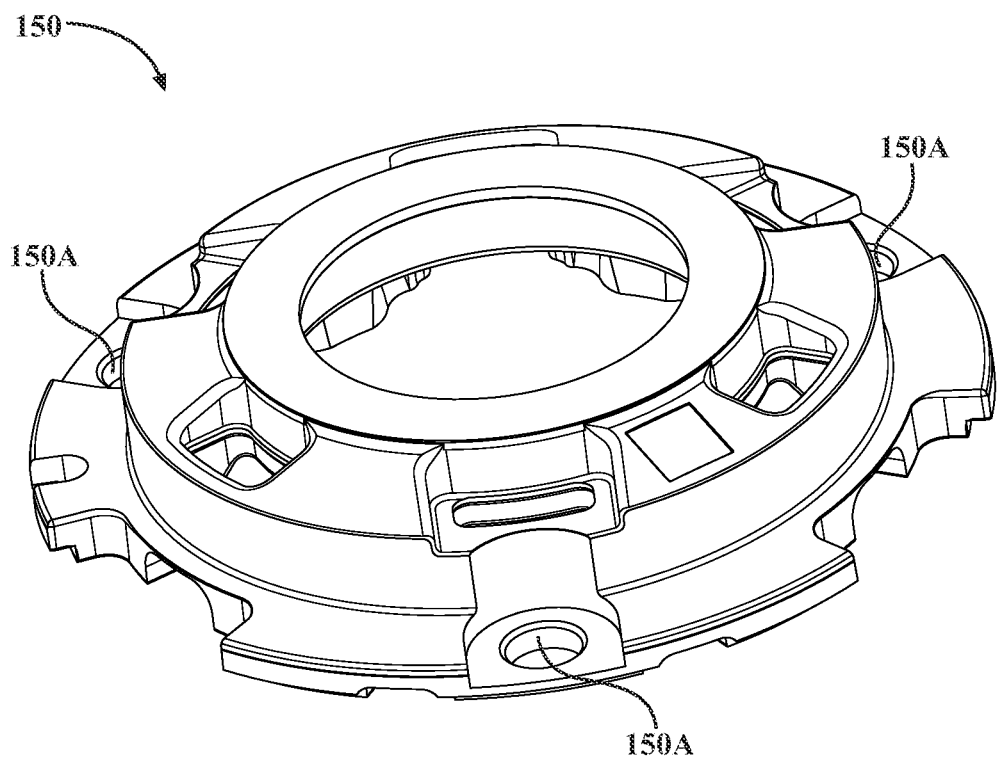
FIG. 20C is a first perspective view of a thrust body, according to an embodiment of the present invention.
Figure 20D:
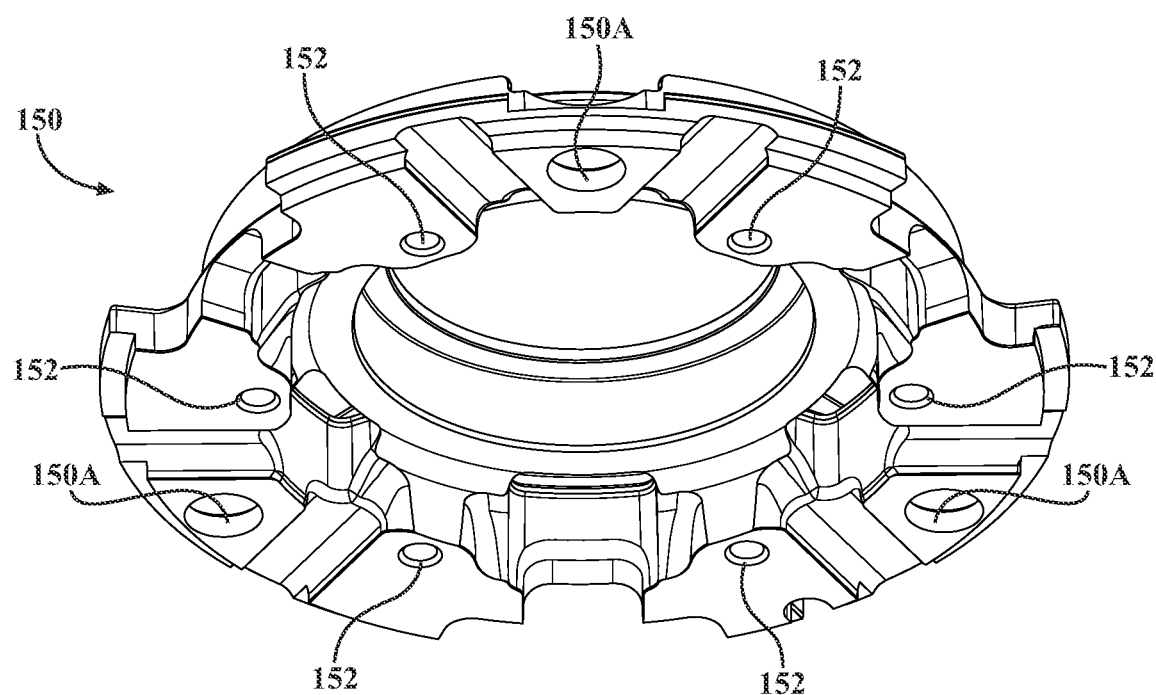
FIG. 20D is a second perspective view of the thrust body of FIG. 20C.
Figure 21A:
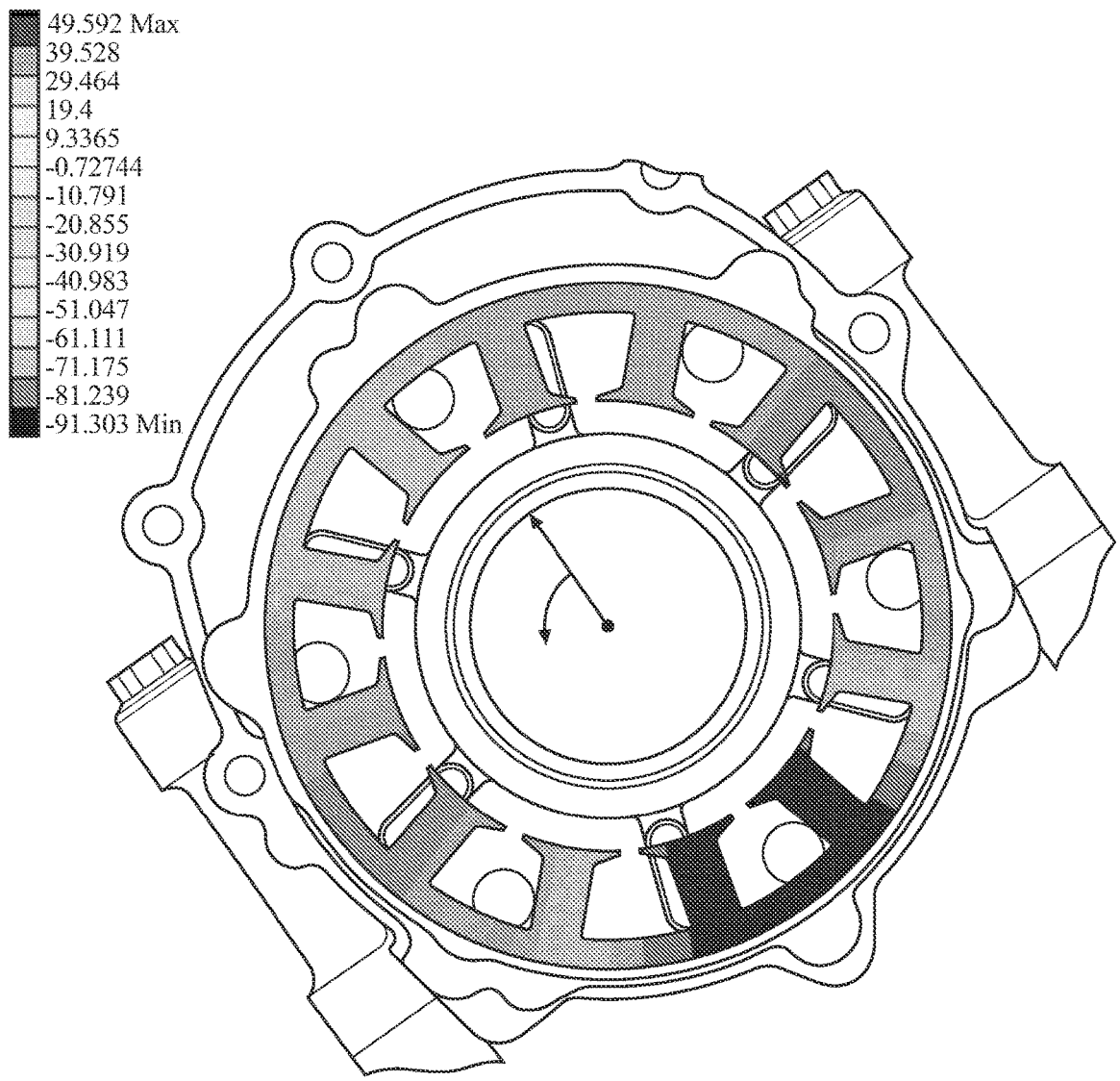
Figure 21C:
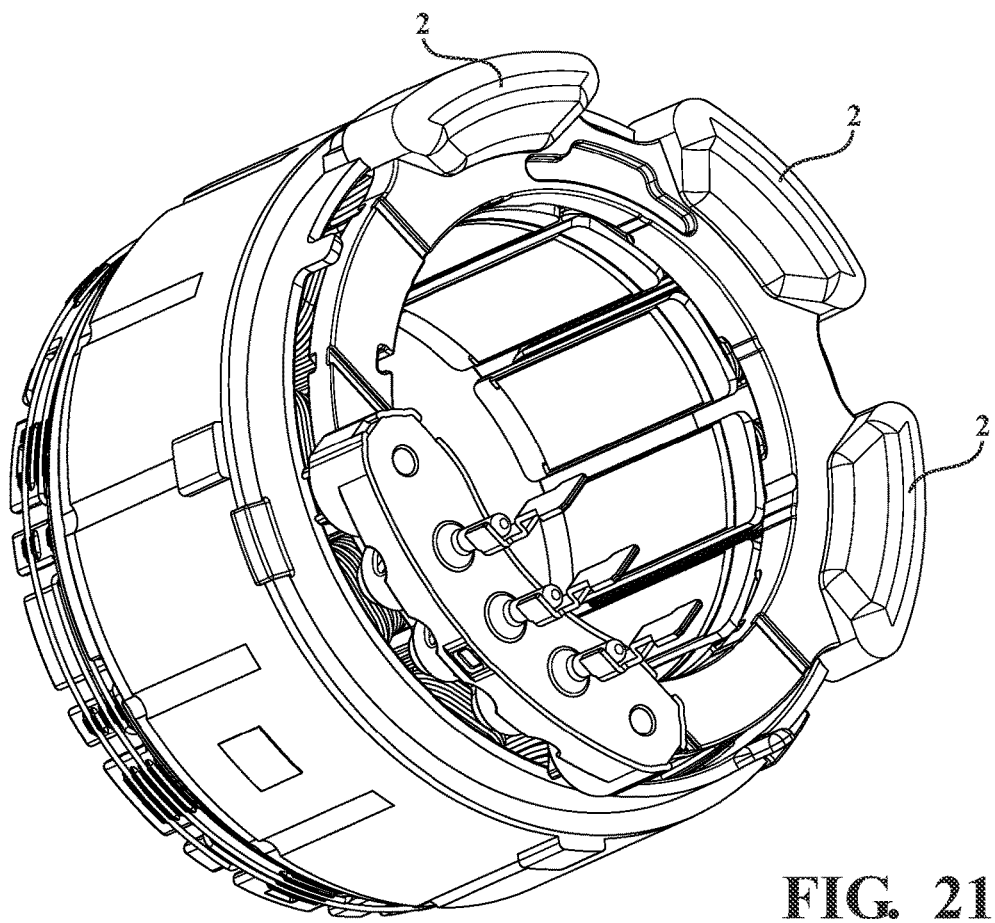
Figure 21D:
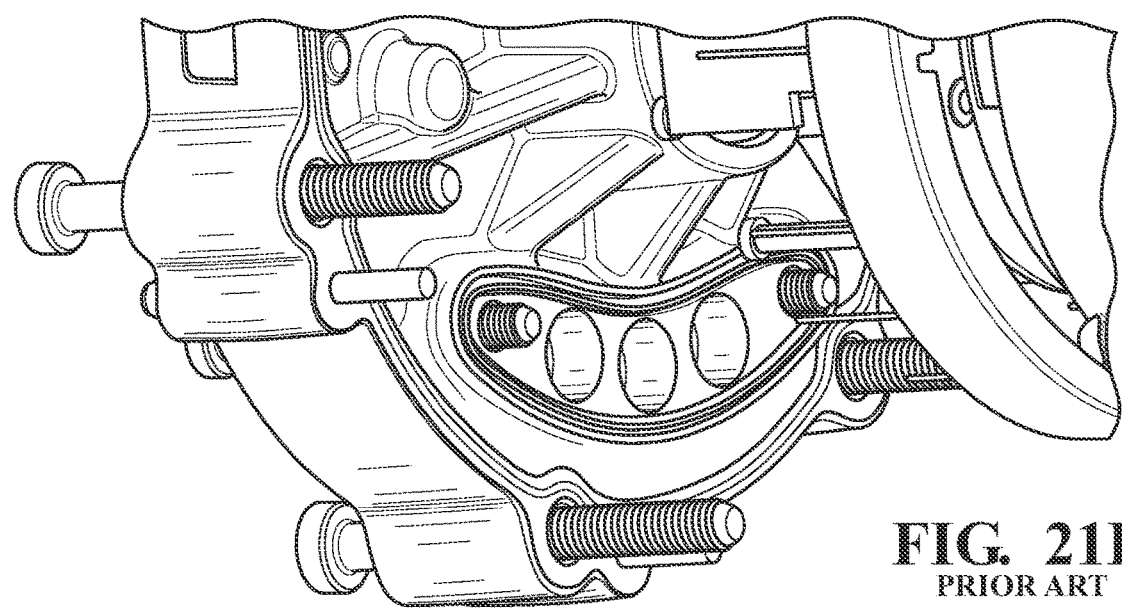

As shown in FIG. 20B, in another embodiment, the thrust body end 152B of each mounting pin 152 is full encapsulated by the flexible material using, for example, an overmolding process. The outer surface of the of the isolating sleeves 154 may be rubbed to assist with the isolation.

Electric Compressor Head Design

In a third aspect of the electric compressor 10 of the disclosure, a front cover 28 design includes an oil separator 96 and a three-reed reed mechanism 86. As discussed below, the design of the front cover 28, the fixed scroll 26 and the reed mechanism 86 define a multicavity pulsation muffler system.

In prior art electric compressors, refrigerant is released from the compression device once per revolution (or orbit) of the orbiting scroll. This creates a first order pulsation within the compressed refrigerant released by the electric compressor. The relative strong amplitude and low frequency of the pulsation creating in the refrigerant may excite other components (internal or external to the electric compressor) which may create undesirable noise, vibration and harshness (NVH) and low durability conditions.

With reference to FIGS. 18C-18F and FIGS. 19A-19B, the multicavity pulsation muffler system 160 compressed refrigerant is released from the compression device 18 twice during a compression cycle. As discussed in more detail below, the compression device 18 includes two smaller secondary discharge ports are placed into (adjacent) two secondary discharge chambers, The secondary discharge chambers are downstream (in the discharge head) of the pressure drop from a central discharge port. As also described further below, the front cover 28 defines a parallel discharge path for refrigerant exiting the compression device 18 to the refrigerant outlet port 70.

In the illustrated embodiment, the compressor 10 includes the housing 12, the inverter module 44, the motor 54, and a compression device 18. The housing 12 defines an intake volume 74 and a discharge volume 82. The housing 12 has a generally cylindrical shape and a central axis 90C. The inverter module 44 is mounted inside the housing 12 and adapted to convert direct current electrical power to alternating current electrical power. The motor 54 is mounted inside the housing.

The compression device 18 is coupled to the motor 54 for receiving the refrigerant from the intake volume 74 and compressing the refrigerant as the motor 54 is rotated.

The compression device 18 has a central compression device outlet orifice 84A and first and second side compression device outlet orifices 84B for controllably releasing compressed refrigerant into the discharge volume 82 during a compression cycle. The compression device 18 is configured to release compressed refrigerant into the discharge volume 82 via the first and second side compression device outlet orifices 84B earlier in the compression cycle than refrigerant is released via the central discharge orifices 84A.

In addition, the oil separator 96 utilizes two parallel paths between the compression device 18 and the refrigerant outlet port 70 to reduce the net pressure drop while maintaining the reduction in this pulsation.

In the illustrated embodiment, the oil separator 96 may be located in the discharge volume 82 and integrally formed with the discharge head or front cover 28. As discussed above, oil is used to provide lubrication between the moving components of the electric compressor 10. During operation, the oil and the refrigerant become mixed. The oil separator 96 is necessary to separate the intermixed oil and refrigerant before the refrigerant leaves the electric compressor 10.

Generally, refrigerant is released from the compression device 18 during each cycle, i.e., revolution (or orbit) of the orbiting scroll 66. In the illustrated embodiment, refrigerant leaves the compression device 18 through the central orifice 84A and two side orifices 84B in the fixed scroll 26. Release of the refrigerant through the orifices, 84A, 84B is controlled by the central reed 87A and two side reeds 87B, respectively (see below).

In the illustrated embodiment, the oil separator 96 connects the discharge chambers (see below) by relatively small channels to create pressure drops between the chambers. This acts to smooth out the flow of compressed refrigerant out of the electric compressor 10. Additionally, the oil separator 96 utilizes two parallel paths between the compression device 18 and the refrigerant outlet port 70 to reduce the net pressure drop while maintaining the reduction in this pulsation.

The oil separator 96 may include a series of partitions 98A extending from an inner surface of the front cover 28. As shown, the walls 98A separate the discharge volume 82 into a central discharge chamber 82A, two side discharge chambers 82B, am upper discharge chamber 82C and the oil reservoir 98. The central discharge chamber 82A is adjacent the central reed 87A and receives intermixed pressurized refrigerant and oil from the compression device 18 through the central orifice 84 via the reed 87A. The side discharge chamber 82B are adjacent respective side reed 87B and receives intermixed pressurized refrigerant and oil from the compression device 18 through the side orifices 84B via respective reeds 87B. Generally, the pressure of the refrigerant in the chambers is: central discharge chamber 82A>side discharge chambers 82B>upper discharge chamber 82C.

The central discharge chamber 82A is in fluid communication with the two side discharge chambers 82B via respective side channels 100 which are in fluid communication with the upper discharge chamber 82C and the oil reservoir 98 via upper discharge channels 102 and lower discharge channels 104, respectively. In one embodiment, the side channels 100 extend at an acute angle through to the side discharge chambers 82B. The angle of the channels 100 further directs the impact of the discharging mixture of refrigerant and oil to further improve the separation and increase the amount of oil separated out by the oil separator 96. For example, in FIG. 19C, the side channels 100 extend through and downward into the side discharge chambers 82B at approximately a 45-degree angle relative to the inner wall of the central discharge chamber 82A. However, the angle may vary depending on the application or surface contours of the side discharge chambers 82C, and in some variations may increase to approximately 60 degrees. The angle may vary but is designed to direct the flow to create turbulence and direct the flow impact to create a tortuous path within the side discharge chambers 82C to increase the separation of oil into the lower discharge channels 104.

As shown, the oil separator 96 includes the central discharge chamber 82A and a lower baffle 132. In the illustrated embodiment, the lower baffle 132 is chevron-shaped (inverted "v") and is located between the central chamber 82 and the oil reservoir 98. The shape of the lower baffle 132 creates an area of low pressure directly underneath. Intermixed oil and refrigerant enter the central discharge chamber 82A and is drawn downward by the low-pressure area. The oil and refrigerant are separated when the intermixed oil and refrigerant comes into contact with the upper surface of the lower baffle 132. The oil drops into the oil reservoir 98.

Refrigerant may enter the side discharge chambers 82B via the side channels 100 and/or lower discharge channels 104. Refrigerant may then enter the upper discharge chamber 82B and then exit via the refrigerant outlet port 70.

The oil reservoir 98 is located below the pair of side chambers and is connected thereto via the respective lower discharge channels 104. The oil reservoir is configured to receive oil separated from the compressed refrigerant in the side chambers. Gravity acting on the oil assists in the separation and the oil falls through the lower discharge channels 104 located in the side discharge chambers 82B into the oil reservoir 98.

As discussed above, the reed mechanism 86 includes a discharge reed 86A and a reed retainer 86B which define the reeds 87A, 87B. The discharge reed 86A is used to tune the pressure at which the refrigerant is allowed to exit the compression device 18 through the central orifice 84A and two side orifices 84B, respectively.

Assembly and Electric Compressor with Non-Radial Clamping Feature

In another aspect of the present invention, the electric compressor 10 includes a cylindrical sleeve 170 configured to constrain the motor section 16 within the outer housing 12. As discussed in more detail below, the cylindrical sleeve 170 has a tubular side wall 172 and a top cover 174 defining an interior cavity 176. The interior cavity 176 has an open end 178. The cylindrical sleeve 170 is configured to receive the motor section 16 or motor 54, together create a singular module assembly 210.

The tubular side wall 172 and the top cover 174 may be composed from aluminum. In embodiment, the tubular side wall 172 and the top cover 174 are one piece. For example. The cylindrical sleeve 170 may be cast as a single piece and then machined. Alternatively, the tubular side wall 172 and the top cover 174 are separate pieces and then fastened together by any suitable methods, such as welding or using clamps or other means.

In a first embodiment of the present invention, the electric compressor 10 is configured to compress a refrigerant. The electric compressor 10 includes the housing or outer housing 12, the refrigerant inlet port 68, the refrigerant outlet port 70, the inverter module 44, the motor 54, the drive shaft 90, the cylindrical sleeve 170, and a compression device 18. The housing 12 defines an intake volume 74 and a discharge volume 82 and has a generally cylindrical shape and a central axis 90C.

The refrigerant inlet port 68 is coupled to the housing 12 and configured to introduce the refrigerant to the intake volume 74. The refrigerant outlet port 70 is coupled to the housing 12 and is configured to allow compressed refrigerant to exit the electric compressor 10 from the discharge volume 82. The inverter module 44 is mounted inside the housing 12 and is adapted to convert direct current electrical power to alternating current electrical power. The motor 54 is mounted inside the housing 12. The drive shaft 90 is coupled to the motor 54.

The cylindrical sleeve 170 has a tubular side wall 172 and a top cover 174 defining an interior cavity 176. The interior cavity 176 has an open end 178. The cylindrical sleeve 170 is configured to receive the motor 54 therein and constrain the motor 54 within the interior cavity 176.

The compression device 18 is coupled to the drive shaft 90 and receives the refrigerant from the intake volume and compresses the refrigerant as the drive shaft 90 is rotated by the motor 54. The clamping mechanisms 170 are discussed in further detail below.

In a second embodiment of the present invention, an assembly 210 includes a housing 12, a motor 54, a drive shaft 90, and a cylindrical sleeve 170. The housing 12 has a generally cylindrical shape and has a central axis 90C. The motor 54 is mounted inside the housing 12. The drive shaft 90 is coupled to the motor 54. The cylindrical sleeve 170 has a tubular side wall 172 and a top cover 174 defining an interior cavity 176. The interior cavity 176 has an open end 178. The cylindrical sleeve 170 is configured to receive the motor 54 therein and constrain the motor 54 within the interior cavity 176. As discussed in further detail below, the module assembly of the cylindrical sleeve 170, with the housing 12, allow for ease of aligning the concentricity of the sleeve 170, stator 58, and circular drive shaft supporting member 218, relative to the housing 12, with a rotational location for alignment with the mating components simplified by rotational orientation being determined by a rotational feature 194 (see below).

In a third embodiment of the present invention, an electric compressor 10 having a central axis 90C and being configured to compress a refrigerant, is provided. The compressor 10 includes the housing 12, the refrigerant inlet port 68, the refrigerant outlet port 70, the inverter section 14, the motor section 16, the compression device 18 and the cylindrical sleeve 170.

The housing 12 defines an intake volume 74 and a discharge volume 82. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the electric compressor 12 from the discharge volume 82.

The inverter section 14 includes an inverter housing 22, an inverter back cover 20, and an inverter module 44. The inverter back cover 20 is connected to the inverter housing 22 and forms an inverter cavity 30. The inverter module 44 is mounted inside the inverter cavity 30 and is adapted to convert direct current electrical power to alternating current electrical power.

The motor section 16 includes the drive shaft 90 and the motor 54. The drive shaft 90 is located within the housing 12. The motor 54 is located within the housing 12 to controllably rotate the drive shaft 90.

The compression device 18 is coupled to the drive shaft 90 for receiving the refrigerant from the intake volume 74 and for compressing the refrigerant as the drive shaft 90 is rotated by the motor 54. The compression device 18 includes a fixed scroll 26 and an orbiting scroll 66. The fixed scroll 26 is located within, and being fixed relative to, the housing 12. The orbiting scroll 66 is coupled to the drive shaft 90. The orbiting scroll 66 and the fixed scroll 26 form compression chambers 58 for receiving the refrigerant from the intake volume 74 and for compressing the refrigerant as the drive shaft 90 is rotated. The cylindrical sleeve 170 has a tubular side wall 172 and a top cover 174 defining an interior cavity 176. The interior cavity 176 has an open end 178. The cylindrical sleeve 170 is configured to receive the motor section 16 therein and constrain the motor 54 within the interior cavity 176.

With specific reference to FIGS. 22A-22K, a first illustrated embodiment of the cylindrical sleeve 170 is shown. The cylindrical sleeve 170 includes a tubular side wall 172 and a top cover 174 forming an interior cavity 176 and an open end 178. The cylindrical sleeve 170 encloses the motor section 16 or motor 54. The cylindrical sleeve 170 constrains the motor 54 therein. As will be disclosed in further detail below, the cylindrical sleeve 170 is constrained within the housing 22 of the electric compressor 10.

In the illustrated embodiment, the motor 54 includes a stator 58 having an outer diameter 180. The interior cavity 176 of the cylindrical sleeve 170 has an inner diameter 182. The outer diameter 180 of the stator 58 and the inner diameter 176 of the cylindrical sleeve 170 are configured to establish an interference fit therebetween. In one embodiment the interference between the outer diameter 180 of the stator 58 and the inner diameter 176 cylindrical sleeve 170 may be between 100 and 300 microns. In one embodiment, the interference may be approximately 200 microns.

In the first illustrated embodiment, the cylindrical sleeve 170 has an outer diameter 184. As discussed above, the housing 12 defines a motor cavity 56 with an inner diameter 186. A slip fit between the outer diameter 184 of the cylindrical sleeve 170 and the inner diameter 186 of the motor cavity 56 maintains a concentric relationship between the cylindrical sleeve 170 and motor/motor section 54/16. The slip fit between the outer diameter 184 of the cylindrical sleeve 170 and the inner diameter 186 of the motor cavity 56 is established by an interference therebetween (see below). The slip fit between the outer diameter 184 of the cylindrical sleeve 170 and the inner diameter 186 of the motor cavity 56 may be either a tight slip fit or a loose interference fit. The tight slip fit relationship or a loose interference fit reduces the chances of causing an out of round or distortion to the housing 12, this is further described in related application Ser. No. 18/147.913 filed on same day as the present application (see above) and incorporated by reference herein.

The rotational feature 194 may be provided to allow the cylindrical sleeve 170 and motor 54 or motor section 16 to be positioned correctly within the housing 12. In the illustrated embodiment, the rotational feature 194 includes at least one tab 196 extending from an outer surface of the cylindrical sleeve 170. The at least one tab 196 fits within a corresponding slot 198 on an interior surface of the housing 12.

In one embodiment, the slot 198 is configured to receive the at least one tab 196 to position the cylindrical sleeve 170 and motor 54 or motor section 16 to be positioned correctly within the housing 12. The slot 198 may be machined within the housing 12 to provide a tight or press-fit relationship between the at least one tab 196 and the corresponding slot 198.

In another embodiment, the rotational feature 194 may include a pin 214 and the at least one tab 198 may include an aperture 216 for receiving the pin 214 for more accurate positioning of the cylindrical sleeve 170 and motor 54 or motor section 16 within the housing 12. The pin 214 may be cast and/or machined unitarily with the housing 12 or may be a separate component and press fit through an aperture of the tab 196 and secured within an aperture located at the bottom of the slot 198 within the housing 12.

As discussed above, the housing 12 defines a cavity or inverter cavity 30. An inverter circuit 46 is located within the inverter cavity 30 and provides power to the motor 54 to control the rotational speed and direction of the motor 54 and the electric compressor 10 via a plurality of power terminals 188. In the illustrated embodiment, the power terminals 188 extend from the motor cavity 56 to the circuit cavity 30 through apertures 190 in the top cover 174. Grommets or o-rings 192 may provide sealing around the power terminals 188.

The rotational feature 194 assists in maintaining concentricity and/or positioning of elements of the compressor 10 within the housing 12 by correctly positioning the motor 54 or motor section 16 within the sleeve 170 and the sleeve 170 within the housing 12. Generally, the motor section 16 or motor 54 is assembly and inserted within the cylindrical sleeve 170. During the assembly process, the cylindrical sleeve 170 may be heated before the motor section 16 or motor 54 is inserted therein. The cylindrical sleeve 170 may then be cooled or allowed to cool to create a tight fit between the cylindrical sleeve 170 and the motor section 16 or motor 54.

The pin 214 provides for easier assembly and rotational relationship between the motor section 16 within the housing 12. In addition, the rotational feature 194 allows for the cylindrical sleeve 170 to maintain concentricity within the motor 54 and locate and align the mating components of the compressor 10. For example, the cylindrical sleeve 170 creates a module that allows for concentrical alignments between the sleeve 170, power terminals 188, and concentric alignment of the stator 60 to the circular drive shaft supporting member 218 for positioning the ball bearing 62 without distortion being created by the commonly used press-fit or shrink fit of the prior art by securing of the stator 60 directly into the housing 12, or additional locating steps as the compressor is being assembled. The concentric relationship is simplified by the module, and this further improves the NVH aspects of the compressor 10 or any out of axis rotational misalignments that may be created by the distortions, or assembly misalignments between the motor 54, to the drive shaft 90 and the rotational motion within the compression device 18.

If the tubular side wall 172 and the top cover 174 of the cylindrical sleeve 170 are integral, then the first bearing 62 is positioned within the circular drive shaft supporting member 218 or assembled with the cylindrical sleeve 170 and motor section 16 or motor 54. Otherwise, the top cover 174 may be a separate component with the first bearing 62 being secured first within circular drive shaft supporting member 218, and the top cover 174 are assembled thereafter, and the motor section 16 secured into the cylindrical sleeve 170, create the integrated module assembly 210, that is then as a single unit mated to and secured within the inner diameter 186 of the motor cavity 56.

The first bearing 62 within the circular drive shaft supporting member 218, combined and concentrically aligned with the cylindrical sleeve 170 and the motor section 16 or motor 54 may then be placed in the housing 12 and positioned at the correct orientation using the rotational feature 194. This arrangement ensures that all components are positioned for alignment within the housing and concentrically located within the housing 12 and correctly aligned for mating the other components of the compressor 10.

Additionally, this ensures that the location of the power terminals 188 are positioned correctly relative to the housing 12 so that the inverter section 14 and inverter back cover 20 may be more easily positioned thereon and fastened using the fasteners 32, 34.

Additionally, the cylindrical sleeve 170 may include a slot or channel 212 located around a periphery of the cylindrical sleeve 170. The slot 212 may be configured to receive an o-ring (not shown) to hermetically seal the circuit cavity 30 from the motor cavity 56 (to keep refrigerant from entering the circuit cavity 30. And in one illustrated embodiment, FIGS. 22B and 22C, the o-ring may be axially located between the windows 200,202 and the top cover 174 to further provide an additional seal refrigerant and lubricant from the power terminals 188. This additional seal may further reduce current loss or creep. The o-ring seal allows the upper surface of the top cover 174 between the inverter housing 22 when mated to remain refrigerant free to avoid any contact or current loses with creep of current into the refrigerant. However, this sealing may also create additional challenges since the inverter circuits 46 creates heat, and a flow or heat sink may be required to be in contact with the refrigerant to dissipate such heat. Alternatively, additional refrigerant flow may have to be directed through the windows 200, 202 in this embodiment.

The tubular side wall 172 of the cylindrical sleeve 170 may also include at least one window 200 configured to allow an encapsulation material to be applied to an interior of the motor 54. For example, encapsulation material may need to be deposited to cover and isolate the junction between the power terminals 188 of the motor 54 and the electrical leads supplying power to the motor 54 from the power circuit 46. The encapsulation material further reduces any current losses from the stator and junction into the refrigerant and lubrication circulating through the compressor 10.

Figure 23A:
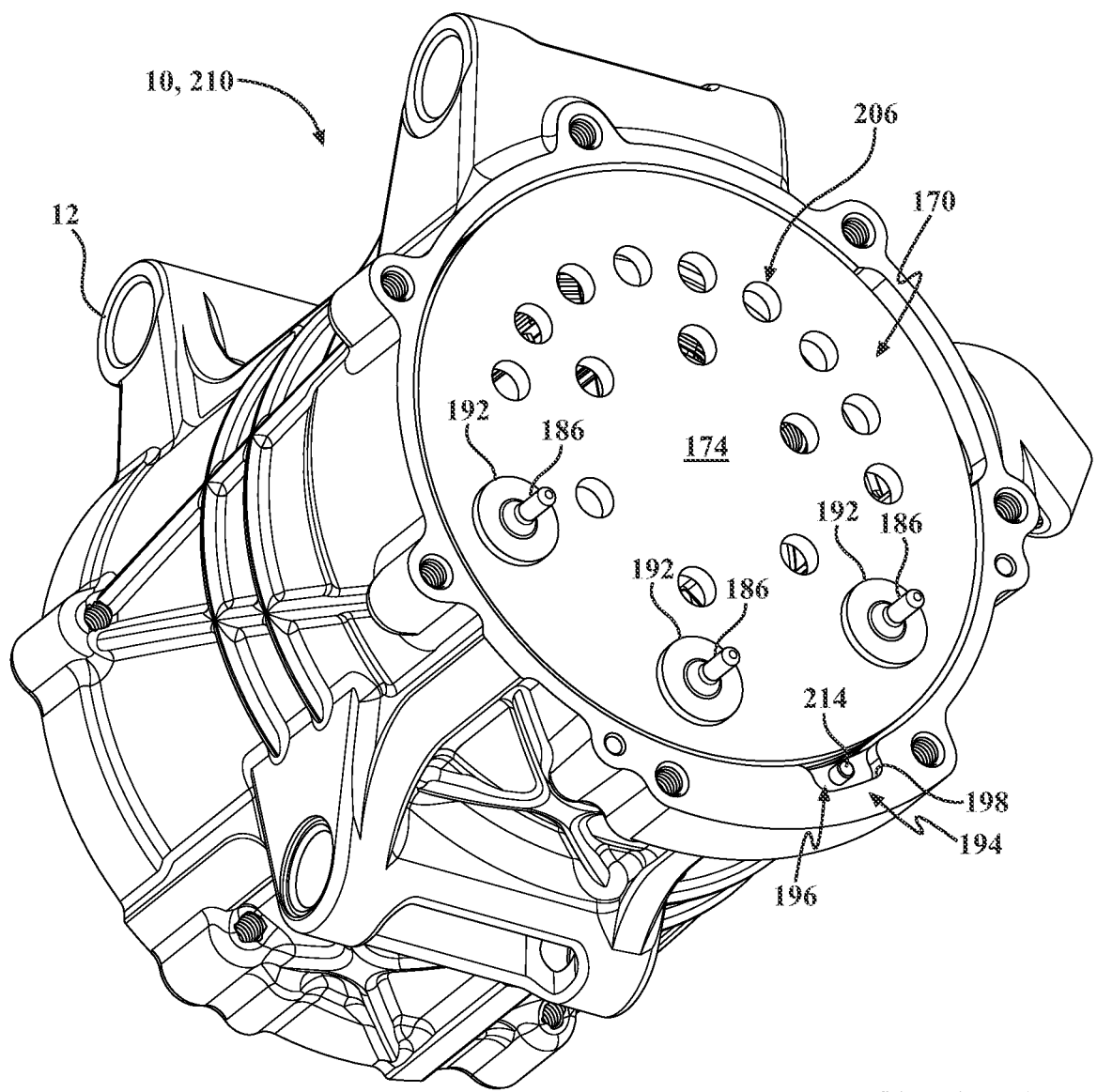
FIG. 23A is a perspective view of a compressor having a housing and a cylindrical sleeve partially enclosing a, according to a second embodiment of the present invention.
Figure 23B:
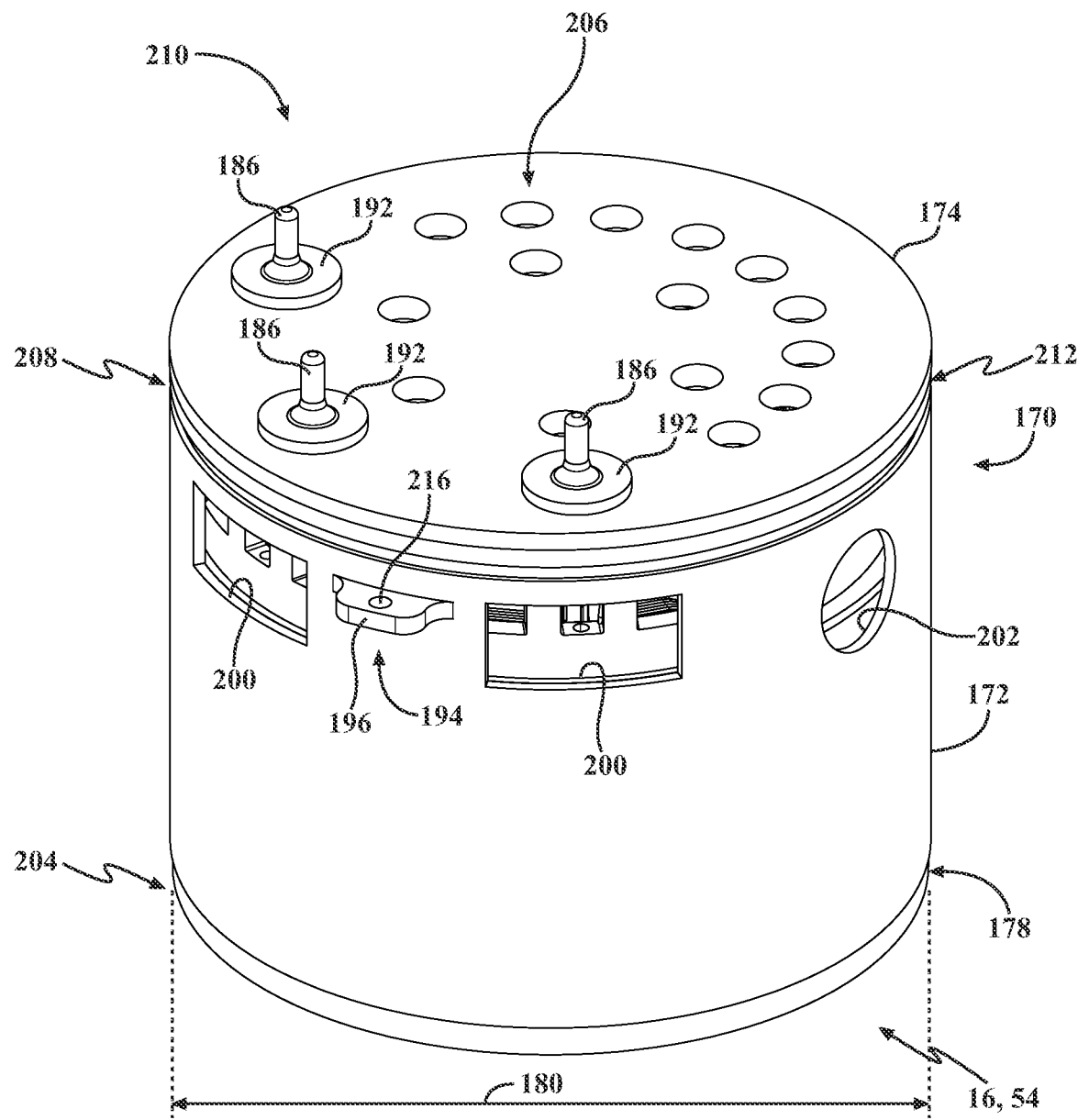
FIG. 23B is a perspective view of the cylindrical sleeve and a motor of FIG. 23A.
Figure 23C:
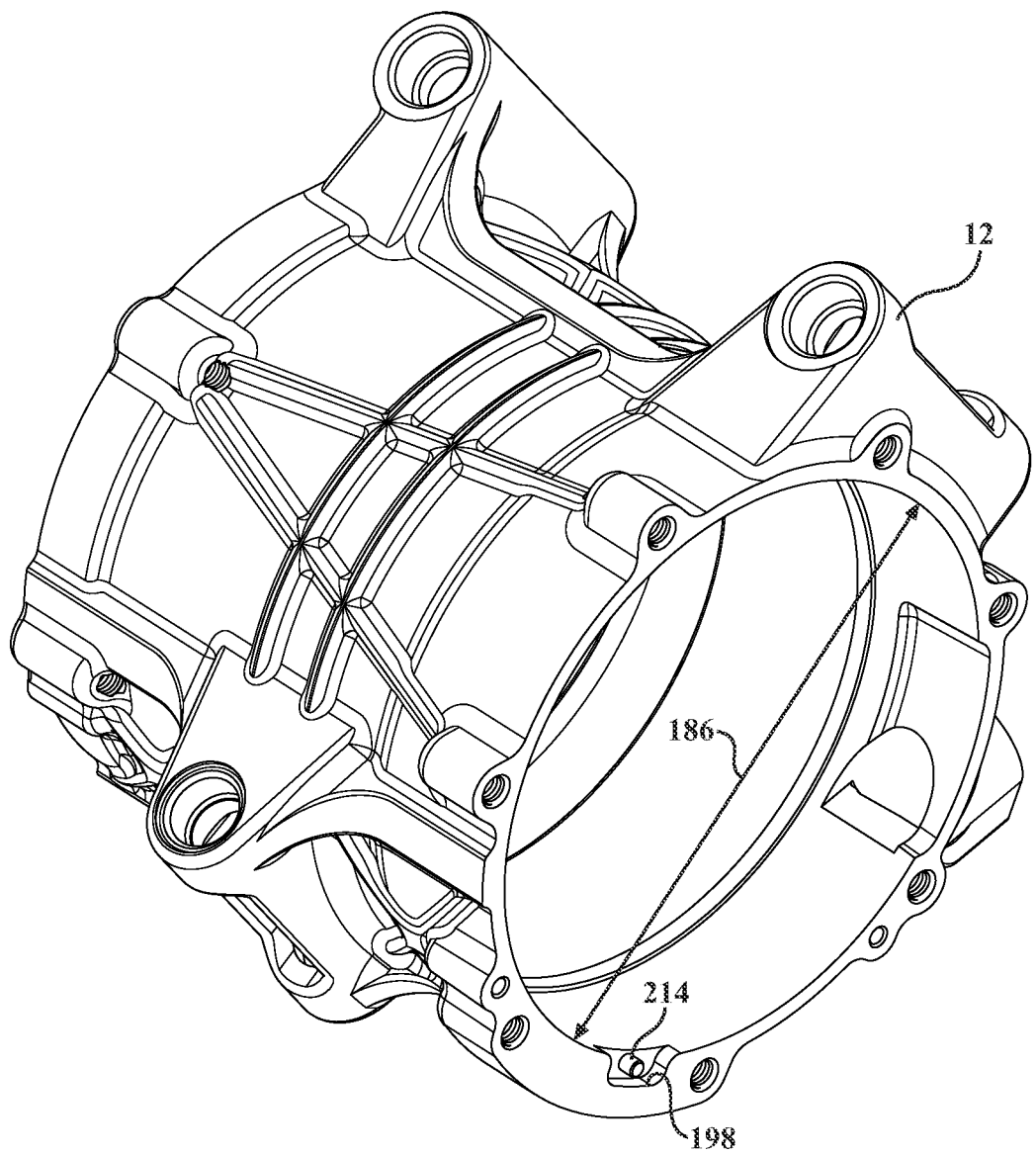
FIG. 23C is a first perspective view of the housing of the compressor of FIG. 23A.
Figure 23D:
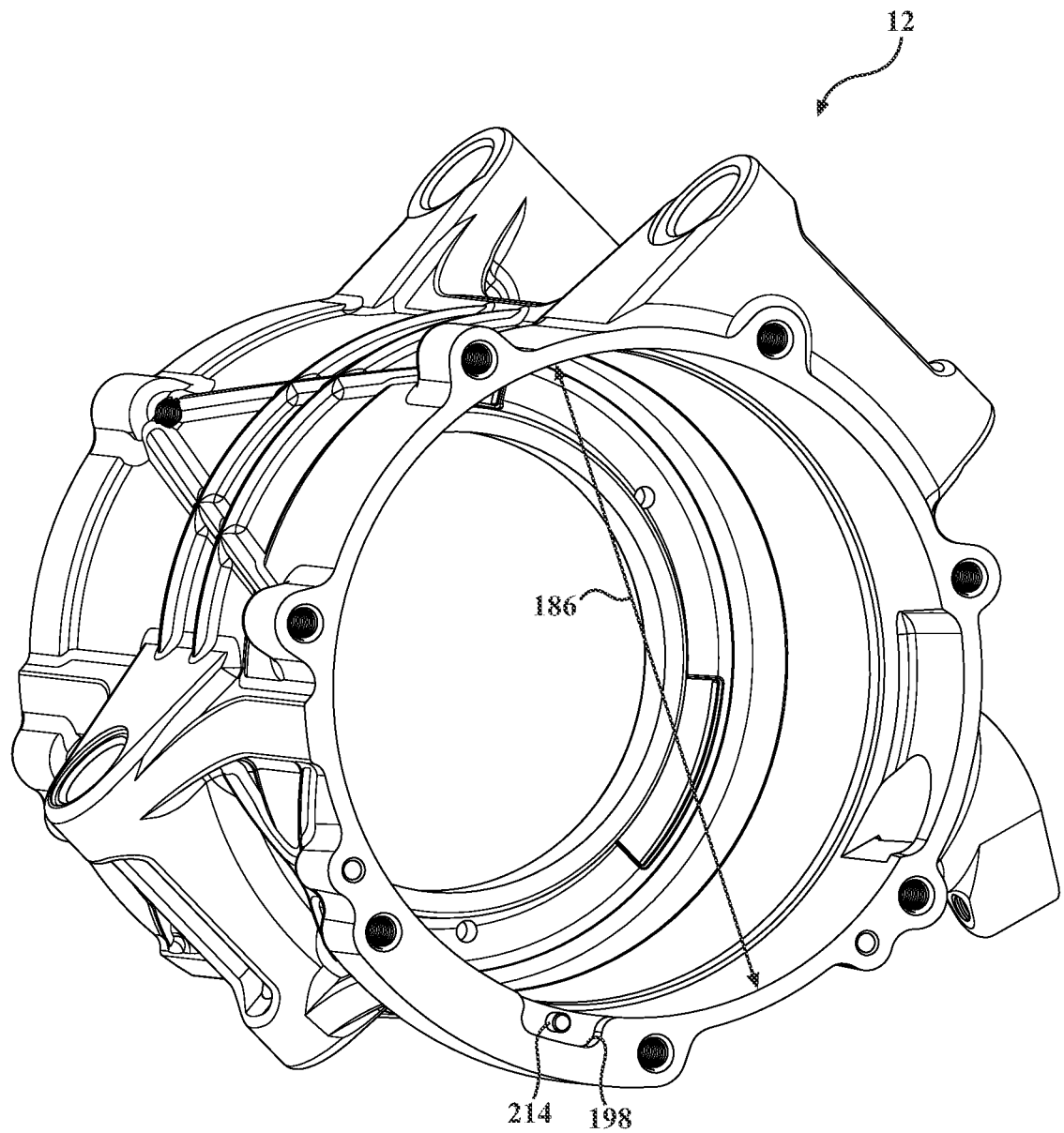
FIG. 23D is a second perspective view of the housing of the compressor of FIG. 23A.
Figure 23E:
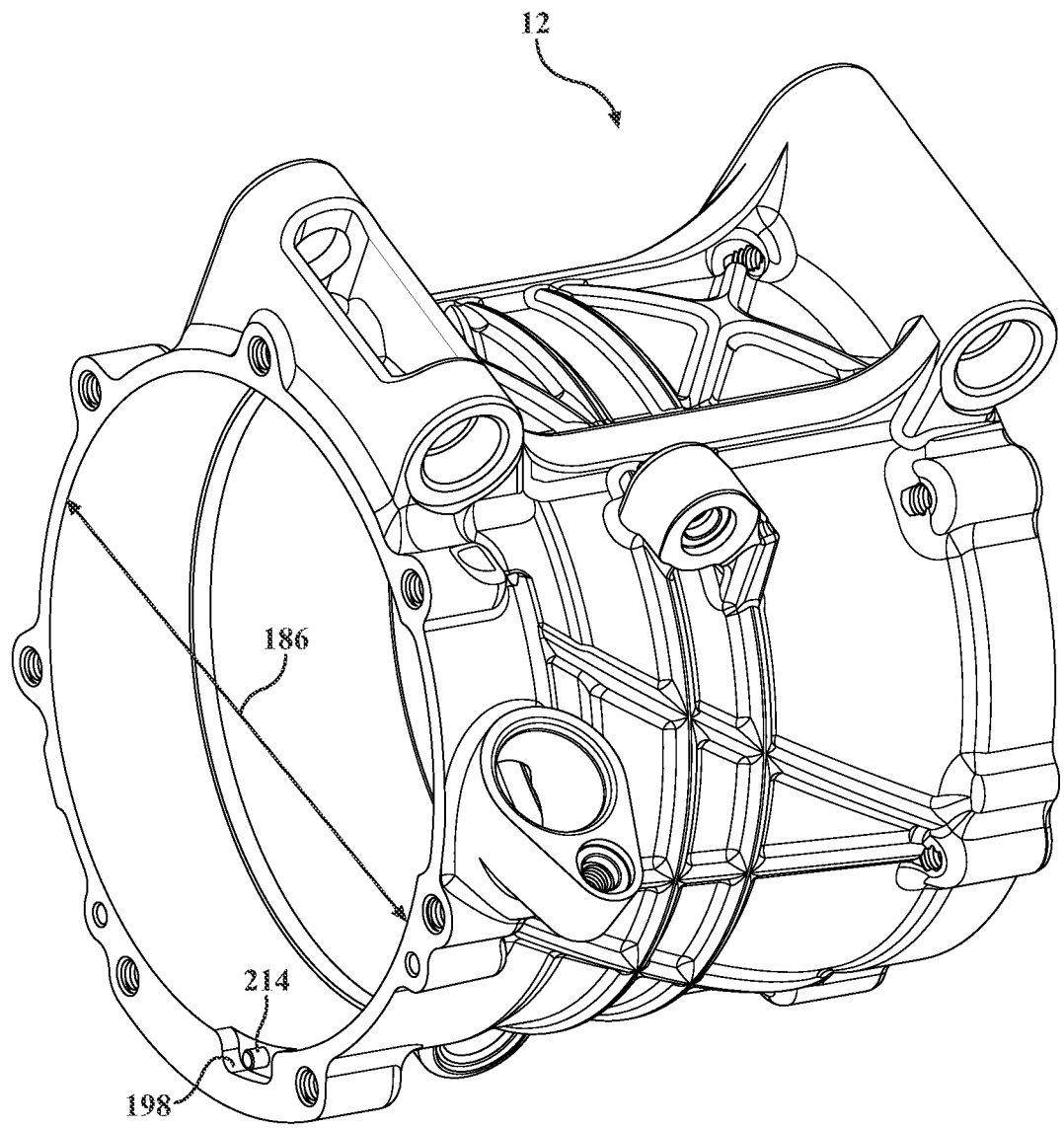
FIG. 23E is a third perspective view of the housing of the compressor of FIG. 23A.

In addition, the tubular side wall 172 of the cylindrical sleeve 170 may include a refrigerant inlet window 202 to allow refrigerant to enter the intake volume 74. As shown in FIG. 23A, the inlet window 206 reduces the flow restrictions to the refrigerant entering into the compressor 10 and allow for additional flow of refrigerant to flow through the inverter electronics 46 and increase flow through the stator and rotor area of the drive motor. This may be advantageous for higher demand applications. Also, this arrangement with the inlet windows 206 may allow for the slot 212 for the o-ring to be positioned to function more as a noise and vibration damper at any location along the length of the sleeve 170.

As discussed above, the motor 54 has an end located adjacent the open end 178 of the cylindrical sleeve 170. The lower end of the cylindrical sleeve 170 has a lower concentric locating feature 204 configured to be received within a motor receiving portion of the housing 12 to assist in maintaining the motor and stator are concentric within the housing 12. An upper concentric locating feature 208 located at an upper end of the cylindrical sleeve 170 assists in maintaining the concentricity of the motor 54 within the housing 12, as well as the positioning of the bearing 62 within the electric compressor 10. The concentric locating features 204, 208 also help increase the isolation between the motor 54 and the housing 12, thereby improving noise, vibration, and harshness (NVH) characteristics of the electric compressor 10. In one embodiment, the concentric locating features 204, 208 maintenance an interference fit between with the housing 12. For example, in a specific embodiment, the interference between the outer diameter 184 of the cylindrical sleeve 170 at the concentric locating features 204, 208 and the inner diameter 186 of the motor cavity 56 may be between 40 and 100 microns. The relationship between the motor cavity 56 and the outer diameter 184 of the cylindrical sleeve 170 outside the locating features 204,208 may be defined by a slip fit or very light or small negative interference fit. The concentric locating features 204, 208 and the slot or channel 212 may be machined in the sleeve 170, and the length of the cylindrical sleeve 170 may then not impart a radial force and thereby reducing or eliminating the prior art issue with radial distortion.

Figure 22A:
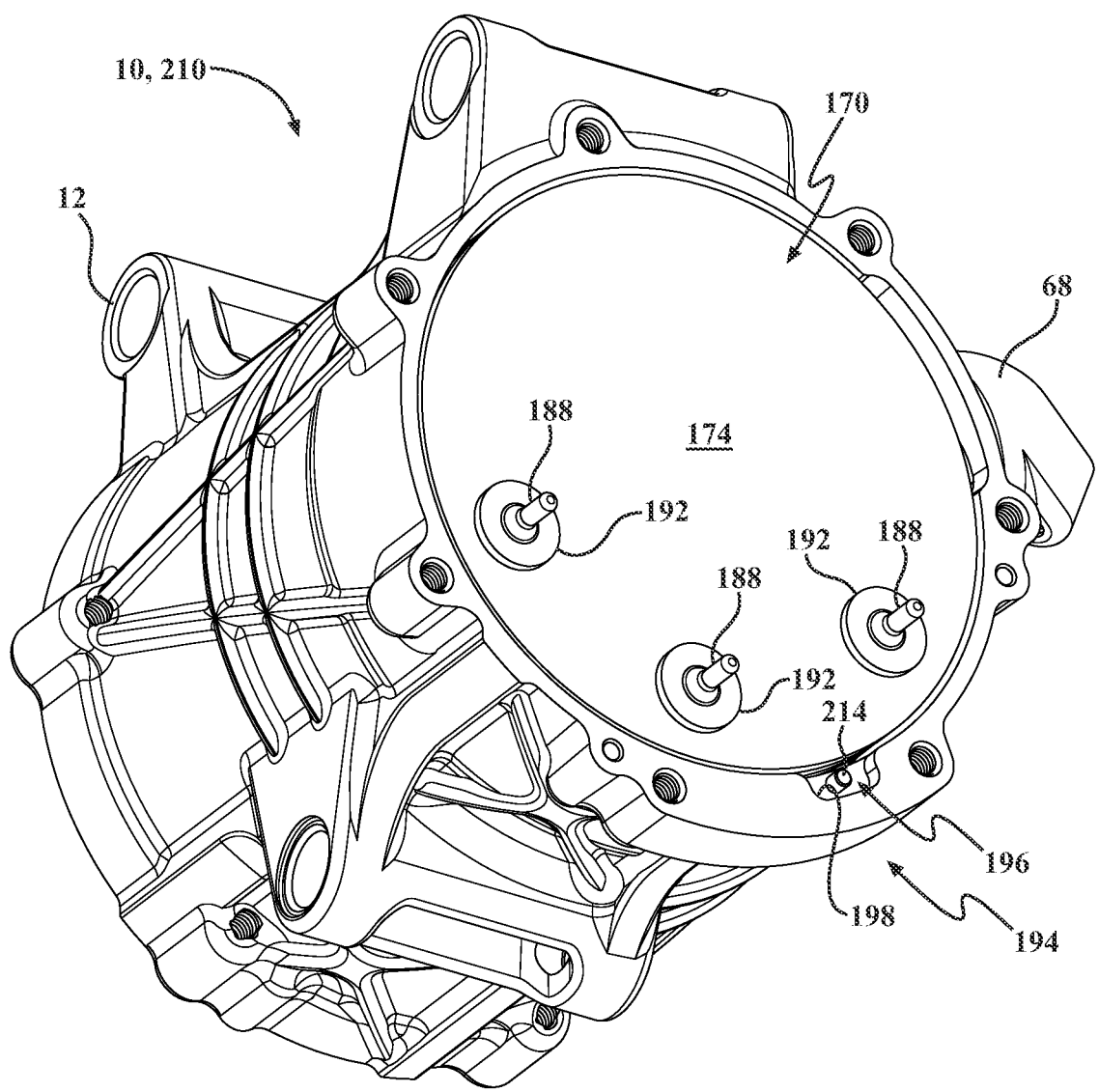
FIG. 22A is a perspective view of a compressor having a housing and a cylindrical sleeve partially enclosing a, according to an embodiment of the present invention.
Figure 22B:
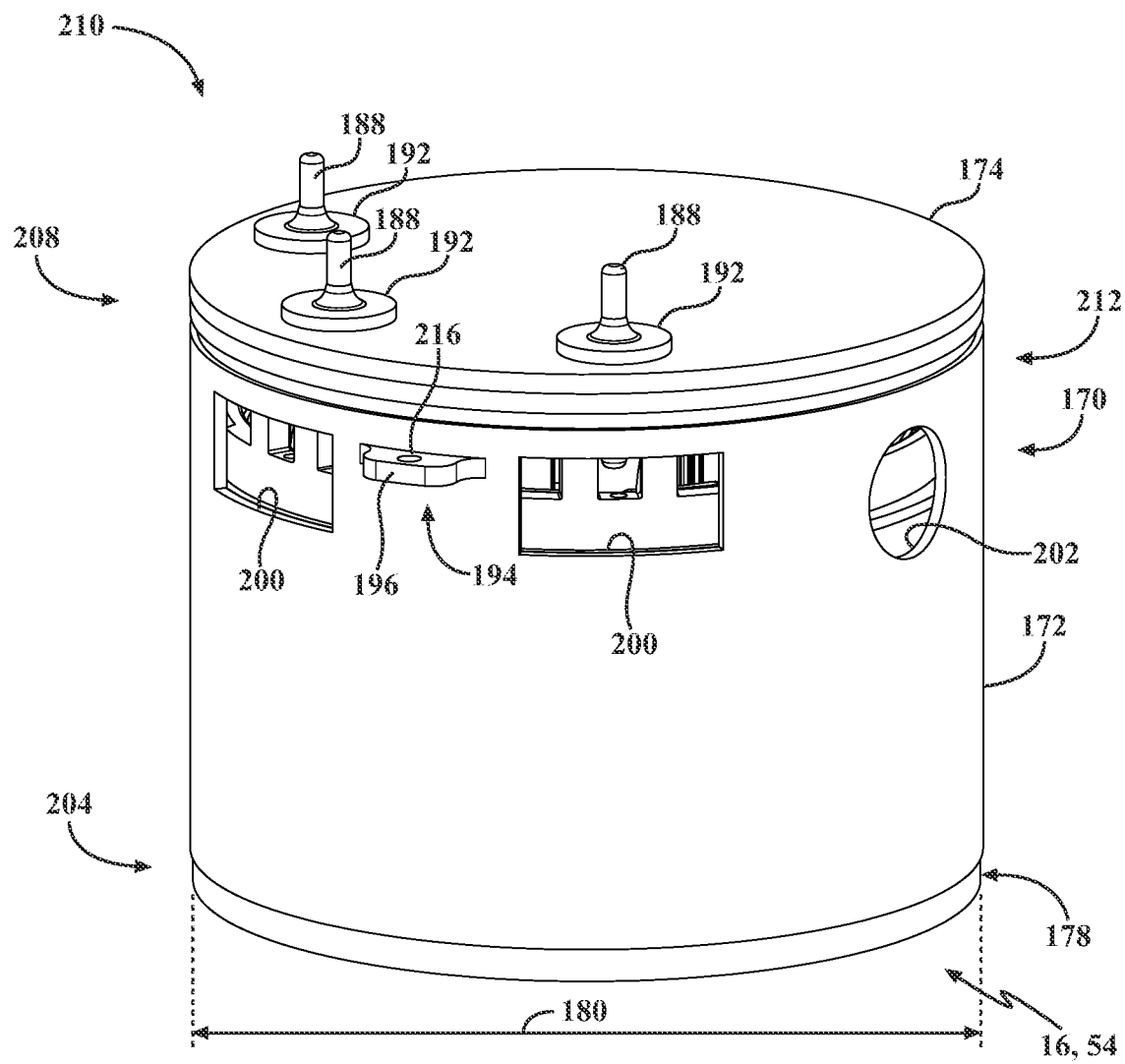
FIG. 22B is a perspective view of the cylindrical sleeve and a motor of FIG. 22A.
Figure 22D:
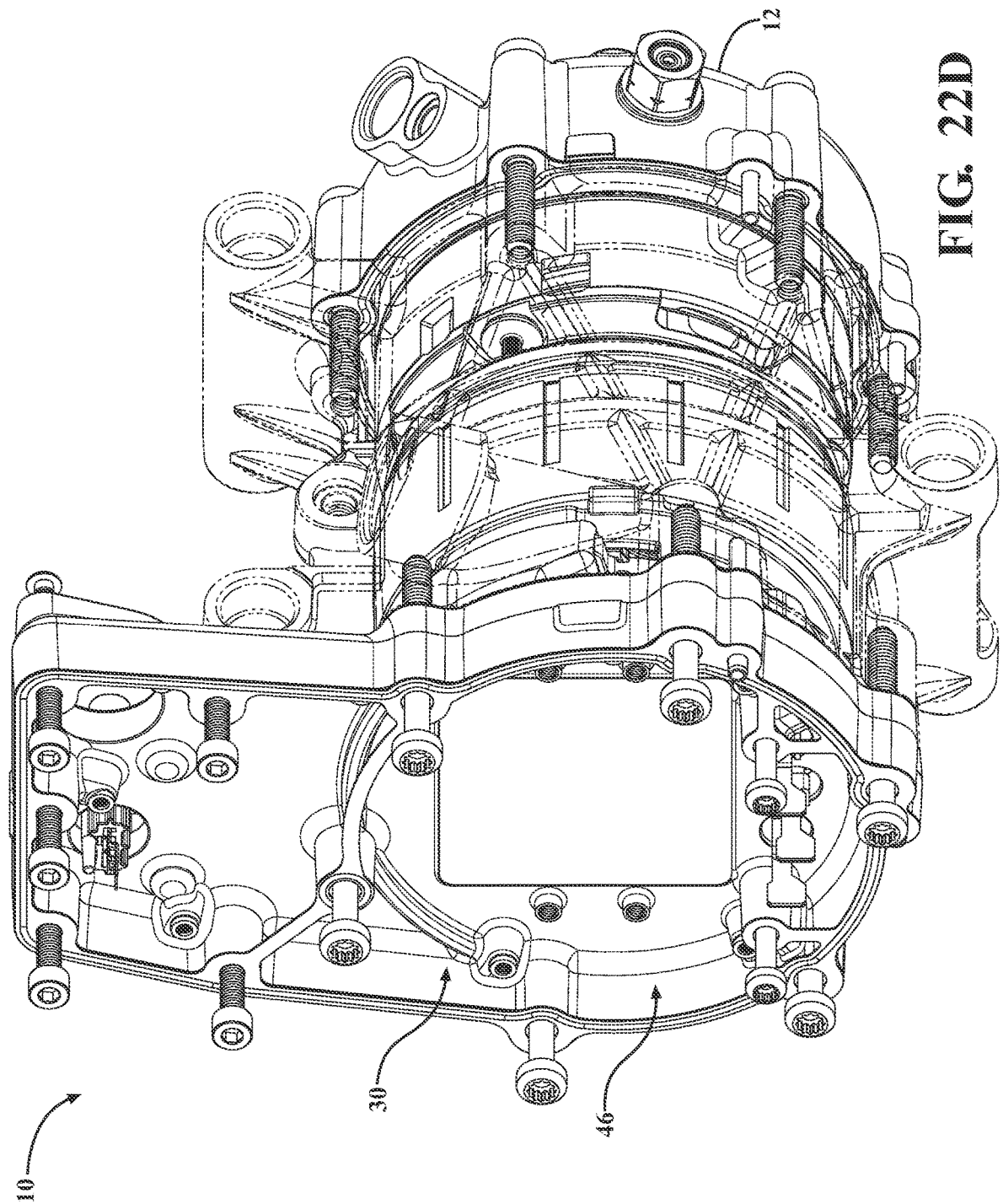
FIG. 22D is a third perspective view of the cylindrical sleeve and motor of the compressor of FIG. 22A illustrating a circuit cavity.
Figure 22E:
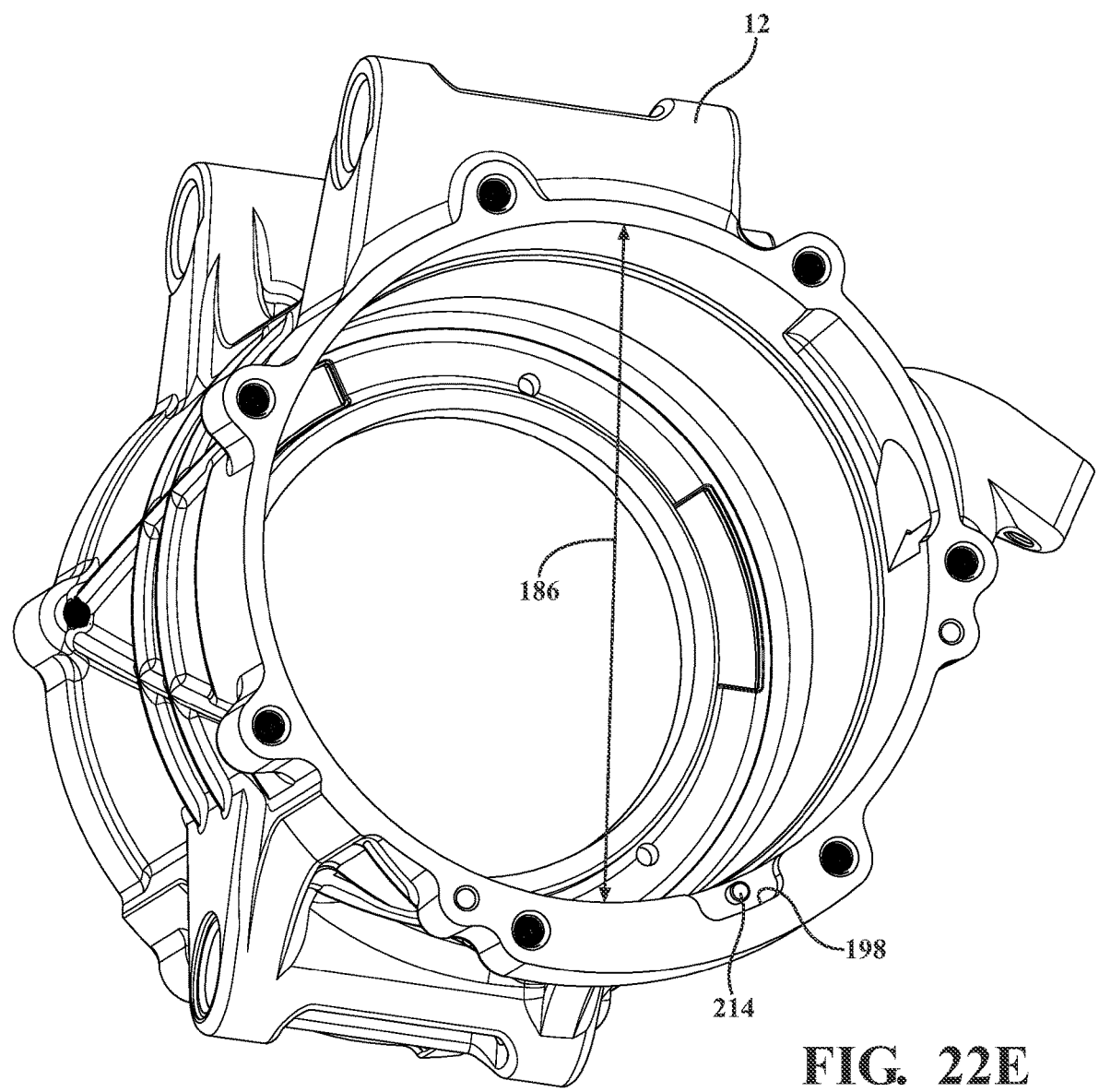
FIG. 22E is a first perspective view of the housing of the compressor of FIG. 22A.
Figure 22F:
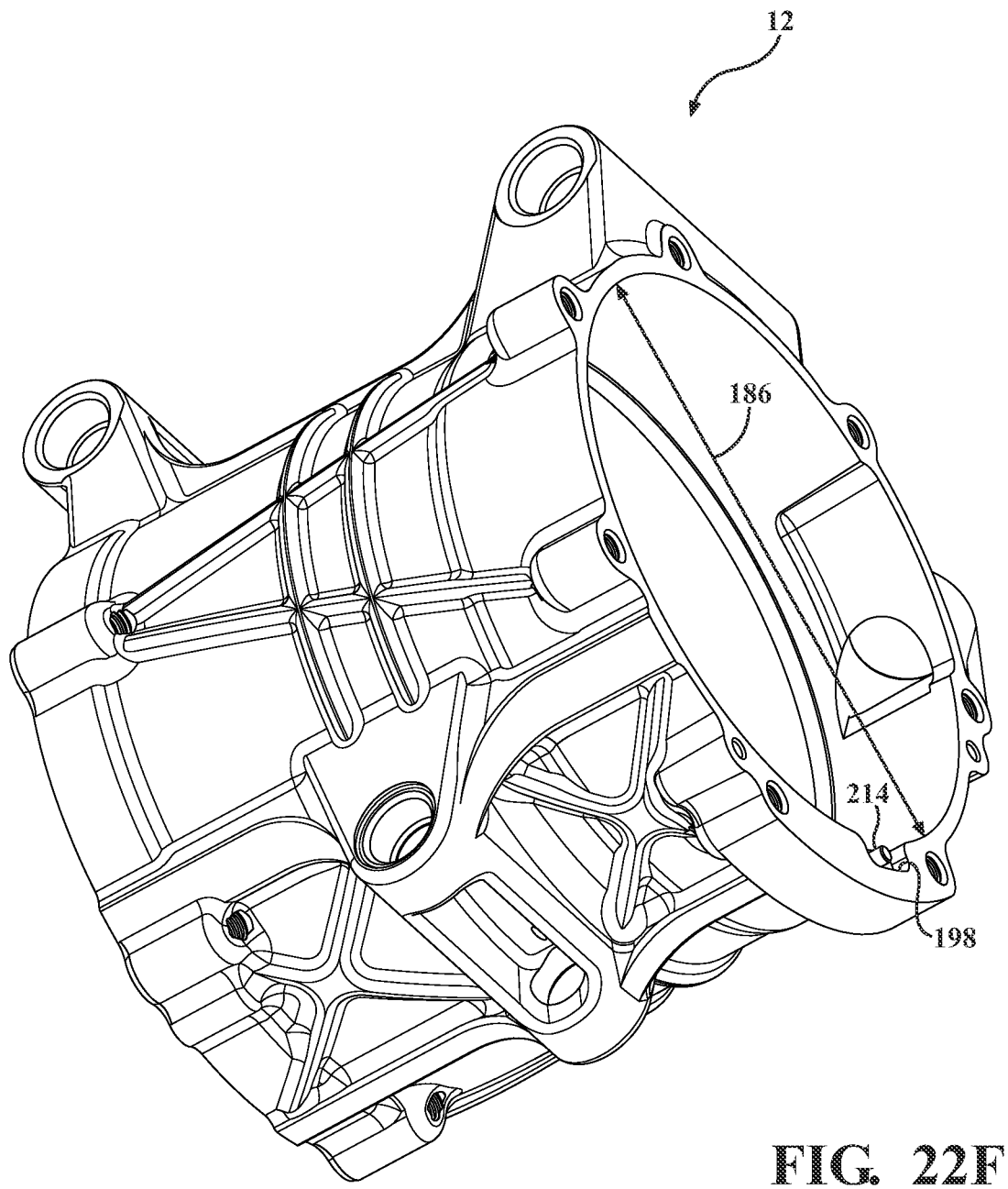
FIG. 22F is a second perspective view of the housing of the compressor of FIG. 22A.
Figure 22G:
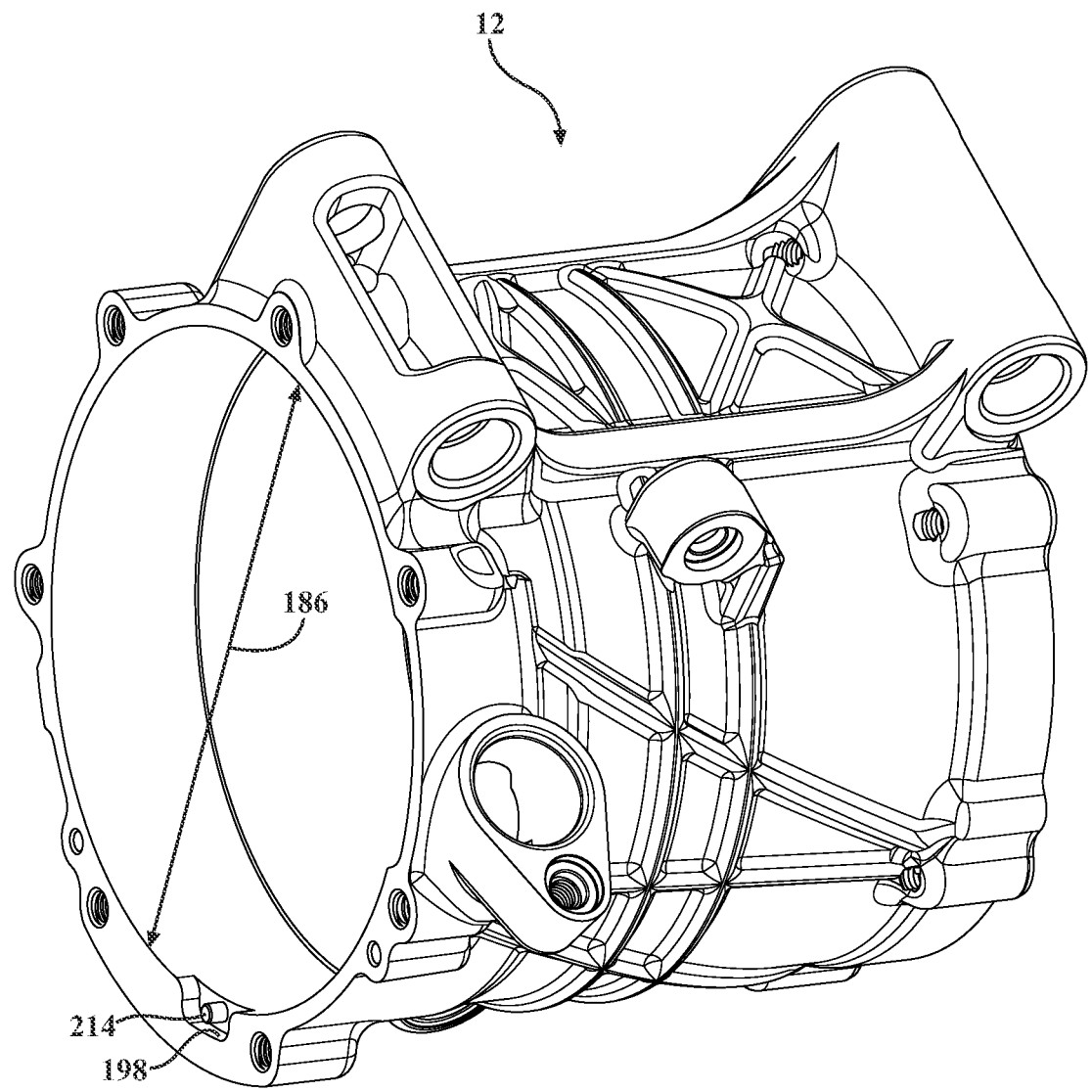
FIG. 22G is a third perspective view of the housing of the compressor of FIG. 22A.
Figure 22H:
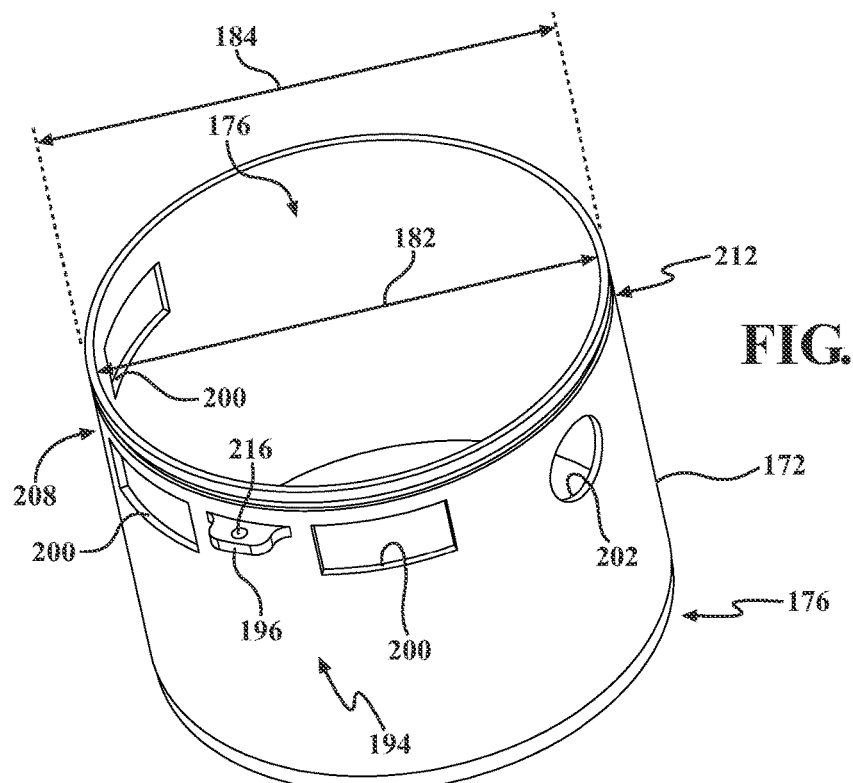
FIG. 22H is a first perspective view of a portion of the cylindrical sleeve of the compressor of FIG. 22A.
Figure 22I:
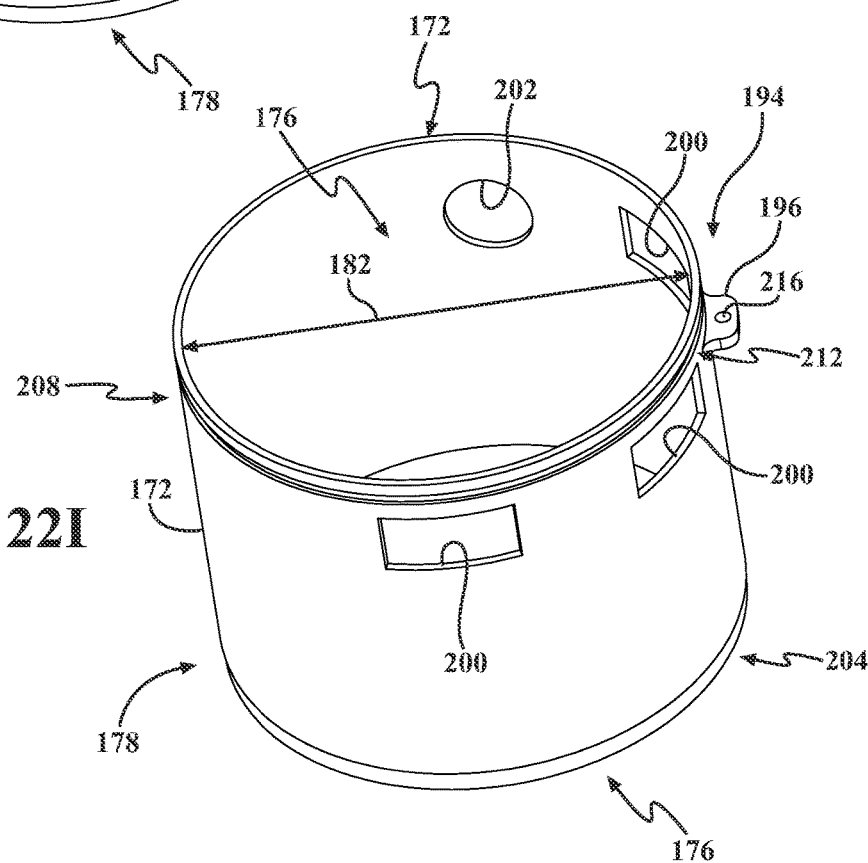
FIG. 22I is a second perspective view of a portion of the cylindrical sleeve of the compressor of FIG. 22A.
Figure 22J:
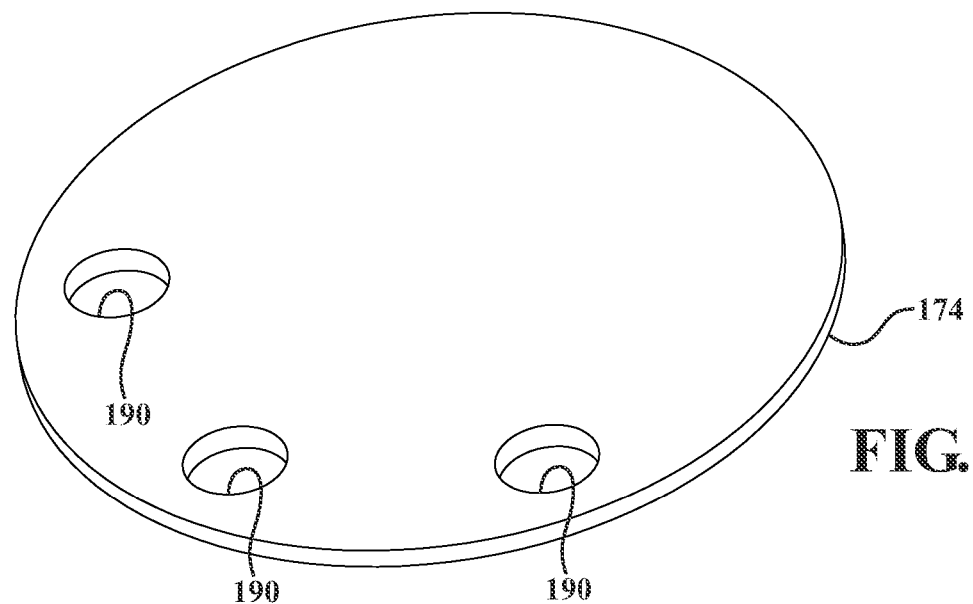
FIG. 22J is a first perspective view of a top portion of the cylindrical sleeve of the compressor of FIG. 22A.
Figure 22K:
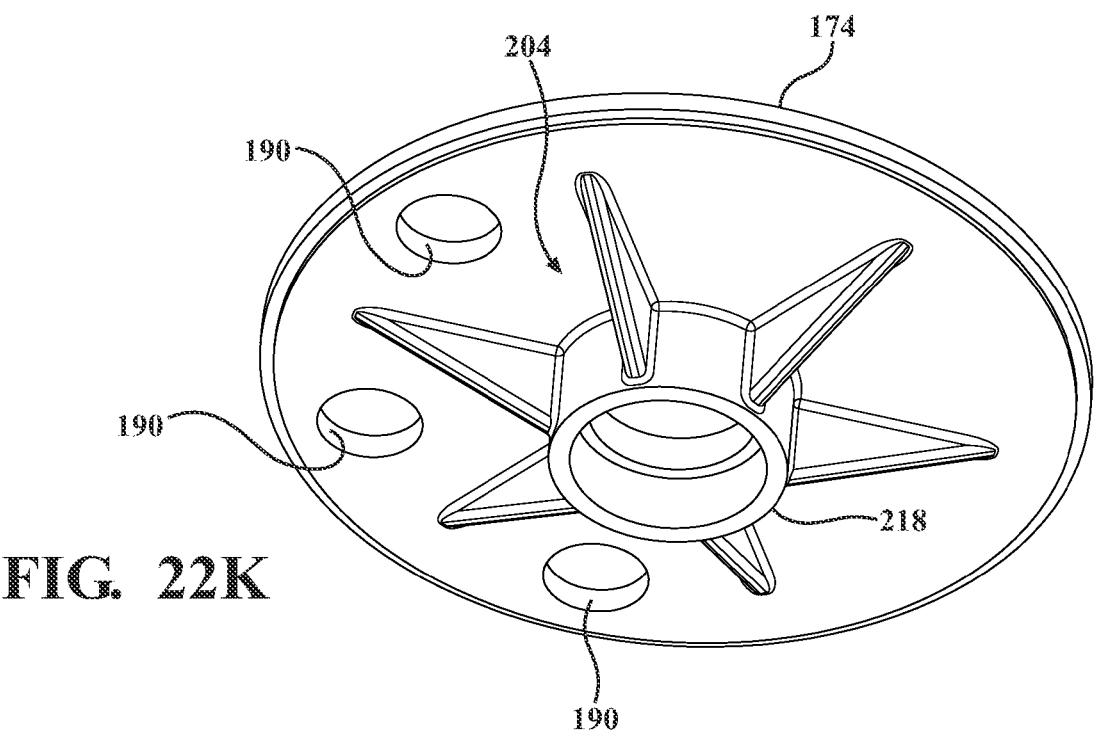
FIG. 22K is a second perspective view of a portion of the cylindrical sleeve of the compressor of FIG. 22A.
Figure 22L:
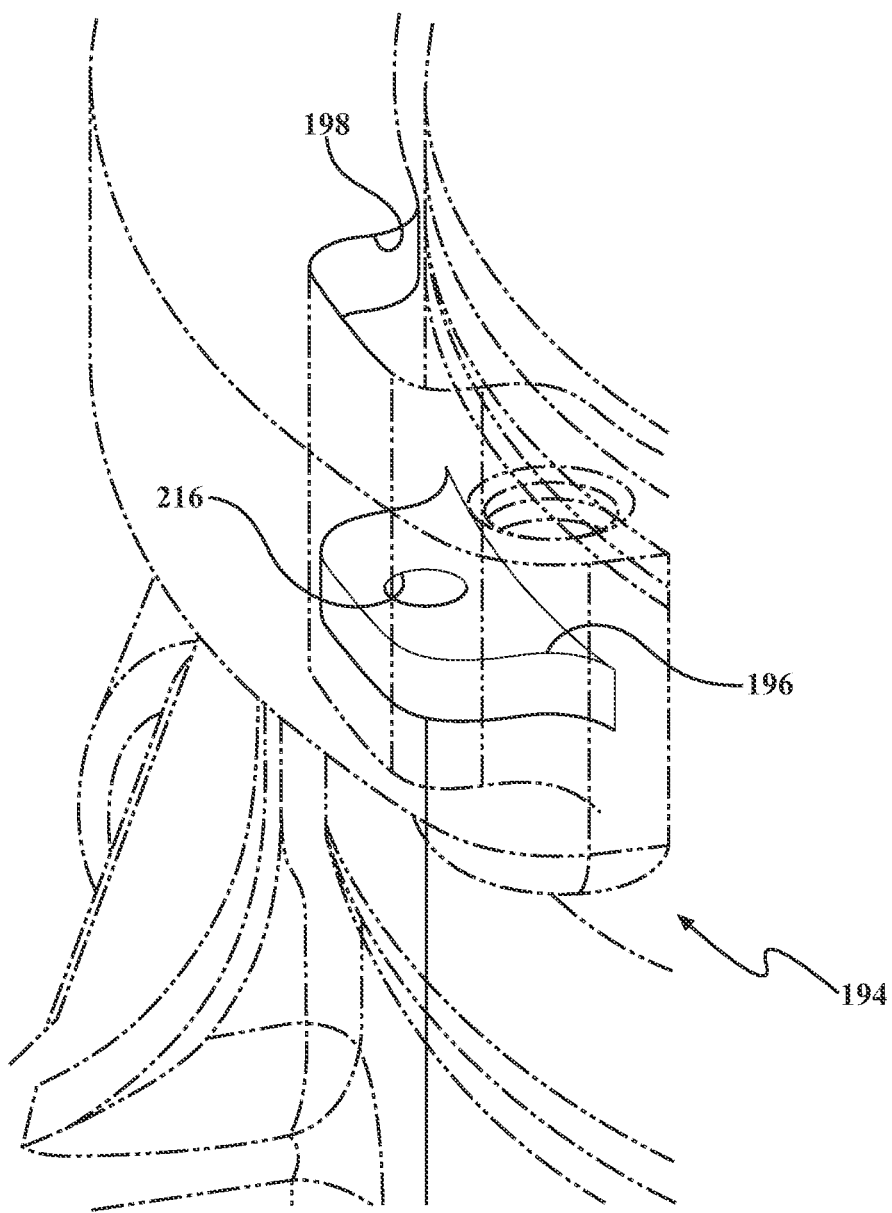
FIG. 22L is an exploded view of a portion of the compressor of FIG. 22A.

With reference to FIG. 22K, a bottom surface of the top cover 174 of the cylindrical sleeve 170 may include a circular drive shaft supporting member 218 for receiving the ball bearing 62 associated with one end of the drive shaft 90A of the motor 54.

Figure 23H:
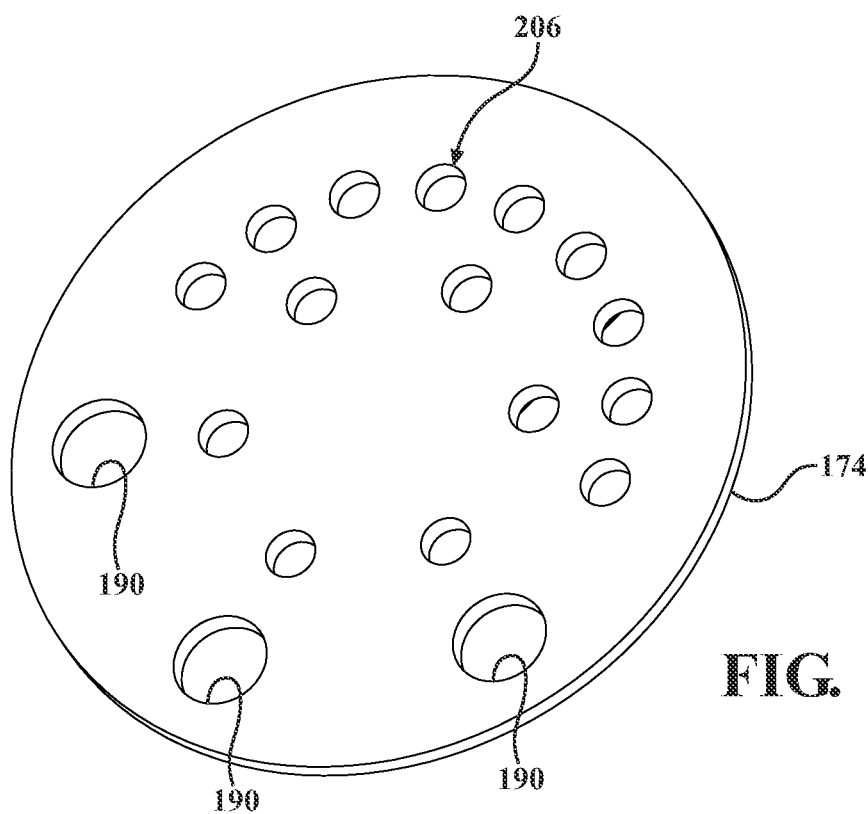
FIG. 23H is a first perspective view of a top portion of the cylindrical sleeve of the compressor of FIG. 23A.
Figure 23I:
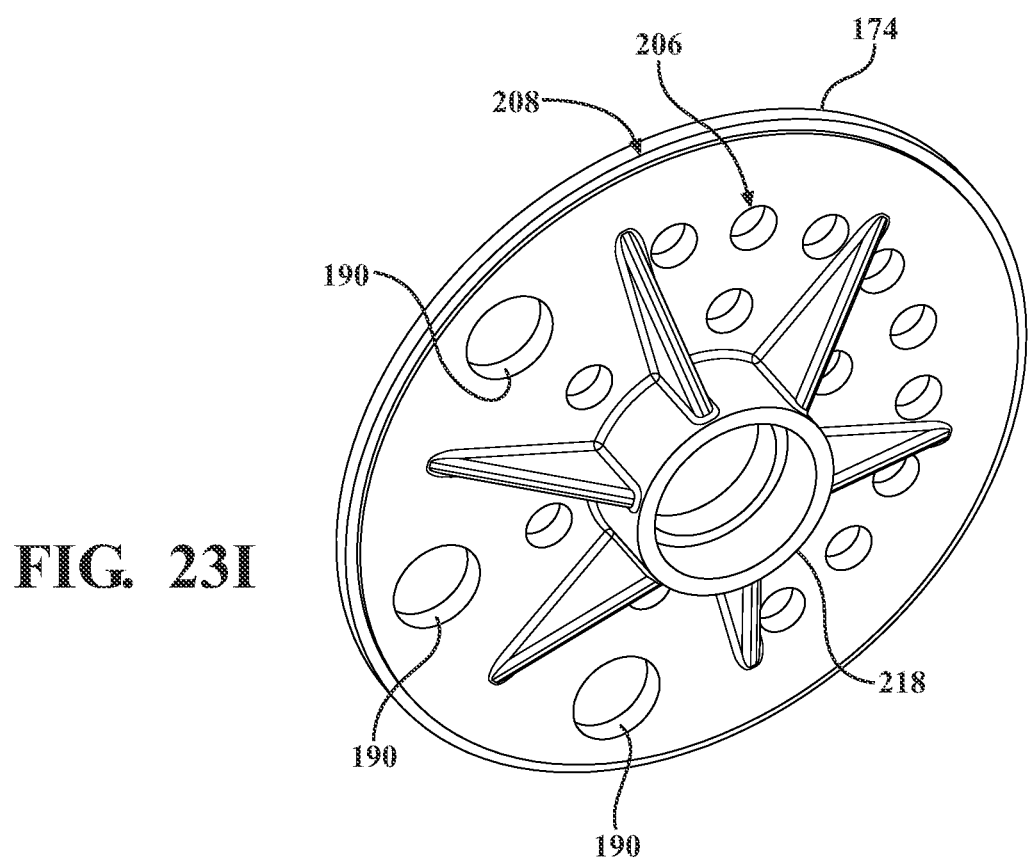
FIG. 23I is a second perspective view of a portion of the cylindrical sleeve of the compressor of FIG. 23A.
Figure 23J:
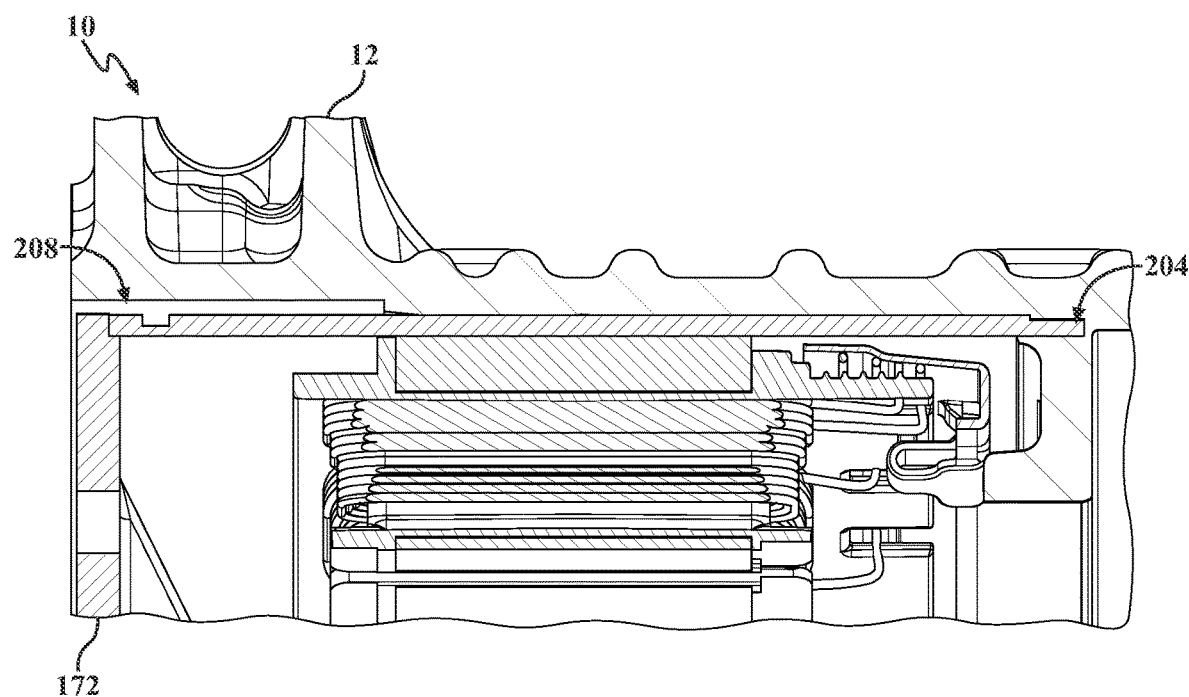
FIG. 23J is a partial cross-sectional view of the compressor of FIG. 23A.

With specific reference to FIGS. 23A-22I, a second illustrated embodiment of the cylindrical sleeve 170 is shown (so like elements are numbered in a similar manner). With specific reference to FIGS. 23H-23I, the top cover 174 may include at least one aperture 206 configured to allow refrigerant to flow into the inverter cavity 56 to provide cooling to the circuit 46. Although not required to prevent refrigerant from entering the inventor cavity 56, the slot or channel 212 and o-ring may be provided in the second illustrated embodiment to improve the NVH characteristics of the compressor 10. As discussed above, the slot 212 may be placed at a location outside the locating feature 204, 208.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An electric compressor configured to compress a refrigerant, comprising:
    a housing defining an intake volume and a discharge volume, the housing having a substantially cylindrical shape and having a central axis and forming a motor cavity;
    a refrigerant inlet port coupled to the housing and configured to introduce the refrigerant to the intake volume;
    a refrigerant outlet port coupled to the housing and configured to allow compressed refrigerant to exit the electric compressor from the dis charge volume;
    an inverter module mounted inside the housing and adapted to convert direct current electrical power to alternating current electrical power;
    a motor having a stator with an outer diameter;
    a drive shaft coupled to the motor;
    a cylindrical sleeve having a tubular side wall and a top cover defining an interior cavity, the interior cavity having an open end, the cylindrical sleeve being configured to receive the motor therein and constrain the motor within the interior cavity, the tubular side wall extending from the top cover to the open end, the stator of the motor having a length, the motor and the cylindrical sleeve forming an integrated module configured to be preassembled and secured within the motor cavity during assembly of the electric compressor, wherein the outer diameter of the stator and an inner diameter of the cylindrical sleeve are configured to establish an interference fit therebetween, the interference fit defined substantially along the length of, and a circumference of the stator; and,
    a compression device coupled to the drive shaft, for receiving the refrigerant from the intake volume and compressing the refrigerant as the drive shaft is rotated by the motor, the housing defining an inverter cavity, the inverter module being located within the inverter cavity, wherein the top cover includes at least one aperture configured to allow the refrigerant to flow into the inverter cavity.

2. The electric compressor, as set forth in claim 1 the interference fit between the outer diameter of the stator and the inner diameter of the cylindrical sleeve is between 100 and 300 microns.

3. The electric compressor, as set forth in claim 1, wherein the inverter module controls a rotational speed of the electric compressor.

4. The electric compressor, as set forth in claim 1, wherein the cylindrical sleeve includes a slot located around a periphery of the cylindrical sleeve for receiving an o-ring to hermetically seal the inverter cavity.

5. The electric compressor, as set forth in claim 1, wherein the cylindrical sleeve includes a rotational feature to allow the cylindrical sleeve and the motor to be positioned within the housing.

6. The electric compressor, as set forth in claim 5, wherein the rotational feature includes at least one tab extending from an outer surface of the cylindrical sleeve.

7. The electric compressor, as set forth in claim 1, wherein the tubular side wall of the cylindrical sleeve includes at least one window configured to allow an encapsulation material to be applied to an interior of the motor during assembly.

8. The electric compressor, as set forth in claim 1, wherein the tubular side wall of the cylindrical sleeve includes a refrigerant inlet window to allow the refrigerant to enter the intake volume.

9. The electric compressor, as set forth in claim 1, wherein the motor has an end located adjacent to the open end of the interior cavity, the end of the motor having a concentric locating feature configured to be received within a motor receiving portion of the housing.

10. The electric compressor, as set forth in claim 1, wherein a bottom surface of the top cover of the cylindrical sleeve includes a circular drive shaft supporting member for receiving a ball bearing associated with one end of the drive shaft.

11. An assembly, comprising:
a housing having a substantially cylindrical shape and having a central axis, the housing forming a motor cavity;
a motor having a stator with an outer diameter;
a drive shaft coupled to the motor; and
a cylindrical sleeve having a tubular side wall and a top cover defining an interior cavity, the interior cavity having an open end, the cylindrical sleeve being configured to receive the motor therein and constrain the motor within the interior cavity, the tubular side wall extending from the top cover to the open end, the stator of the motor having a length, the motor and the cylindrical sleeve forming an integrated module configured to be preassembled and secured within the motor cavity during assembly of the assembly, wherein the outer diameter of the stator and an inner diameter of the cylindrical sleeve are configured to establish an interference fit therebetween, the interference fit defined substantially along the length of, and a circumference of the stator; wherein the housing defines an inverter cavity configured to receive an inverter module, wherein the top cover includes at least one aperture configured to allow a refrigerant to flow into the inverter cavity.

12. The electric compressor, as set forth in claim 11 the interference fit between the outer diameter of the stator and the inner diameter of the cylindrical sleeve is between 100 and 300 microns.

13. The assembly, as set forth in claim 11, wherein the inverter module controls a rotation speed of the motor.

14. The assembly, as set forth in claim 13, wherein the cylindrical sleeve includes a slot located around a periphery of the cylindrical sleeve for receiving an o-ring to hermetically seal the inverter cavity.

15. The assembly, as set forth in claim 11, wherein the cylindrical sleeve includes a rotational feature to allow the cylindrical sleeve and motor to be positioned within the housing.

16. The assembly, as set forth in claim 15, wherein the rotational feature includes at least one tab extending from an outer surface of the cylindrical sleeve.

17. The assembly, as set forth in claim 11, wherein the tubular side wall of the cylindrical sleeve includes at least one window configured to allow an encapsulation material to be applied to an interior of the motor during assembly.

18. The assembly, as set forth in claim 11, wherein the motor has an end located adjacent to the open end of the interior cavity, the end of the motor having a concentric locating feature configured to be received within a motor receiving portion of the housing.

19. The assembly, as set forth in claim 11, wherein a bottom surface of the top cover of the cylindrical sleeve includes a circular drive shaft supporting member for receiving a ball bearing associated with one end of the drive shaft.

20. An electric compressor having a central axis and being configured to compress a refrigerant, comprising:
a housing defining an intake volume and a discharge volume;
a refrigerant inlet port coupled to the housing and configured to introduce the refrigerant to the intake volume;
a refrigerant outlet port coupled to the housing and configured to allow compressed refrigerant to exit the electric compressor from the discharge volume;
an inverter section including:
an inverter housing,
an inverter back cover connected to the inverter housing and forming an inverter cavity,
an inverter module mounted inside the inverter cavity and adapted to convert direct current electrical power to alternating current electrical power;
a motor section including:
a motor cavity formed within the housing,
a drive shaft located within the housing, having first and second ends and defining a center axis, and
a motor having a stator with an outer diameter located within the housing to controllably rotate the drive shaft about the center axis,
a compression device coupled to the drive shaft, for receiving the refrigerant from the intake volume and compressing the refrigerant as the drive shaft is rotated by the motor,
the compression device including:
a fixed scroll located within, and being fixed relative to, the housing;
an orbiting scroll coupled to the drive shaft, the orbiting scroll and the fixed scroll forming compression chambers for receiving the refrigerant from the intake volume and compressing the refrigerant as the drive shaft is rotated about the center axis; and,
a cylindrical sleeve having a tubular side wall and a top cover defining an interior cavity, the interior cavity having an open end, the cylindrical sleeve being configured to receive the motor therein and constrain the motor within the interior cavity, the tubular side wall extending from the top cover to the open end, the stator of the motor having a length, the motor and the cylindrical sleeve forming an integrated module configured to be preassembled and secured within the motor cavity during assembly of the electric compressor, wherein the outer diameter of the stator and an inner diameter of the cylindrical sleeve are configured to establish an interference fit therebetween, the interference fit defined substantially along the length of, and a circumference of the stator, wherein the top cover includes at least one aperture configured to allow the refrigerant to flow into the inverter cavity.

21. An electric compressor configured to compress a refrigerant, comprising:

a housing defining an intake volume and a discharge volume, the housing having a substantially cylindrical shape and having a central axis and forming a motor cavity;

a refrigerant inlet port coupled to the housing and configured to introduce the refrigerant to the intake volume;

a refrigerant outlet port coupled to the housing and configured to allow compressed refrigerant to exit the electric compressor from the discharge volume;

an inverter module mounted inside the housing and adapted to convert direct current electrical power to alternating current electrical power;

a motor having a stator with an outer diameter;

a drive shaft coupled to the motor;

a cylindrical sleeve having a tubular side wall and a top cover defining an interior cavity, the interior cavity having an open end, the cylindrical sleeve being configured to receive the motor therein and constrain the motor within the interior cavity, the tubular side wall extending from the top cover to the open end, the stator of the motor having a length, the motor and the cylindrical sleeve forming an integrated module configured to be preassembled and secured within the motor cavity during assembly of the electric compressor, wherein the outer diameter of the stator and an inner diameter of the cylindrical sleeve are configured to establish an interference fit therebetween, the interference fit defined substantially along the length of, and a circumference of the stator, wherein the tubular side wall of the cylindrical sleeve includes a refrigerant inlet window to allow the refrigerant to enter the intake volume; and, a compression device coupled to the drive shaft, for receiving the refrigerant from the intake volume and compressing the refrigerant as the drive shaft is rotated by the motor.

22. An assembly, comprising:

a housing having a substantially cylindrical shape and having a central axis and forming an intake volume, the housing forming a motor cavity;

a motor having a stator with an outer diameter;

a drive shaft coupled to the motor; and a cylindrical sleeve having a tubular side wall and a top cover defining an interior cavity, the interior cavity having an open end, the cylindrical sleeve being configured to receive the motor therein and constrain the motor within the interior cavity, the tubular side wall extending from the top cover to the open end, the stator of the motor having a length, the motor and the cylindrical sleeve forming an integrated module configured to be preassembled and secured within the motor cavity during assembly of the assembly, wherein the outer diameter of the stator and an inner diameter of the cylindrical sleeve are configured to establish an interference fit therebetween, the interference fit defined substantially along the length of, and a circumference of the stator, wherein the tubular side wall of the cylindrical sleeve includes a refrigerant inlet window to allow refrigerant to enter the intake volume.

23. An electric compressor having a central axis and being configured to compress a refrigerant, comprising:

a housing defining an intake volume and a discharge volume;

a refrigerant inlet port coupled to the housing and configured to introduce the refrigerant to the intake volume;

a refrigerant outlet port coupled to the housing and configured to allow compressed refrigerant to exit the electric compressor from the discharge volume;

an inverter section including:
  an inverter housing,
  an inverter back cover connected to the inverter housing and forming an inverter cavity,
  an inverter module mounted inside the inverter cavity and adapted to convert direct current electrical power to alternating current electrical power;

a motor section including:
  a motor cavity formed within the housing,
  a drive shaft located within the housing, having first and second ends and defining a center axis, and
  a motor having a stator with an outer diameter to controllably rotate the drive shaft about the center axis,
  a compression device coupled to the drive shaft, for receiving the refrigerant from the intake volume and compressing the refrigerant as the drive shaft is rotated by the motor, the compression device including:
    a fixed scroll located within, and being fixed relative to, the housing;
    an orbiting scroll coupled to the drive shaft, the orbiting scroll and the fixed scroll forming compression chambers for receiving the refrigerant from the intake volume and compressing the refrigerant as the drive shaft is rotated about the center axis; and, a cylindrical sleeve having a tubular side wall and a top cover defining an interior cavity, the interior cavity having an open end, the cylindrical sleeve being configured to receive the motor therein and constrain the motor within the interior cavity, the tubular side wall extending from the top cover to the open end, the stator of the motor having a length, the motor and the cylindrical sleeve forming an integrated module configured to be preassembled and secured within the motor cavity during assembly of the electric compressor, wherein the outer diameter of the stator and an inner diameter of the cylindrical sleeve are configured to establish an interference fit therebetween, the interference fit defined substantially along the length of, and a circumference of the stator, wherein the tubular side wall of the cylindrical sleeve includes a refrigerant inlet window to allow the refrigerant to enter the intake volume.

* * * * *